United States Patent
Yukioka et al.

(10) Patent No.: US 12,521,375 B2
(45) Date of Patent: Jan. 13, 2026

(54) PHARMACEUTICAL COMPOSITION FOR TREATING FATTY LIVER DISEASE

(71) Applicant: Shionogi & Co., Ltd., Osaka (JP)

(72) Inventors: Hideo Yukioka, Osaka (JP); Atsuyuki Shimazaki, Osaka (JP); Tadateru Hamada, Osaka (JP); Naoki Ohyabu, Osaka (JP)

(73) Assignee: SHIONOGI & CO., LTD., Osaka (JP)

( * ) Notice: Subject to any disclaimer, the term of this patent is extended or adjusted under 35 U.S.C. 154(b) by 546 days.

(21) Appl. No.: 17/926,273

(22) PCT Filed: May 20, 2021

(86) PCT No.: PCT/JP2021/019088
§ 371 (c)(1),
(2) Date: Nov. 18, 2022

(87) PCT Pub. No.: WO2021/235508
PCT Pub. Date: Nov. 25, 2021

(65) Prior Publication Data
US 2023/0210822 A1 Jul. 6, 2023

(30) Foreign Application Priority Data
May 21, 2020 (JP) ................. 2020-089196
Aug. 7, 2020 (JP) ................. 2020-134338

(51) Int. Cl.
*A61K 31/4184* (2006.01)
*A61P 1/16* (2006.01)
(52) U.S. Cl.
CPC ............ *A61K 31/4184* (2013.01); *A61P 1/16* (2018.01)
(58) Field of Classification Search
CPC ............... A61K 31/4184; A61P 1/16
(Continued)

(56) References Cited

U.S. PATENT DOCUMENTS 10,150,728 B2 * 12/2018 Kobayashi ............ C07C 275/10
2002/0104111 A1 8/2002 Wakil et al.
(Continued)

FOREIGN PATENT DOCUMENTS

EP 3 059 225 8/2016
EP 3 279 187 2/2018
(Continued)

OTHER PUBLICATIONS

Stephen A. Harrison et al., "Resmetirom (MGL-3196) for the treatment of non-alcoholic steatohepatitis: a multicentre, randomised, double-blind, placebo-controlled, phase 2 trial", Lancet (2019), vol. 394, pp. 2012-2024.
(Continued)

*Primary Examiner* — Yevgeny Valenrod
(74) *Attorney, Agent, or Firm* — Wenderoth, Lind & Ponack, L.L.P.

(57) ABSTRACT

Provided is a pharmaceutical composition for treating and/or preventing fatty liver disease, particularly nonalcoholic fatty liver disease, the pharmaceutical composition having an excellent ACC2-selective inhibitory action and having no side effects such as an increase in plasma triglyceride or a decrease in platelet concentration.

A pharmaceutical composition for treating and/or preventing fatty liver disease, the pharmaceutical composition comprising a compound represented by Formula (I):

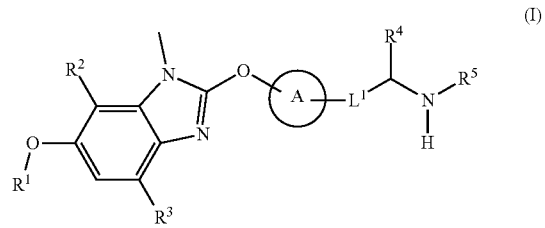

wherein
$R^1$ is haloalkyl or non-aromatic carbocyclyl,
$R^2$ is a hydrogen atom or halogen,
$R^3$ is halogen,
ring A is a group represented by the formula:

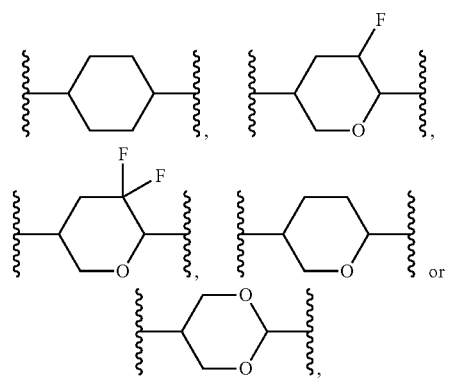

$-L^1-$ is $-O-(CH_2)-$, $-(CH_2)_2-$, or the like,
$R^4$ is alkyl or haloalkyl, and
$R^5$ is alkylcarbonyl or carbamoyl,
or a pharmaceutically acceptable salt thereof.

18 Claims, 9 Drawing Sheets

(58) Field of Classification Search
USPC .......................................................... 514/394
See application file for complete search history.

(56) References Cited

U.S. PATENT DOCUMENTS

| | | |
|---|---|---|
| 2012/0108619 A1 | 5/2012 | Griffith et al. |
| 2014/0187633 A1 | 7/2014 | Manku et al. |
| 2016/0257641 A1 | 9/2016 | Kobayashi et al. |
| 2018/0021341 A1 | 1/2018 | Harriman et al. |
| 2018/0079727 A1 | 3/2018 | Ohyabu et al. |

FOREIGN PATENT DOCUMENTS

| | | |
|---|---|---|
| JP | 2004-523225 | 8/2004 |
| JP | 2013-542218 | 11/2013 |
| JP | 2018-501276 | 1/2018 |
| WO | 02/051355 | 7/2002 |
| WO | 2011/058474 | 5/2011 |
| WO | 2012/056372 | 3/2012 |
| WO | 2013/071169 | 5/2013 |
| WO | 2015/056782 | 4/2015 |
| WO | 2016/112305 | 7/2016 |
| WO | 2016/159082 | 10/2016 |
| WO | 2019/006324 | 1/2019 |

OTHER PUBLICATIONS

International Search Report dated Jun. 15, 2021 in International (PCT) Application No. PCT/JP2021/019088.
International Preliminary Report on Patentability mailed Dec. 1, 2022 in International (PCT) Application No. PCT/JP2021/019088 (English Translation).
Extended European Search Report issued May 8, 2024 in corresponding European Patent Application No. 21808650.2.
Roger W. Chapman et al., "Obeticholic acid-a new therapy in PBC and NASH", British Medical Bulletin, 2020, vol. 133, pp. 95-104.
Sunder Mudaliar et al., "Efficacy and Safety of the Farnesoid X Receptor Agonist Obeticholic Acid in Patients With Type 2 Diabetes and Nonalcoholic Fatty Liver Disease", Gastroenterology, Sep. 2013, vol. 145, No. 3, pp. 574-582.
Stephen Harrison et al., "Resmetiron (MGL-3196) for the treatment of non-alcoholic steatohepatitis: a multicentre, randomised, double-blind, placebo-controlled, phase 2 trial", The Lancet, Nov. 1, 2019, vol. 394, No. 10213, pp. 2012-2014.

\* cited by examiner

PHARMACEUTICAL COMPOSITION FOR TREATING FATTY LIVER DISEASE

TECHNICAL FIELD

The present invention relates to a novel pharmaceutical composition for treating and/or preventing fatty liver disease, particularly nonalcoholic fatty liver disease.

BACKGROUND ART

Liver disease is a leading cause of death worldwide. Liver disease can be caused by infection, injury, exposure to drugs or toxic compounds, alcohol, impurities in food, and abnormal accumulation of normal substances in blood, autoimmune processes, genetic defects (such as hemochromatosis), or unknown cause(s). Liver disease is generally classified as acute or chronic liver disease based on a duration of the disease.

Fatty liver disease is a generic term for diseases in which neutral fat is accumulated in the liver to cause liver disorder. A case in which 30% or more of hepatocytes with lipid droplets are observed in a liver tissue is referred to as fatty liver.

Fatty liver is a state in which neutral fat is accumulated in the liver, and the accumulation of fat in the liver is a non-progressive (reversible) change. Therefore, when the cause is removed, the accumulation of fat in the liver returns to normal. However, when accumulation of fat progresses and liver dysfunction occurs, liver cirrhosis or liver cancer may develop. Alcoholic steatohepatitis (ASH) caused by drinking is a typical example of fatty liver.

On the other hand, fatty liver may occur in a person who hardly ingests alcohol, and this is referred to as nonalcoholic fatty liver disease (NAFLD). Severe NAFLD is referred to as nonalcoholic steatohepatitis (NASH). NASH is considered to be an important cause of liver cirrhosis and liver cancer.

Histological images of alcoholic and nonalcoholic hepatitis are similar, and a common onset mechanism such as oxidative stress in the liver has been studied.

According to the American Association for the Study of Liver Diseases, more than 20% of the population has nonalcoholic fatty liver disease (NAFLD). If left untreated, NAFLD can progress to nonalcoholic steatohepatitis (NASH) causing serious adverse effects. In addition, NASH can lead to liver fibrosis, liver cirrhosis, liver failure, or hepatocellular carcinoma when untreated. Approximately 16 million adults in the United States have NASH, and approximately 50% have advanced liver fibrosis (bridging fibrosis or liver cirrhosis) associated with NASH. Based on these figures, NASH is expected to be a primary indication for liver transplantation by 2020. NASH is characterized by the presence of steatosis and by other properties including hepatocellular degeneration (balloon-like, Mallory's hyaline), inflammatory cell infiltration, and development of progressive fibrosis.

There is no currently approved therapy for treatment of NASH or therapy to reduce fibrosis and/or steatosis in NASH patients. Therefore, there is still a need to provide a new and effective drug for treatment of liver disease or symptoms of the liver disease.

Patent Document 1 describes a method for treating and/or preventing nonalcoholic steatohepatitis (NASH) and/or primary biliary liver cirrhosis, the method including administering a pharmaceutical composition containing eicosapentaenoic acid or a derivative thereof to a subject in need thereof. Obeticholic acid, which is a semisynthetic bile acid and an agonist for a nuclear receptor, farnesoid X receptor (FXR), has been reported to be applied for an indication of fibrosis caused by NASH in Europe and the United States.

ACC is an enzyme that carboxylates acetyl-CoA to convert it into malonyl-CoA, and is involved in metabolism of fatty acids. There are two isoforms of ACC: acetyl-CoA carboxylase 1 (hereinafter referred to as ACC1) and ACC2.

ACC2 is expressed mainly in the heart and skeletal muscles, and malonyl-CoA produced by ACC2 inhibits carnitine palmitoyltransferase I (CPT-I), thereby inhibiting oxidation of fatty acids.

In ACC2 deficient mice, continuous fatty acid oxidation occurs due to a decrease in an amount of malonyl-CoA in the heart and skeletal muscles, and a decrease in body weight is observed regardless of an increase in food intake. Furthermore, it has also been reported that ACC2 deficient mice have acquired resistance to diabetes and obesity induced by administration of a high-fat/high-carbohydrate diet.

The above findings suggest that ACC2 is involved in diseases such as diabetes and obesity, and an inhibitor thereof is an antidiabetic drug or an antiobesity drug.

On the other hand, ACC1 deficient mice are lethal in the fetal period, and therefore there is a demand for a selective inhibitor that inhibits ACC2 without inhibiting ACC1.

Patent Documents 2 and 3 describe a method for treating nonalcoholic fatty liver disease using a thienopyrimidine derivative having inhibitory activity against both ACC1 and ACC2. For example, compounds shown below are known as firsocostat (an ACC1/2 dual inhibitor), and have been developed for an indication of nonalcoholic steatohepatitis and the like. Firsocostat is designed to be selectively taken up by the liver via a transporter.

[Chemical Formula 1]

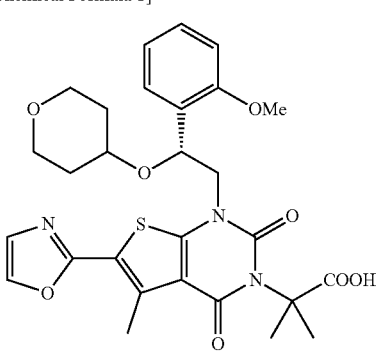

For firsocostat, top-line performance of a phase II ATLAS study over 48 weeks has been published on Dec. 16, 2019. The phase II ATLAS study is a randomized, double-blind, placebo-controlled study to evaluate safety and efficacy of a monotherapy and a dual combination therapy with 30 mg of cilofexor (a selective nonsteroidal FXR agonist), 20 mg of firsocostat, and 18 mg of selonsertib (an ASK1 inhibitor) in patients with advanced fibrosis (F3-F4) due to NASH. As a result, it has been reported that no statistically significant increase was observed in a proportion of patients who achieved improvement in fibrosis of one or more stages without deterioration of NASH, which is a primary efficacy endpoint, in any regimen. In a previously conducted phase II study over 12 weeks, an elevated plasma triglyceride concentration has been reported in NAFLD patients receiving firsocostat. An elevated plasma triglyceride concentration has also been reported in NAFLD patients receiving another ACC1/2 dual inhibitor, MK-4074. An elevated plasma triglyceride concentration is known to increase an occurrence of cardiovascular events, and the cardiovascular events have been reported to be a most frequent cause of death in NASH patients. NAFLD is an independent risk factor for cardiovascular disease, and it has been reported that a risk of cardiovascular disease increases as a disease state progresses to NASH. The ATLAS study has reported that a plasma triglyceride concentration is increased in NASH patients using firsocostat and cilofexor in combination.

Patent Document 4 describes an ACC1/2 dual inhibitor. For example, a compound shown below is known as PF-05175157 (an ACC1/2 dual inhibitor) and reduced a platelet concentration by repeated administration to healthy subjects.

[Chemical Formula 2]

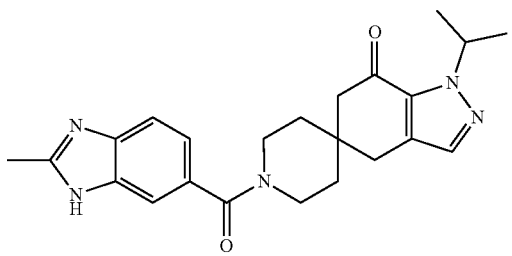

It has been reported that this is because production of platelets was reduced by suppression of fatty acid synthesis via ACC1 inhibition in the bone marrow.

Patent Documents 5 and 6 describe a benzimidazole derivative that specifically inhibits ACC2, but do not describe that the derivative is effective for treatment and/or prevention of nonalcoholic fatty liver disease.

As described above, a pharmaceutical composition for treatment and/or prevention of nonalcoholic fatty liver disease having an ACC2-selective inhibitory action has not yet been known.

PRIOR ART REFERENCES

Patent Document

[Patent Document 1] US 2014/187633 A
[Patent Document 2] International Publication WO 2013/071169 A
[Patent Document 3] International Publication WO 2016/112305 A
[Patent Document 4] International Publication WO 2011/058474 A
[Patent Document 5] International Publication WO 2015/056782 A
[Patent Document 6] International Publication WO 2016/159082 A

SUMMARY OF THE INVENTION

Problems to be Solved by the Invention

An object of the present invention is to provide a pharmaceutical composition for treating and/or preventing fatty liver disease, particularly nonalcoholic fatty liver disease, the pharmaceutical composition having an excellent ACC2-selective inhibitory action and having no side effects such as an increase in plasma triglyceride or a decrease in platelet concentration.

Means for Solving the Problem

As a result of repeated studies to solve the above problems, the present inventors have found that among the compounds having an ACC2-selective inhibitory action described in Patent Documents 5 and 6, a specific compound (compound having high ACC2 selectivity and excellent metabolic stability) is effective for treating and/or preventing nonalcoholic fatty liver disease, and has no side effects such as an increase in plasma triglyceride or a decrease in platelet concentration, thereby completing the present invention. An ACC2-selective inhibitor of the present invention can avoid side effects due to ACC1 inhibition and inhibit systemic ACC2. As a result, unlike an ACC1/2 dual inhibitor and a liver-selective ACC1/2 dual inhibitor such as firsocostat, the ACC2-selective inhibitor of the present invention does not cause a decrease in platelet and does not increase a plasma triglyceride concentration, and can exert a metabolic improvement action based on systemic ACC2 inhibition, including improvement in insulin resistance. The present invention relates to the following.

(1)

A pharmaceutical composition for treating and/or preventing fatty liver disease, the pharmaceutical composition comprising a compound represented by Formula (I):

[Chemical Formula 3]

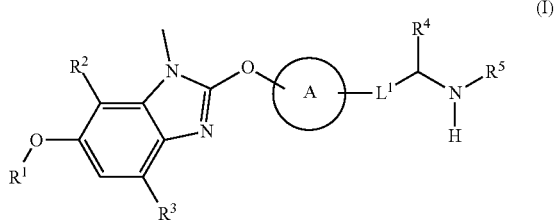

wherein $R^1$ is haloalkyl or non-aromatic carbocyclyl,
$R^2$ is a hydrogen atom or halogen,
$R^3$ is halogen,
ring A is a group represented by the formula:

[Chemical Formula 4]

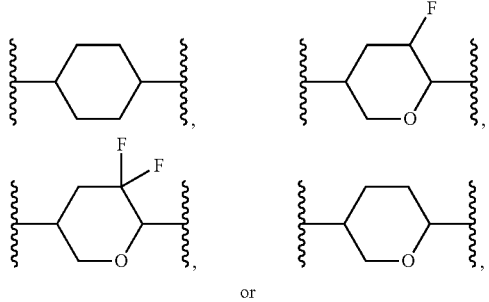

or

-continued

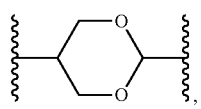

L¹- is —O—(CH₂)—, —(CH₂)₂—, —(CH₂)—(CF₂)—, or —(CF₂)—(CH₂)— (wherein a left bond is attached to the ring A and a right bond is attached to a group represented by the

[Chemical Formula 5]

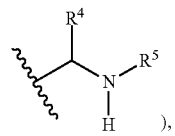

R⁴ is alkyl or haloalkyl, and

R⁵ is alkylcarbonyl or carbamoyl, or a pharmaceutically acceptable salt thereof.

(2)

The pharmaceutical composition according to the above item (1), wherein R¹ is non-aromatic carbocyclyl.

(3)

The pharmaceutical composition according to the above item (1) or (2), wherein R² is a hydrogen atom.

(4)

The pharmaceutical composition according to any one of the above items (1) to (3), wherein the ring A is a group represented by the formula:

[Chemical Formula 6]

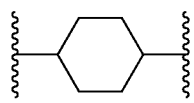 or 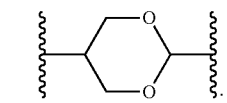.

(5)

The pharmaceutical composition according to any one of the above items (1) to (4), wherein -L¹- is —O—(CH₂)— or —(CH₂)₂—.

(6)

The pharmaceutical composition according to any one of the above items (1) to (5), wherein R⁴ is alkyl.

(7)

The pharmaceutical composition according to any one of the above items (1) to (6), wherein R⁵ is methylcarbonyl or carbamoyl.

(8)

The pharmaceutical composition according to the above item (1), wherein the compound represented by Formula (I) or the pharmaceutically acceptable salt thereof is a compound selected from the group consisting of the following formula:

[Chemical Formula 7]

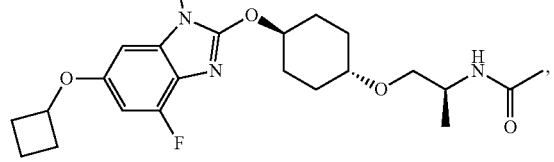

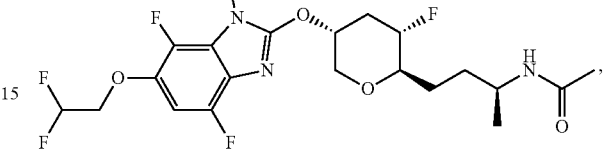

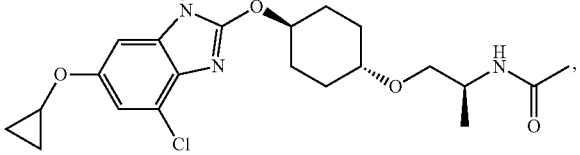

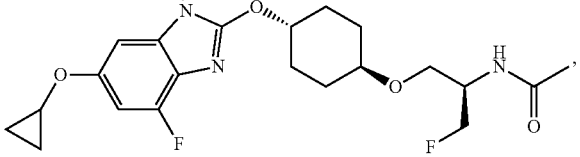

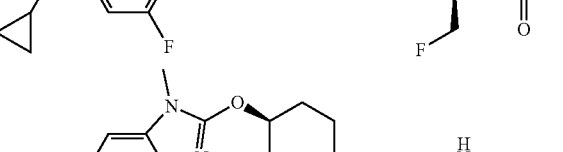

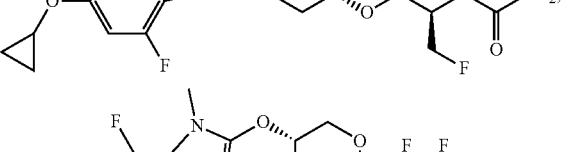

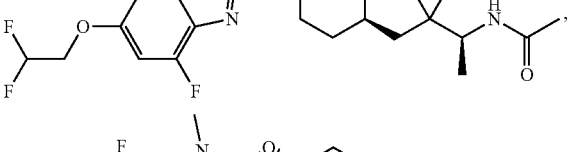

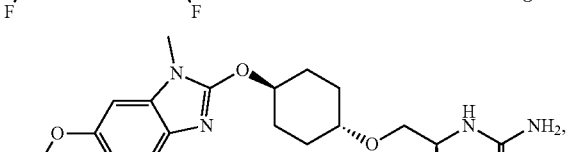

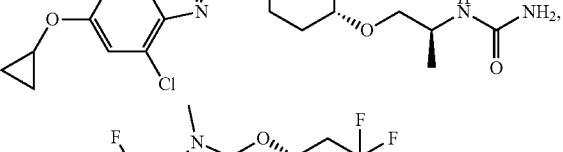

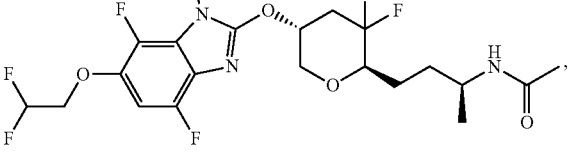

-continued

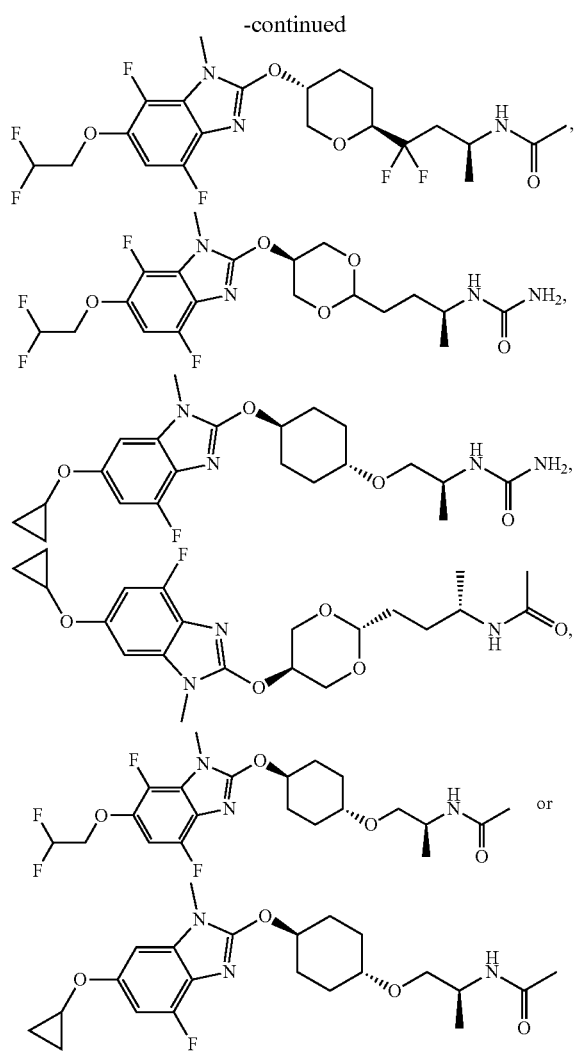

or a pharmaceutically acceptable salt thereof.

(9) The pharmaceutical composition according to the above item (1), wherein the fatty liver disease is nonalcoholic fatty liver disease (NAFLD).

(10) The pharmaceutical composition according to the above item (1), wherein the fatty liver disease is nonalcoholic steatohepatitis (NASH).

(11) The pharmaceutical composition according to the above item (1), wherein the fatty liver disease is liver fibrosis caused by NASH.

(12) The pharmaceutical composition according to the above item (1), wherein the fatty liver disease is liver cirrhosis caused by NASH.

(13) The pharmaceutical composition according to the above item (1), wherein the fatty liver disease is hepatocellular carcinoma (HCC) caused by NASH.

(14) The pharmaceutical composition according to the above item (1), which has no side effects of an increase in plasma triglyceride by administration of the pharmaceutical composition.

(15) The pharmaceutical composition according to the above item (1), which has no side effects of cardiovascular disease by administration of the pharmaceutical composition.

(16) The pharmaceutical composition according to the above item (1), wherein insulin resistance is improved by administration of the pharmaceutical composition.

(17) The pharmaceutical composition according to the above item (1), which has no side effects of a decrease in platelet concentration by administration of the pharmaceutical composition.

(18) A method of treating and/or preventing fatty liver disease, the method including:

a step of administering an effective amount of a compound represented by Formula (I):

[Chemical Formula 8]

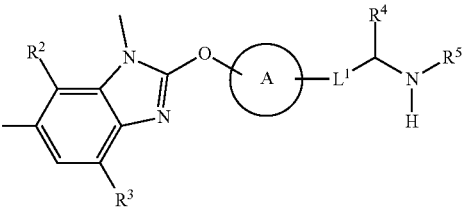

wherein $R^1$ is haloalkyl or non-aromatic carbocyclyl, $R^2$ is a hydrogen atom or halogen, $R^3$ is halogen, ring A is a group represented by the formula:

[Chemical Formula 9]

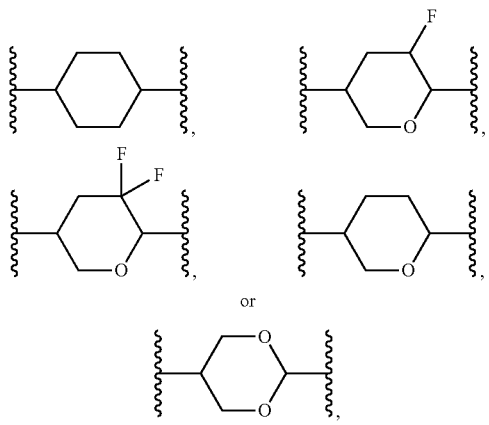

$-L^1-$ is $-O-(CH_2)-$, $-(CH_2)_2-$, $-(CH_2)-(CF_2)-$, or $-(CF_2)-(CH_2)-$ (wherein a left bond is attached to the ring A and a right bond is attached to a group represented by the formula:

[Chemical Formula 10]

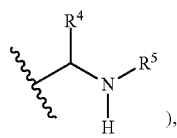

R⁴ is alkyl or haloalkyl, and
R⁵ is alkylcarbonyl or carbamoyl, or a pharmaceutically acceptable salt thereof to an individual in need of treating and/or preventing the fatty liver disease.

(19) The method of treatment and/or prevention according to the above item (18), wherein R¹ is non-aromatic carbocyclyl.

(20) The method of treatment and/or prevention according to the above item (18) or (19), wherein R² is a hydrogen atom.

(21) The method of treatment and/or prevention according to any one of the above items (18) to (20), wherein the ring A is a group represented by the formula:

[Chemical Formula 11]

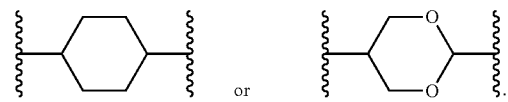

(22) The method of treatment and/or prevention according to any one of the above items (18) to (21), wherein -L¹- is —O—(CH₂)— or —(CH₂)₂—.

(23) The method of treatment and/or prevention according to any one of the above items (18) to (22), wherein R⁴ is alkyl.

(24) The method of treatment and/or prevention according to any one of the above items (18) to (23), wherein R⁵ is methylcarbonyl or carbamoyl.

(25) The method of treatment and/or prevention according to the above item (18), wherein the compound represented by Formula (I) or the pharmaceutically acceptable salt thereof is a compound selected from the group consisting of the following formula:

[Chemical Formula 12]

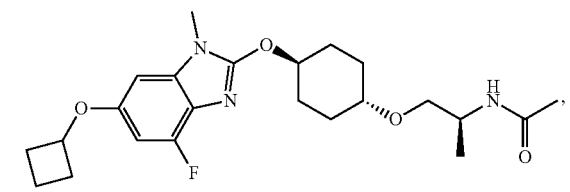

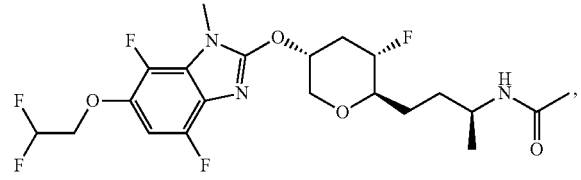

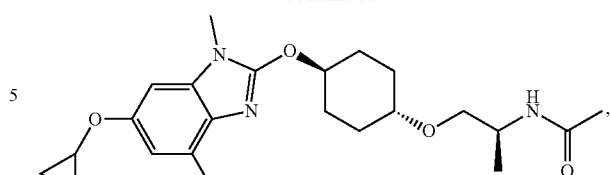

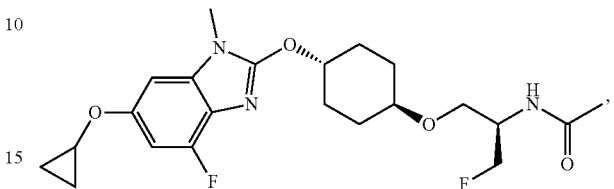

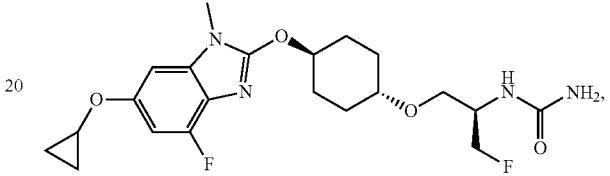

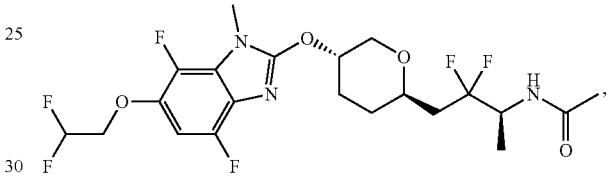

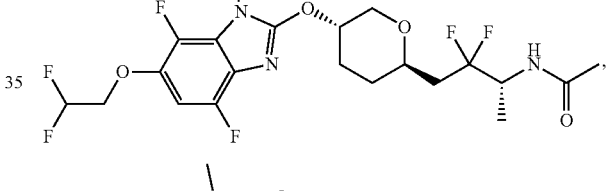

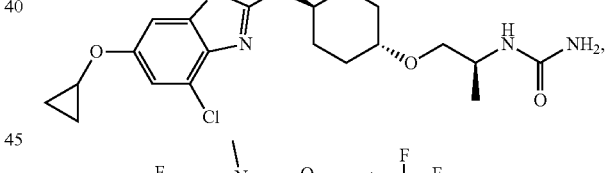

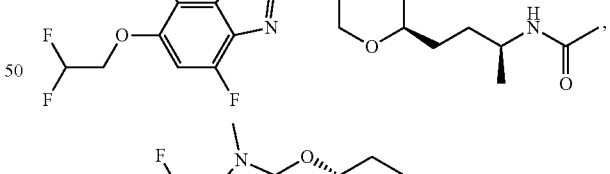

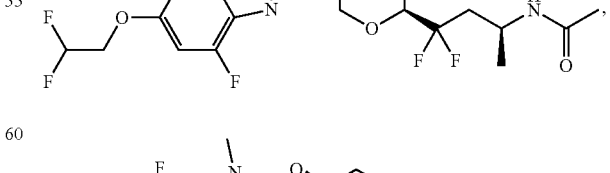

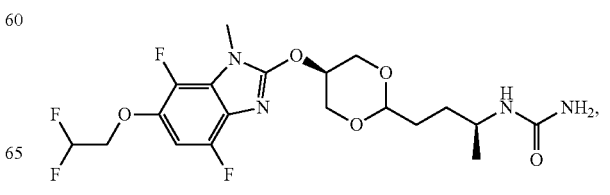

-continued

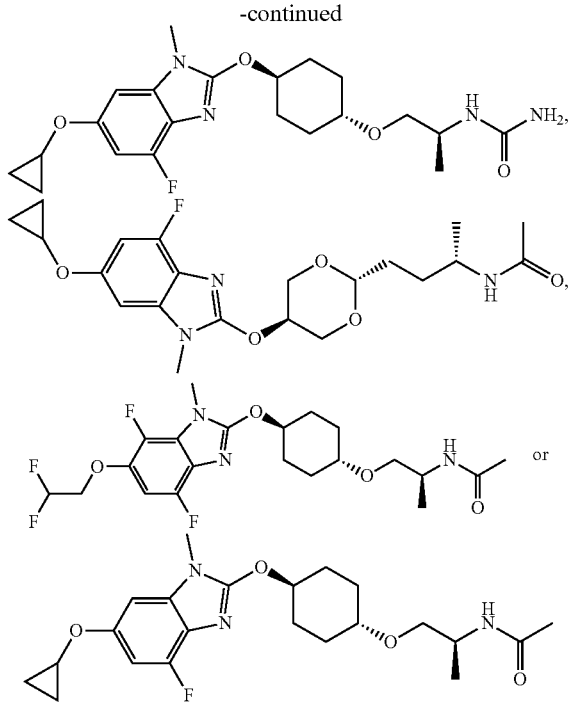

or a pharmaceutically acceptable salt thereof.

(26) The method of treatment and/or prevention according to the above item (18), wherein the fatty liver disease is nonalcoholic fatty liver disease (NAFLD).

(27) The method of treatment and/or prevention according to the above item (18), wherein the fatty liver disease is nonalcoholic steatohepatitis (NASH).

(28) The method of treatment and/or prevention according to the above item (18), wherein the fatty liver disease is liver fibrosis caused by NASH.

(29) The method of treatment and/or prevention according to the above item (18), wherein the fatty liver disease is liver cirrhosis caused by NASH.

(30) The method of treatment and/or prevention according to the above item (18), wherein the fatty liver disease is hepatocellular carcinoma (HCC) caused by NASH.

(31) The method of treatment and/or prevention according to the above item (18), which has no side effects of an increase in plasma triglyceride by administration of the compound represented by Formula (I) or the pharmaceutically acceptable salt thereof.

(32) The method of treatment and/or prevention according to the above item (18), which has no side effects of cardiovascular disease by administration of the compound represented by Formula (I) or the pharmaceutically acceptable salt thereof.

(33) The method of treatment and/or prevention according to the above item (18), wherein insulin resistance is improved by administration of the compound represented by Formula (I) or the pharmaceutically acceptable salt thereof.

(34) The method of treatment and/or prevention according to the above item (18), which has no side effects of a decrease in platelet concentration by administration of the compound represented by Formula (I) or the pharmaceutically acceptable salt thereof.

(35) Use of a compound represented by Formula (I):

[Chemical Formula 13]

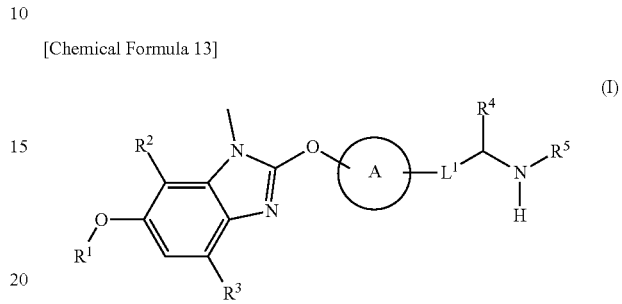

wherein
$R^1$ is haloalkyl or non-aromatic carbocyclyl,
$R^2$ is a hydrogen atom or halogen,
$R^3$ is halogen,
ring A is a group represented by the formula:

[Chemical Formula 14]

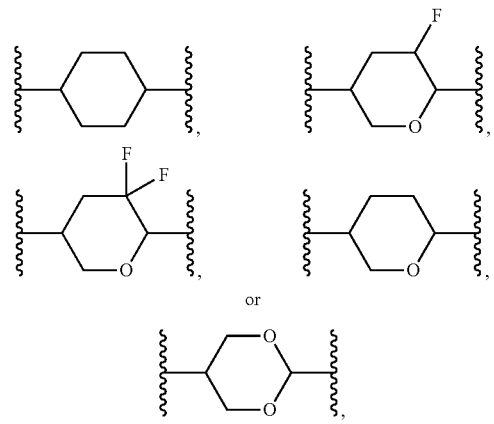

$-L^1-$ is $-O-(CH_2)-$, $-(CH_2)_2-$, $-(CH_2)-(CF_2)-$, or $-(CF_2)-(CH_2)-$ (wherein a left bond is attached to the ring A and a right bond is attached to a group represented by the formula:

[Chemical Formula 15]

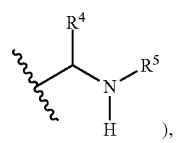

$R^4$ is alkyl or haloalkyl, and
$R^5$ is alkylcarbonyl or carbamoyl,
or a pharmaceutically acceptable salt thereof for production of a pharmaceutical composition for treating and/or preventing fatty liver disease.

(36)
The use according to the above item (35), wherein $R^1$ is non-aromatic carbocyclyl.

(37)
The use according to the above item (35) or (36), wherein $R^2$ is a hydrogen atom.

(38)
The use according to any one of the above items (35) to (37), wherein the ring A is a group represented by the formula:

[Chemical Formula 16]

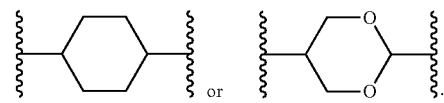

(39)
The use according to any one of the above items (35) to (38), wherein -$L^1$- is —O—(CH$_2$)— or —(CH$_2$)$_2$—.

(40)
The use according to any one of the above items (35) to (39), wherein $R^4$ is alkyl.

(41)
The use according to any one of the above items (35) to (40), wherein $R^5$ is methylcarbonyl or carbamoyl.

(42)
The use according to the above item (35), wherein the compound represented by Formula (I) or the pharmaceutically acceptable salt thereof is a compound selected from the group consisting of the following formula:

[Chemical Formula 17]

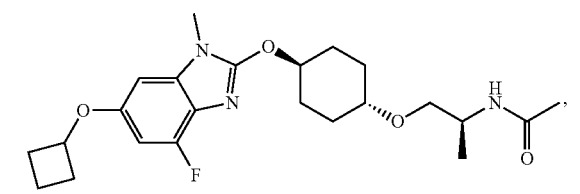

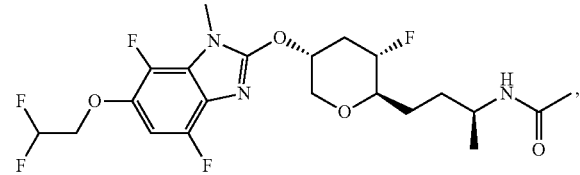

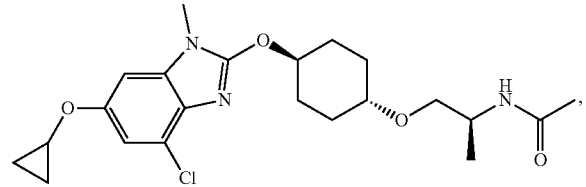

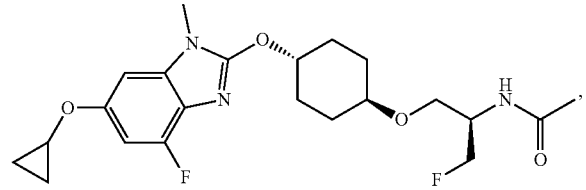

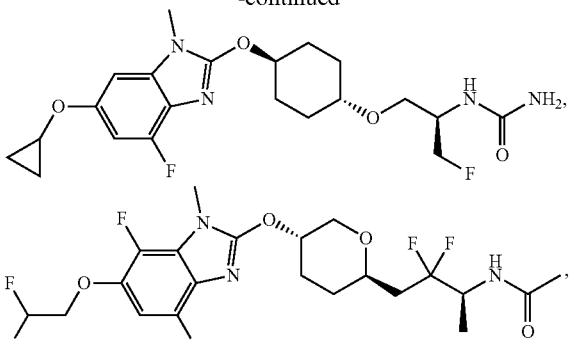

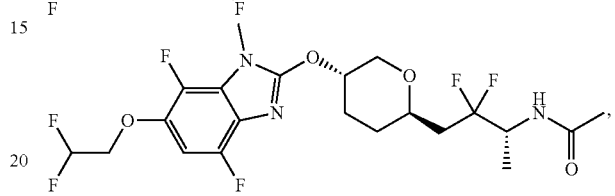

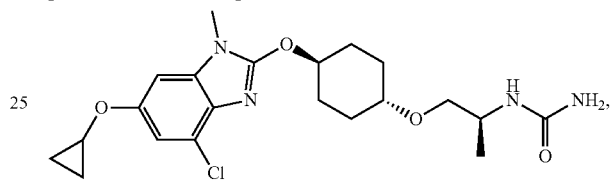

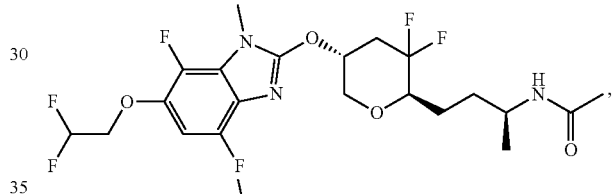

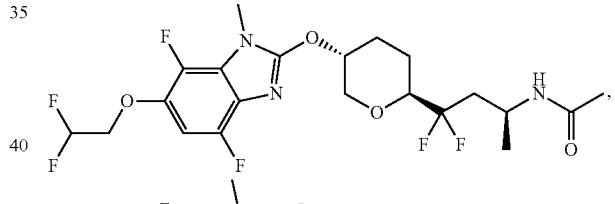

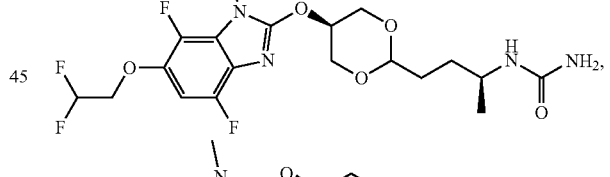

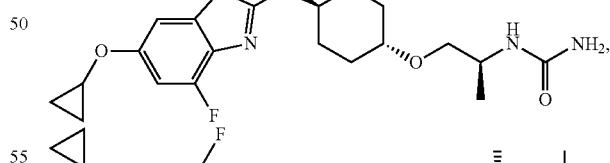

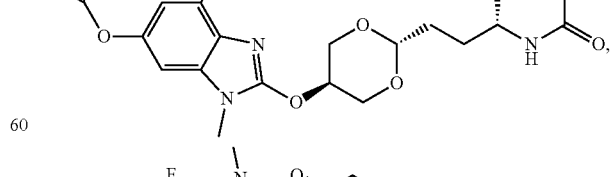

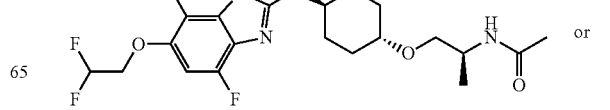

-continued

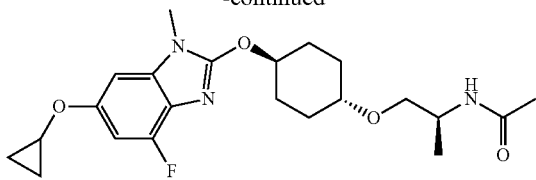

or a pharmaceutically acceptable salt thereof.

(43) The use according to the above item (35), wherein the fatty liver disease is nonalcoholic fatty liver disease (NAFLD).

(44) The use according to the above item (35), wherein the fatty liver disease is nonalcoholic steatohepatitis (NASH).

(45) The use according to the above item (35), wherein the fatty liver disease is liver fibrosis caused by NASH.

(46) The use according to the above item (35), wherein the fatty liver disease is liver cirrhosis caused by NASH.

(47) The use according to the above item (35), wherein the fatty liver disease is hepatocellular carcinoma (HCC) caused by NASH.

(48) The use according to the above item (35), which has no side effects of an increase in plasma triglyceride by administration of the compound represented by Formula (I) or the pharmaceutically acceptable salt thereof.

(49) The use according to the above item (35), which has no side effects of cardiovascular disease by administration of the compound represented by Formula (I) or the pharmaceutically acceptable salt thereof.

(50) The use according to the above item (35), wherein insulin resistance is improved by administration of the compound represented by Formula (I) or the pharmaceutically acceptable salt thereof.

(51) The use according to the above item (35), which has no side effects of a decrease in platelet concentration by administration of the compound represented by Formula (I) or the pharmaceutically acceptable salt thereof.

(52) A pharmaceutical composition, comprising:
a compound represented by Formula (I):

[Chemical Formula 18]

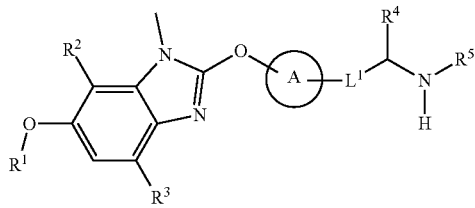

wherein
$R^1$ is haloalkyl or non-aromatic carbocyclyl,
$R^2$ is a hydrogen atom or halogen,
$R^3$ is halogen, ring A is a group represented by the formula:

[Chemical Formula 19]

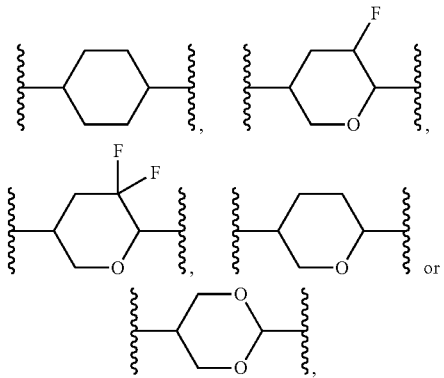

-$L^1$- is —O—$(CH_2)$—, —$(CH_2)_2$—, —$(CH_2)$—$(CF_2)$—, or —$(CF_2)$—$(CH_2)$— (wherein a left bond is attached to the ring A and a right bond is attached to a group represented by the formula:

[Chemical Formula 20]

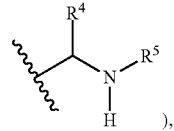

$R^4$ is alkyl or haloalkyl, and
$R^5$ is alkylcarbonyl or carbamoyl,
or a pharmaceutically acceptable salt thereof; and
at least one compound selected from the group consisting of obeticholic acid, semaglutide, and resmetirom or a pharmaceutically acceptable salt thereof.

(53) A pharmaceutical composition, comprising at least one compound selected from the group consisting of obeticholic acid, semaglutide, and resmetirom or a pharmaceutically acceptable salt thereof for administration in combination with a compound represented by Formula (I):

[Chemical Formula 21]

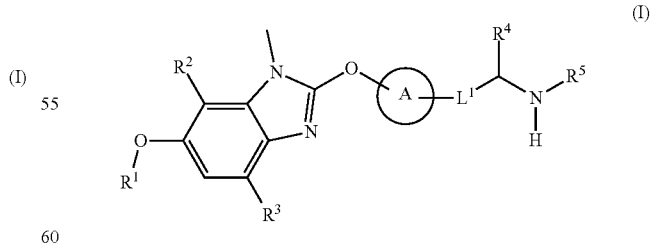

wherein each symbol has the same meaning as in the above item (52), or a pharmaceutically acceptable salt thereof.

(54) A pharmaceutical composition, comprising a compound represented by Formula (I):

[Chemical Formula 22]

(I)

wherein each symbol has the same meaning as in the above item (52), or a pharmaceutically acceptable salt thereof for administration in combination with at least one compound selected from the group consisting of obeticholic acid, semaglutide, and resmetirom or a pharmaceutically acceptable salt thereof.

(55) The pharmaceutical composition according to any one of the above items (52) to (54), wherein $R^1$ is non-aromatic carbocyclyl.

(56) The pharmaceutical composition according to any one of the above items (52) to (55), wherein $R^2$ is a hydrogen atom.

(57) The pharmaceutical composition according to any one of the above items (52) to (56), wherein the ring A is a group represented by the formula:

[Chemical Formula 23]

(58) The pharmaceutical composition according to any one of the above items (52) to (57), wherein -$L^1$- is —O—(CH$_2$)— or —(CH$_2$)$_2$—.

(59) The pharmaceutical composition according to any one of the above items (52) to (58), wherein $R^4$ is alkyl.

(60) The pharmaceutical composition according to any one of the above items (52) to (59), wherein $R^5$ is methylcarbonyl or carbamoyl.

(61) The pharmaceutical composition according to any one of the above items (52) to (54), wherein the compound represented by Formula (I) or the pharmaceutically acceptable salt thereof is a compound selected from the group consisting of the following formula:

[Chemical Formula 24]

-continued

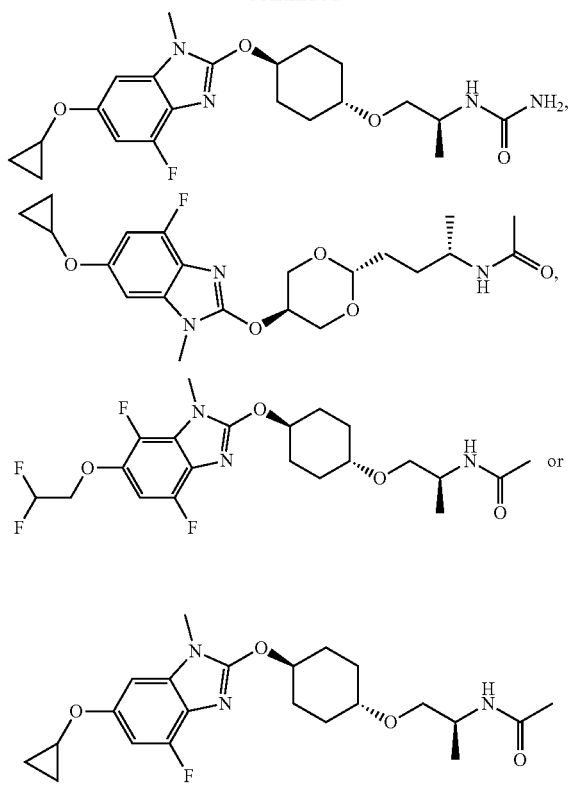

or a pharmaceutically acceptable salt thereof.

(62)

The pharmaceutical composition according to any one of the above items (52) to (54), for treating and/or preventing fatty liver disease.

(63)

The pharmaceutical composition according to the above item (62), wherein the fatty liver disease is nonalcoholic fatty liver disease (NAFLD).

(64)

The pharmaceutical composition according to the above item (62), wherein the fatty liver disease is nonalcoholic steatohepatitis (NASH).

(65)

The pharmaceutical composition according to the above item (62), wherein the fatty liver disease is liver fibrosis caused by NASH.

(66)

The pharmaceutical composition according to the above item (62), wherein the fatty liver disease is liver cirrhosis caused by NASH.

(67)

The pharmaceutical composition according to the above item (62), wherein the fatty liver disease is hepatocellular carcinoma (HCC) caused by NASH.

(68)

A method of treating and/or preventing fatty liver disease, the method including administering a compound represented by Formula (I):

[Chemical Formula 25]

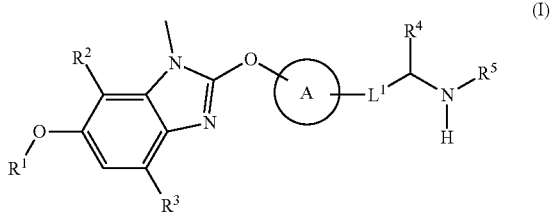

wherein
$R^1$ is haloalkyl or non-aromatic carbocyclyl,
$R^2$ is a hydrogen atom or halogen,
$R^3$ is halogen,
ring A is a group represented by the formula:

[Chemical Formula 26]

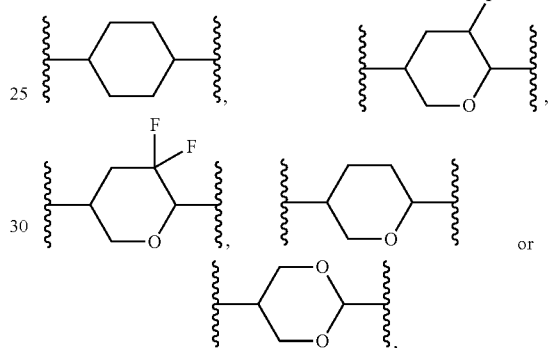

-$L^1$- is —O—$(CH_2)$—, —$(CH_2)_2$—, —$(CH_2)$—$(CF_2)$—, or —$(CF_2)$—$(CH_2)$— (wherein a left bond is attached to the ring A and a right bond is attached to a group represented by the formula:

[Chemical Formula 27]

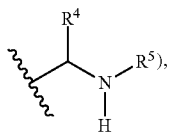

$R^4$ is alkyl or haloalkyl, and
$R^5$ is alkylcarbonyl or carbamoyl,
or a pharmaceutically acceptable salt thereof; and
  at least one compound selected from the group consisting of obeticholic acid, semaglutide, and resmetirom or a pharmaceutically acceptable salt thereof in combination.

(69)

The method of treatment and/or prevention according to the above item (68), wherein $R^1$ is non-aromatic carbocyclyl.

(70)

The method of treatment and/or prevention according to the above item (68) or (69), wherein $R^2$ is a hydrogen atom.

(71)

The method of treatment and/or prevention according to any one of the above items (68) to (70), wherein the ring A is a group represented by the formula:

[Chemical Formula 28]

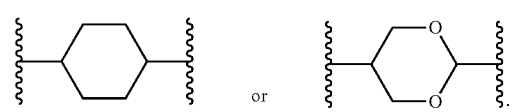

(72)

The method of treatment and/or prevention according to any one of the above items (68) to (71), wherein -L$^1$- is —O—(CH$_2$)— or —(CH$_2$)$_2$—.

(73)

The method of treatment and/or prevention according to any one of the above items (68) to (72), wherein R$^4$ is alkyl.

(74)

The method of treatment and/or prevention according to any one of the above items (68) to (73), wherein R$^5$ is methylcarbonyl or carbamoyl.

(75)

The method of treatment and/or prevention according to the above item (68), wherein the compound represented by Formula (I) or the pharmaceutically acceptable salt thereof is a compound selected from the group consisting of the following formula:

[Chemical Formula 29]

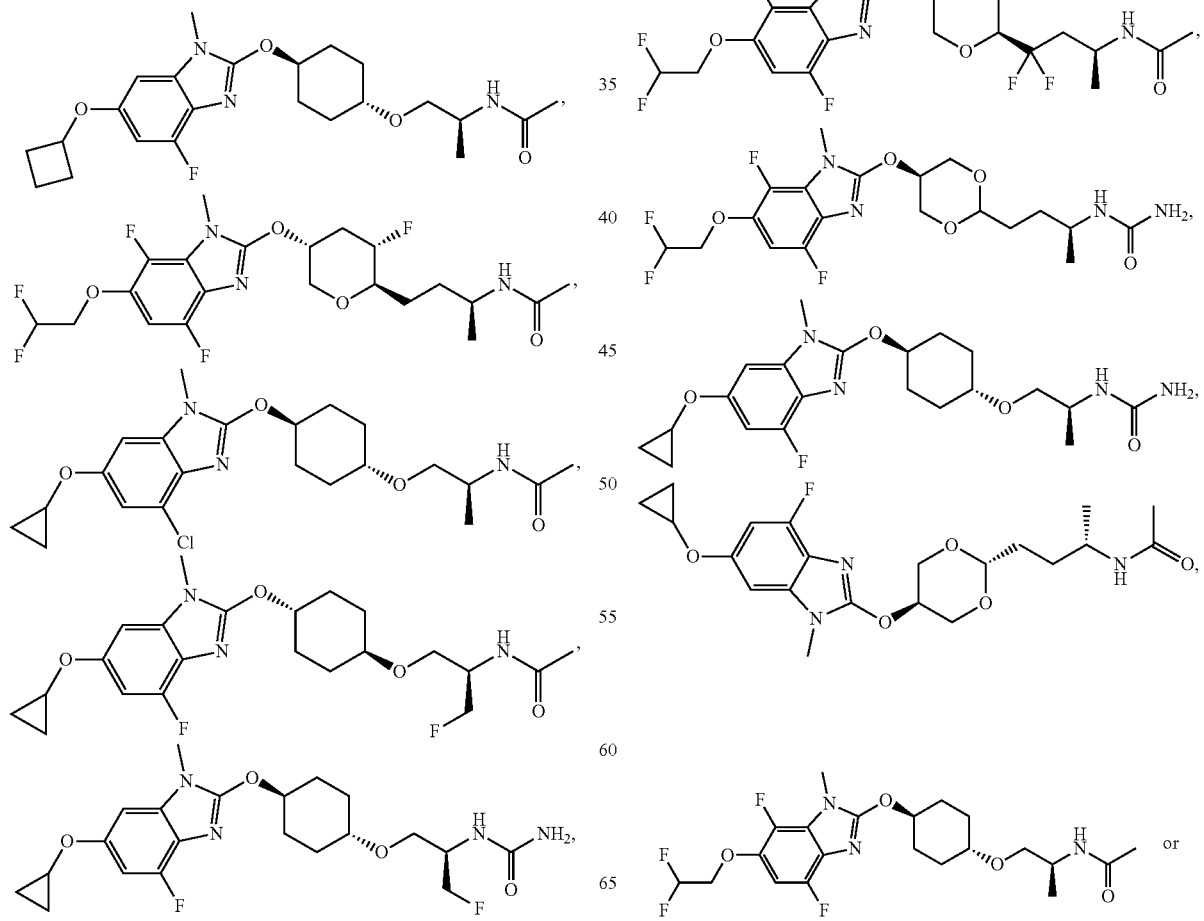

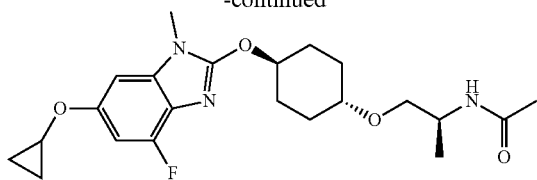

or a pharmaceutically acceptable salt thereof.

(76) The method of treatment and/or prevention according to the above item (68), wherein the fatty liver disease is nonalcoholic fatty liver disease (NAFLD).

(77) The method of treatment and/or prevention according to the above item (68), wherein the fatty liver disease is nonalcoholic steatohepatitis (NASH).

(78) The method of treatment and/or prevention according to the above item (68), wherein the fatty liver disease is liver fibrosis caused by NASH.

(79) The method of treatment and/or prevention according to the above item (68), wherein the fatty liver disease is liver cirrhosis caused by NASH.

(80) The method of treatment and/or prevention according to the above item (68), wherein the fatty liver disease is hepatocellular carcinoma (HCC) caused by NASH.

(1A) A pharmaceutical composition for treating and/or preventing nonalcoholic fatty liver disease, the pharmaceutical composition comprising a compound represented by Formula (I):

[Chemical Formula 30]

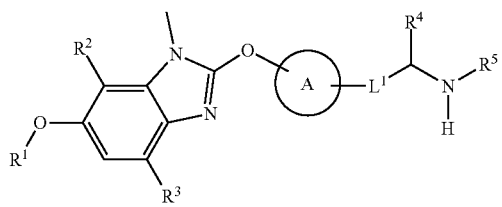

(I)

wherein
$R^1$ is haloalkyl or non-aromatic carbocyclyl,
$R^2$ is a hydrogen atom or halogen,
$R^3$ is halogen,
ring A is a group represented by the formula:

[Chemical Formula 31]

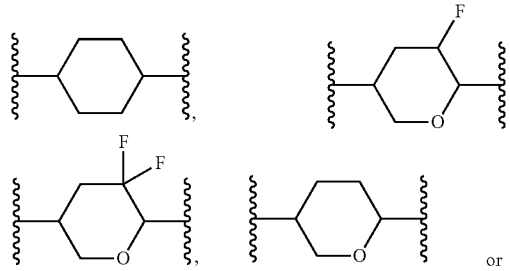

or

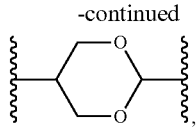

$-L^1-$ is $-O-(CH_2)-$, $-(CH_2)_2-$, $-(CH_2)-(CF_2)-$, or $-(CF_2)-(CH_2)-$ (wherein a left bond is attached to the ring A and a right bond is attached to a group represented by the formula:

[Chemical Formula 32]

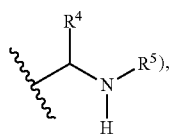

$R^4$ is alkyl or haloalkyl, and
$R^5$ is alkylcarbonyl or carbamoyl,
or a pharmaceutically acceptable salt thereof.

(2A) The pharmaceutical composition according to the above item (1A), wherein $R^1$ is non-aromatic carbocyclyl.

(3A) The pharmaceutical composition according to the above item (1A) or (2A), wherein $R^2$ is a hydrogen atom.

(4A) The pharmaceutical composition according to any one of the above items (1A) to (3A), wherein the ring A is a group represented by the formula:

[Chemical Formula 33]

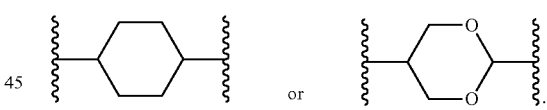

(5A) The pharmaceutical composition according to any one of the above items (1A) to (4A), wherein $-L^1-$ is $-O-(CH_2)-$ or $-(CH_2)_2-$.

(6A) The pharmaceutical composition according to any one of the above items (1A) to (5A), wherein $R^4$ is alkyl.

(7A) The pharmaceutical composition according to any one of the above items (1A) to (6A), wherein $R^5$ is methylcarbonyl or carbamoyl.

(8A) The pharmaceutical composition according to the above item (1A), wherein the compound represented by Formula (I) or the pharmaceutically acceptable salt thereof is pound selected from the group consisting of the following formula:

[Chemical Formula 34]

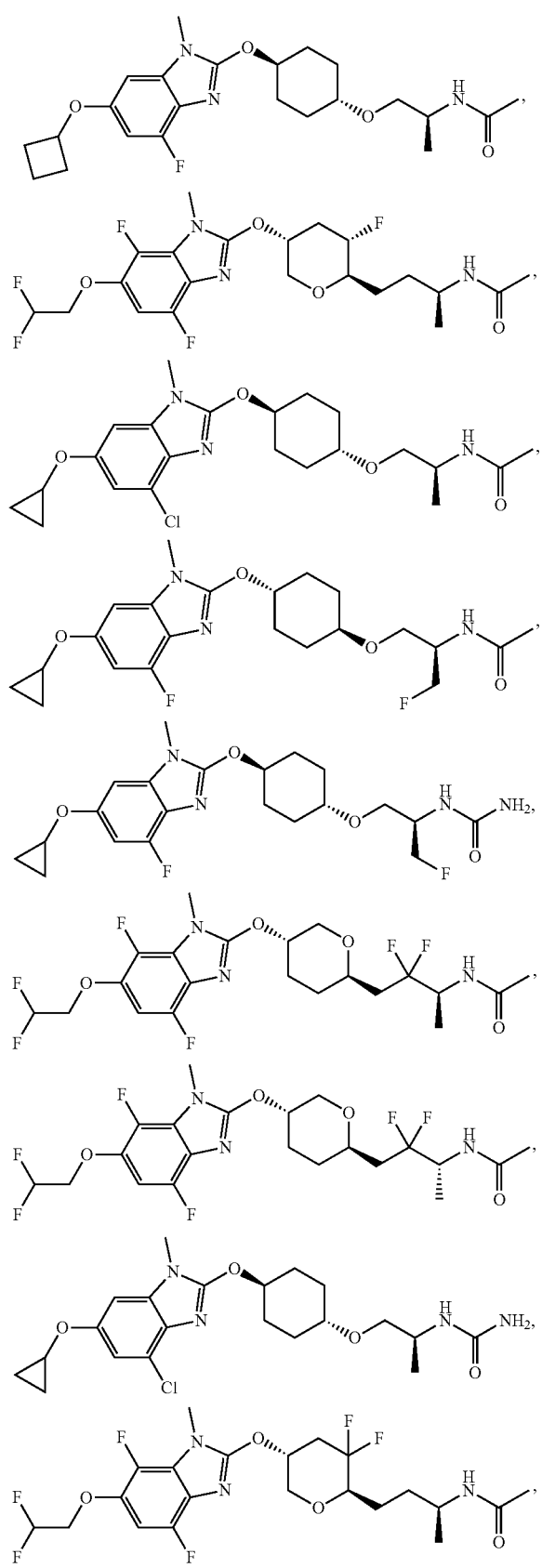

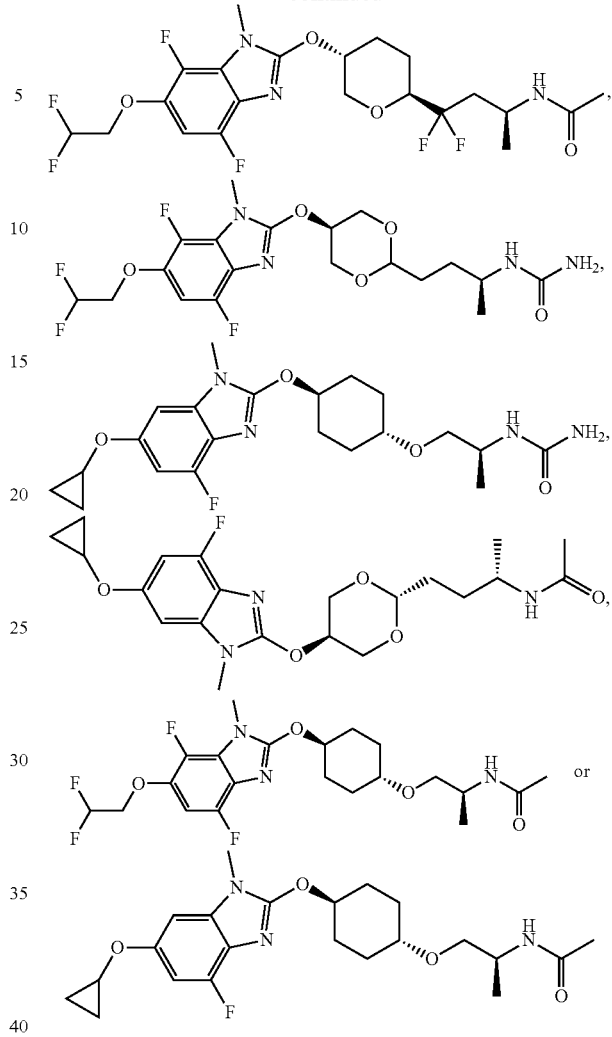

or a pharmaceutically acceptable salt thereof.

(9A)
The pharmaceutical composition according to the above item (1A), wherein the nonalcoholic fatty liver disease is nonalcoholic steatohepatitis (NASH).

(10A)
The pharmaceutical composition according to the above item (1A), wherein the nonalcoholic fatty liver disease is liver fibrosis caused by NASH.

(11A)
The pharmaceutical composition according to the above item (1A), wherein the nonalcoholic fatty liver disease is liver cirrhosis caused by NASH.

(12A)
The pharmaceutical composition according to the above item (1A), wherein the nonalcoholic fatty liver disease is hepatocellular carcinoma (HCC) caused by NASH.

(13A)
The pharmaceutical composition according to the above item (1A), which has no side effects of an increase in plasma triglyceride by administration of the pharmaceutical composition.

(14A)
The pharmaceutical composition according to the above item (13A), which has no side effects of cardiovascular disease by administration of the pharmaceutical composition.

(15A)
The pharmaceutical composition according to the above item (1A), wherein insulin resistance is improved by administration of the pharmaceutical composition.
(16A)
The pharmaceutical composition according to the above item (1A), which has no side effects of a decrease in platelet concentration by administration of the pharmaceutical composition.
(17A)
A pharmaceutical composition, comprising:
a compound represented by Formula (I):

[Chemical Formula 35]

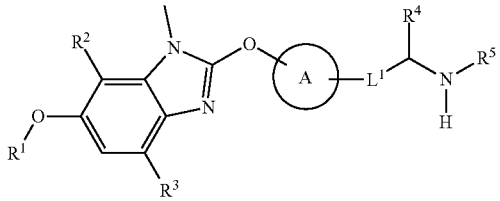

wherein
R¹ is haloalkyl or non-aromatic carbocyclyl,
R² is a hydrogen atom or halogen,
R³ is halogen,
ring A is a group represented by the formula:

[Chemical Formula 36]

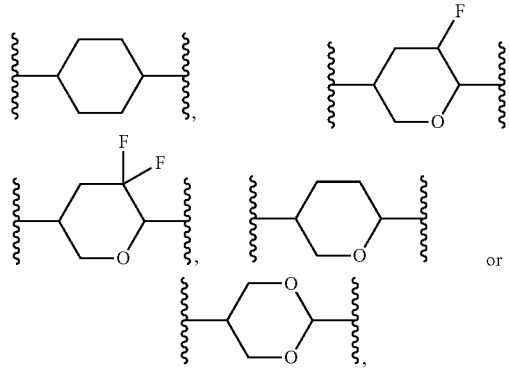

-L¹- is —O—(CH₂)—, —(CH₂)₂—, —(CH₂)—(CF₂)—, or —(CF₂)—(CH₂)— (wherein a left bond is attached to the ring A and a right bond is attached to a group represented by the formula:

[Chemical Formula 37]

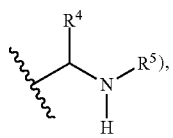

R⁴ is alkyl or haloalkyl, and
R⁵ is alkylcarbonyl or carbamoyl,
or a pharmaceutically acceptable salt thereof; and
at least one compound selected from the group consisting of obeticholic acid, semaglutide, and resmetirom or a pharmaceutically acceptable salt thereof.
(18A)
A pharmaceutical composition, comprising at least one compound selected from the group consisting of obeticholic acid, semaglutide, and resmetirom or a pharmaceutically acceptable salt thereof for administration in combination with a compound represented by Formula (I):

[Chemical Formula 38]

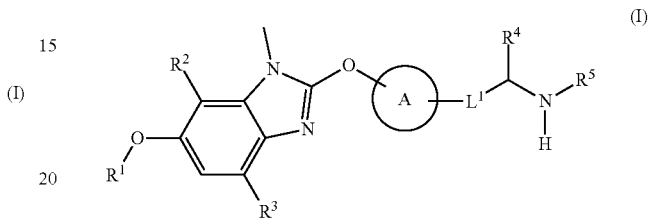

wherein each symbol has the same meaning as in the above item (17A), or a pharmaceutically acceptable salt thereof.
(19A)
A pharmaceutical composition, comprising a compound represented by Formula (I):

[Chemical Formula 39]

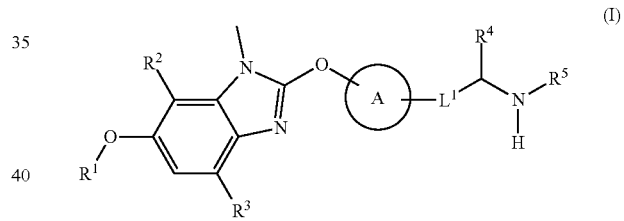

wherein each symbol has the same meaning as in the above item (17A), or a pharmaceutically acceptable salt thereof for administration in combination with at least one compound selected from the group consisting of obeticholic acid, semaglutide, and resmetirom or a pharmaceutically acceptable salt thereof.
(20A)
The pharmaceutical composition according to any one of the above items (17A) to (19A), wherein the compound represented by Formula (I) or the pharmaceutically acceptable salt thereof is a compound selected from the group consisting of the following formula:

[Chemical Formula 40]

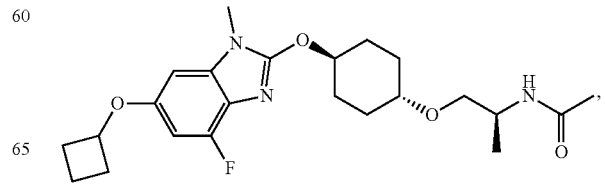

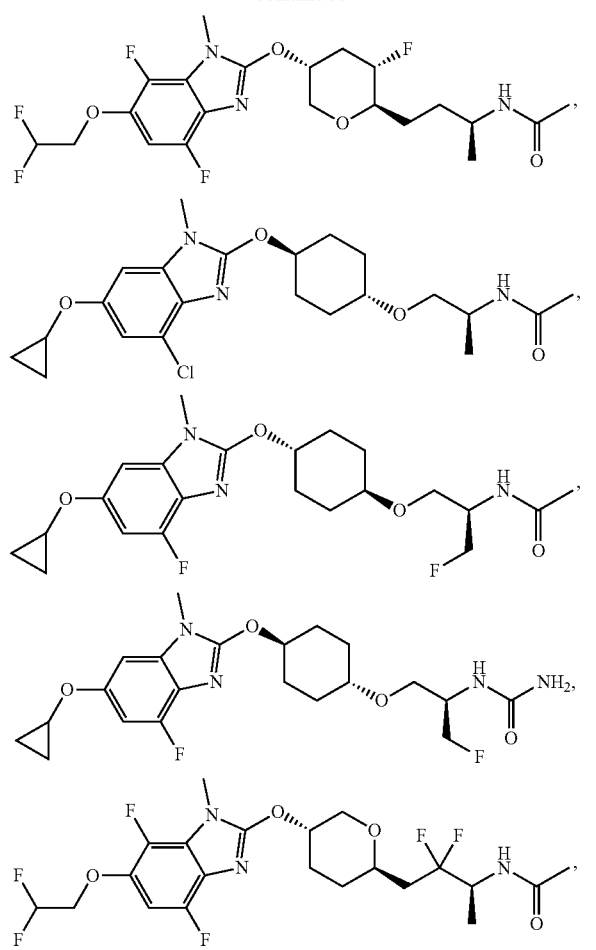

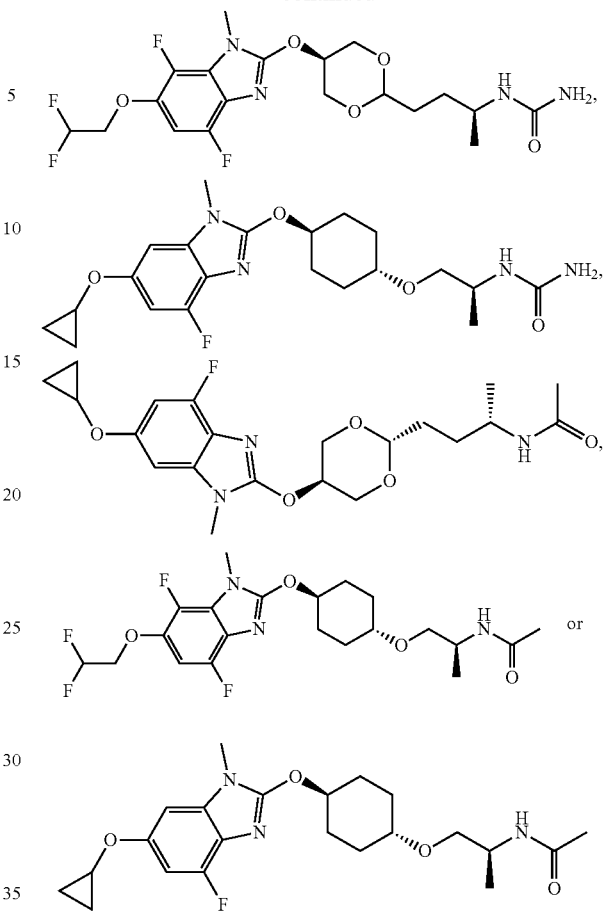

or a pharmaceutically acceptable salt thereof.

(21A)

The pharmaceutical composition according to any one of the above items (17A) to (20A), for treating and/or preventing nonalcoholic fatty liver disease.

(22A)

The pharmaceutical composition according to the above item (21A), wherein the nonalcoholic fatty liver disease is nonalcoholic steatohepatitis (NASH).

(23A)

The pharmaceutical composition according to the above item (21A), wherein the nonalcoholic fatty liver disease is liver fibrosis caused by NASH.

(24A)

The pharmaceutical composition according to the above item (21A), wherein the nonalcoholic fatty liver disease is liver cirrhosis caused by NASH.

(25A)

The pharmaceutical composition according to the above item (21A), wherein the nonalcoholic fatty liver disease is hepatocellular carcinoma (HCC) caused by NASH.

(26A)

A method of treating and/or preventing nonalcoholic fatty liver disease, the method including administering a compound represented by Formula (I):

[Chemical Formula 41]

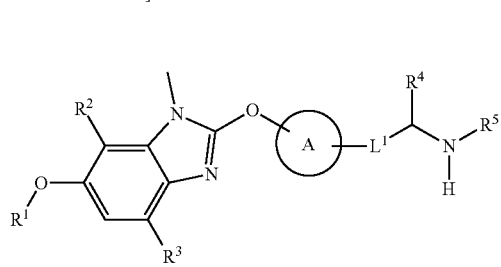

wherein each symbol has the same meaning as in the above item (17A), or a pharmaceutically acceptable salt thereof; and at least one compound selected from the group consisting of obeticholic acid, semaglutide, and resmetirom or a pharmaceutically acceptable salt thereof in combination.

(27A)

The method of treatment and/or prevention according to the above item (26A), wherein the compound represented by Formula (I) or the pharmaceutically acceptable salt thereof is a compound selected from the group consisting of the following formula:

[Chemical Formula 42]

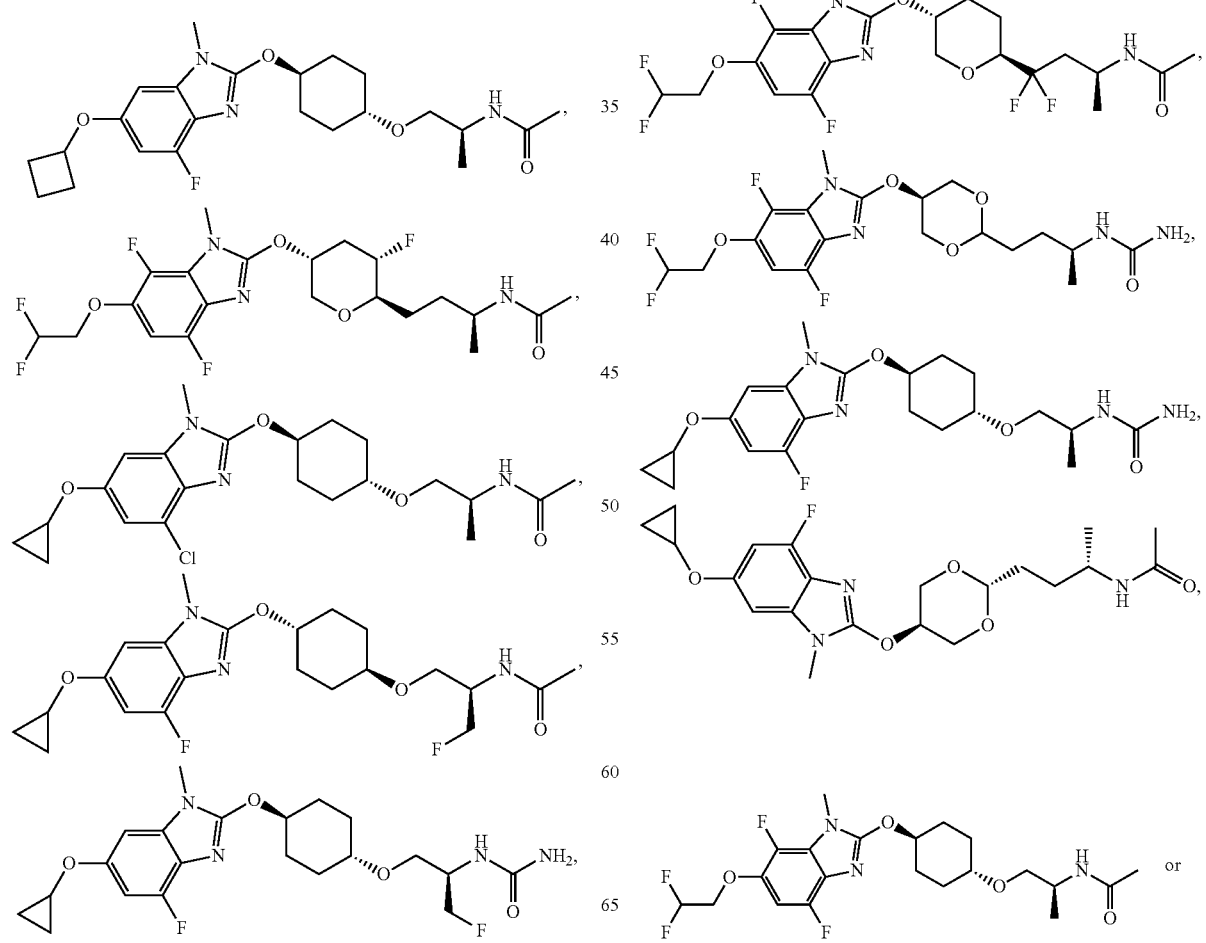

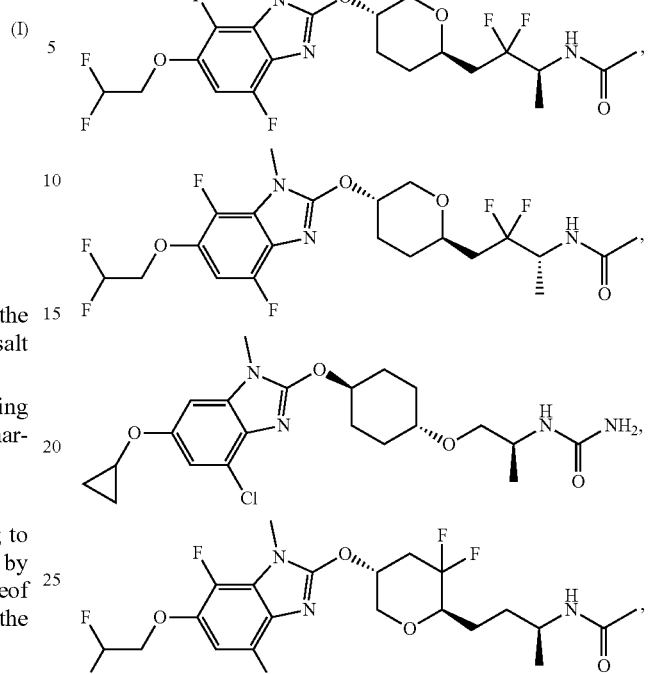

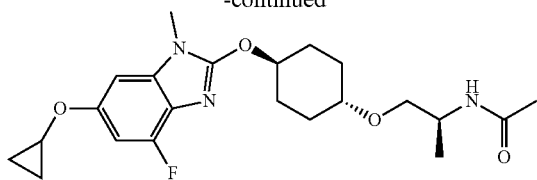

or a pharmaceutically acceptable salt thereof.

(28A)
The method of treatment and/or prevention according to the above item (26A) or (27A), wherein the nonalcoholic fatty liver disease is nonalcoholic steatohepatitis (NASH).

(29A)
The method of treatment and/or prevention according to the above item (26A) or (27A), wherein the nonalcoholic fatty liver disease is liver fibrosis caused by NASH.

(30A)
The method of treatment and/or prevention according to the above item (26A) or (27A), wherein the nonalcoholic fatty liver disease is liver cirrhosis caused by NASH.

(31A)
The method of treatment and/or prevention according to the above item (26A) or (27A), wherein the nonalcoholic fatty liver disease is hepatocellular carcinoma (HCC) caused by NASH.

(1B)
A pharmaceutical composition for treating and/or preventing nonalcoholic fatty liver disease, the pharmaceutical composition comprising a compound represented by Formula (I):

[Chemical Formula 43]

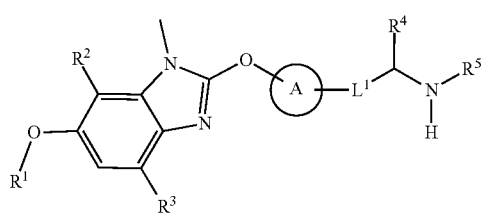

wherein
$R^1$ is haloalkyl or non-aromatic carbocyclyl,
$R^2$ is a hydrogen atom or halogen,
$R^3$ is halogen,
ring A is a group represented by the formula:

[Chemical Formula 44]

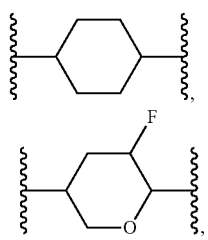

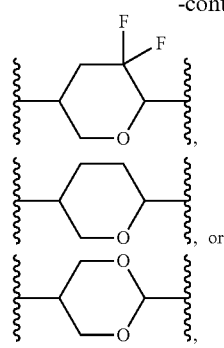

-$L^1$- is —O—(CH$_2$)—, —(CH$_2$)$_2$—, —(CH$_2$)—(CF$_2$)—, or —(CF$_2$)—(CH$_2$)— (wherein a left bond is attached to the ring A and a right bond is attached to a group represented by the formula:

[Chemical Formula 45]

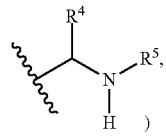

$R^4$ is alkyl or haloalkyl, and
$R^5$ is alkylcarbonyl or carbamoyl,
or a pharmaceutically acceptable salt thereof.

(2B)
The pharmaceutical composition according to the above item (1), wherein $R^1$ is non-aromatic carbocyclyl.

(3B)
The pharmaceutical composition according to the above item (1) or (2B), wherein $R^2$ is a hydrogen atom.

(4B)
The pharmaceutical composition according to any one of the above items (1) to (3B), wherein the ring A is a group represented by the formula:

[Chemical Formula 46]

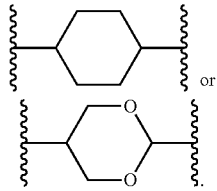

(5B)
The pharmaceutical composition according to any one of the above items (1) to (4B), wherein -$L^1$- is —O—(CH$_2$)— or —(CH$_2$)$_2$—.

(6B)
The pharmaceutical composition according to any one of the above items (1) to (5B), wherein $R^4$ is alkyl.

(7B)
The pharmaceutical composition according to any one of the above items (1) to (6B), wherein $R^5$ is methylcarbonyl or carbamoyl.

(8B)

The pharmaceutical composition according to the above item (1), wherein the compound represented by Formula (I) or the pharmaceutically acceptable salt thereof is a compound selected from the group consisting of the following formula:

[Chemical Formula 47]

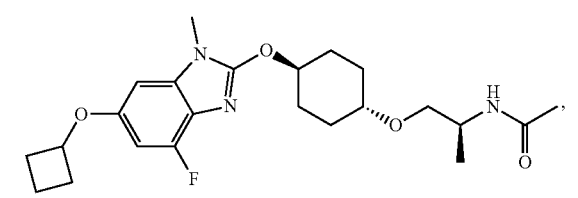
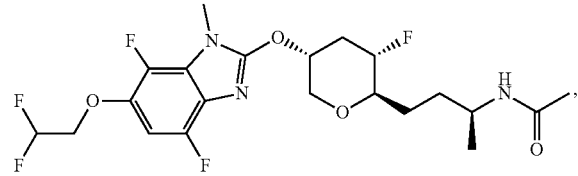
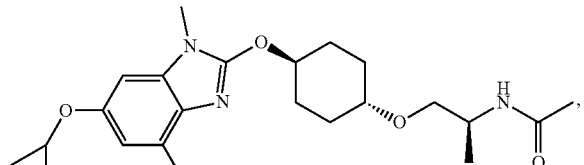
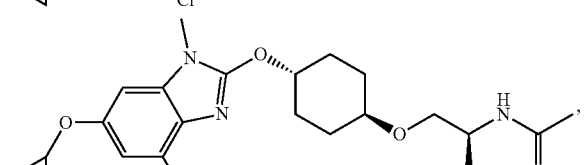
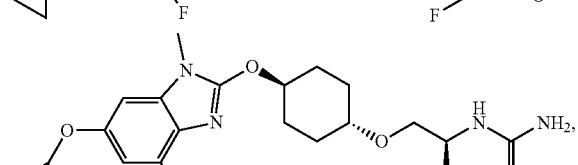
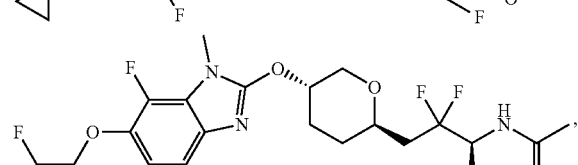
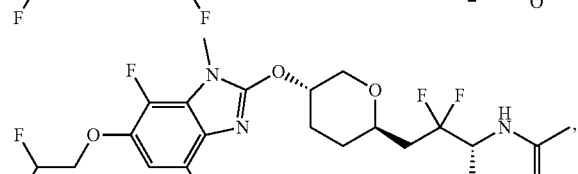
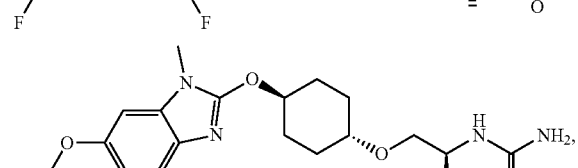
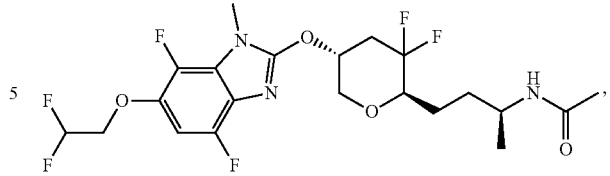
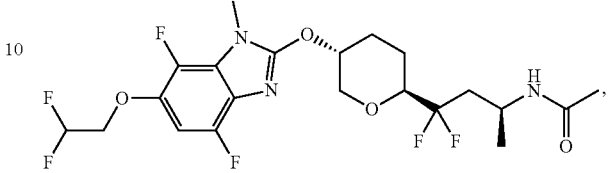
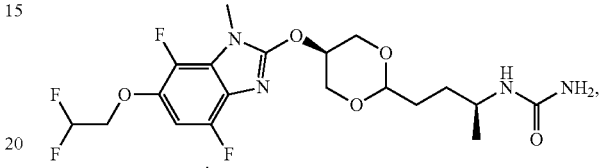
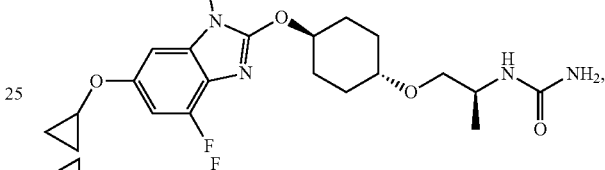
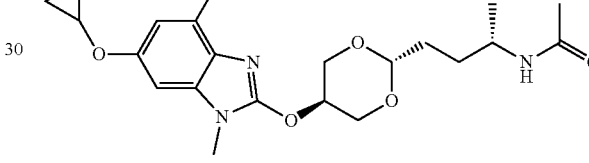
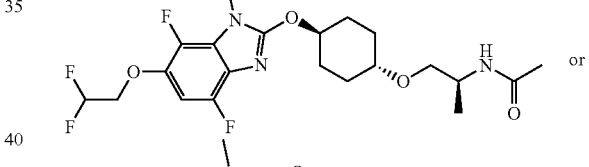

or a pharmaceutically acceptable salt thereof.

(9n)

The pharmaceutical composition according to the above item (1B), wherein the nonalcoholic fatty liver disease is nonalcoholic steatohepatitis (NASH).

(10B)

The pharmaceutical composition according to the above item (1B), wherein the nonalcoholic fatty liver disease is liver fibrosis caused by NASH.

(11B)

The pharmaceutical composition according to the above item (1B), wherein the nonalcoholic fatty liver disease is liver cirrhosis caused by NASH.

(12B)

The pharmaceutical composition according to the above item (1), wherein the nonalcoholic fatty liver disease is hepatocellular carcinoma (HCC) caused by NASH.

(13B)

The pharmaceutical composition according to the above item (1), which has no side effects of an increase in plasma triglyceride by administration of the pharmaceutical composition.

(14B)

The pharmaceutical composition according to the above item (13B), which has no side effects of cardiovascular disease by administration of the pharmaceutical composition.

(15B)

The pharmaceutical composition according to the above item (1), wherein insulin resistance is improved by administration of the pharmaceutical composition.

(16B)

The pharmaceutical composition according to the above item (1), which has no side effects of a decrease in platelet concentration by administration of the pharmaceutical composition.

Effect of the Invention

The pharmaceutical composition comprising a compound represented by Formula (I) or a pharmaceutically acceptable salt thereof of the present invention exhibits an excellent effect of being effective for treating and/or preventing fatty liver disease, particularly nonalcoholic fatty liver disease. In addition, the pharmaceutical composition has high safety without side effects such as an increase in plasma triglyceride or a decrease in platelet concentration. Furthermore, by combining the compound represented by Formula (I) of the present invention or a pharmaceutically acceptable salt thereof with other pharmaceutical compositions (for example, obeticholic acid or the like) having different mechanisms of action showing efficacy against nonalcoholic fatty liver disease, the compound or the pharmaceutically acceptable salt thereof exhibits a more excellent effect than when used alone.

MODE FOR CARRYING OUT THE INVENTION

Figure 1:
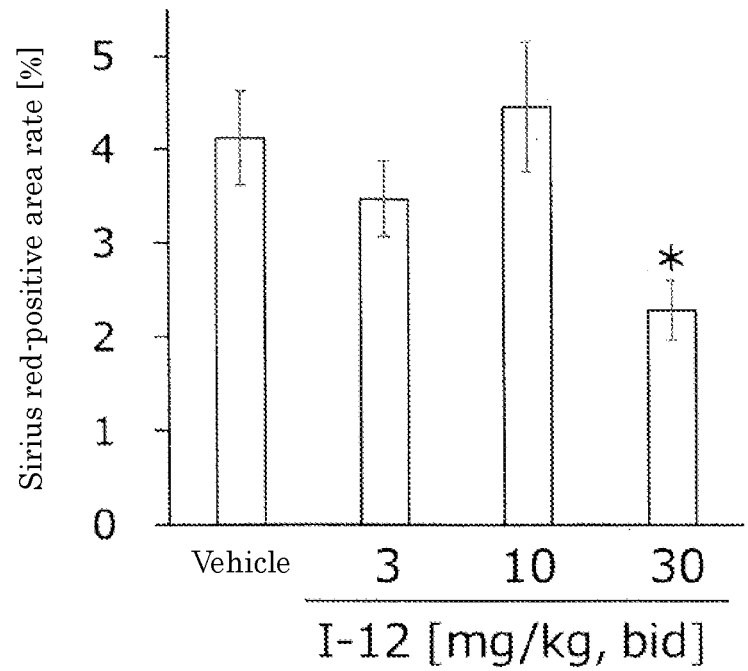
FIG. 1 shows a Sirius red-positive area rate when compound I-12 was administered to mice fed an ultra-high fat, choline-deficient, methionine-lowered diet.

The meaning of each term used in the present specification will be described below. Unless otherwise specified, each term is used in the same meaning when used alone or in combination with another term.

The term "consisting of" means having only components.

The term "comprising" means being not limited to the components, but not excluding elements that are not described.

Hereinafter, the present invention will be described with reference to embodiments. Throughout the present specification, an expression in a singular form should be understood as also including the concept of its plural form, unless otherwise stated. Therefore, singular articles (for example, "a", "an", "the", and the like in English) should be understood as also including the concept of their plural form, unless otherwise stated.

In addition, the terms used in the present specification should be understood as being used in the meanings commonly used in the art unless otherwise stated. Therefore, unless otherwise defined, all terminology and scientific terms used in the present specification have the same meanings as commonly understood by those skilled in the art to which the present invention belongs. If there is a contradiction, the present specification (including definitions) precedes.

The term "halogen" includes a fluorine atom, a chlorine atom, a bromine atom, and an iodine atom. In particular, a fluorine atom and a chlorine atom are preferable.

The term "alkyl" includes a linear or branched hydrocarbon group having 1 to 15 carbon atoms, preferably 1 to 10 carbon atoms, more preferably 1 to 6 carbon atoms, and still more preferably 1 to 4 carbon atoms. Examples thereof include methyl, ethyl, n-propyl, isopropyl, n-butyl, isobutyl, sec-butyl, tert-butyl, n-pentyl, isopentyl, neopentyl, n-hexyl, isohexyl, n-heptyl, isoheptyl, n-octyl, isooctyl, n-nonyl, and n-decyl.

A preferred embodiment of "alkyl" includes methyl, ethyl, n-propyl, isopropyl, n-butyl, isobutyl, sec-butyl, tert-butyl, and n-pentyl. A more preferred embodiment includes methyl, ethyl, n-propyl, isopropyl, and tert-butyl. A particularly preferred embodiment includes methyl.

The term "haloalkyl" includes means a group wherein one or more arbitrary hydrogen atoms of the above "alkyl" are substituted with the above "halogen". Examples thereof include monofluoromethyl, monofluoroethyl, monofluoropropyl, 2,2-difluoroethyl, 2,2,3,3,3-pentafluoropropyl, monochloromethyl, trifluoromethyl, trichloromethyl, 2,2,2-trifluoroethyl, 2,2,2-trichloroethyl, 1,2-dibromoethyl, and 1,1,1-trifluoropropan-2-yl.

The term "alkylcarbonyl" means a group wherein the above "alkyl" is bonded to a carbonyl group. Examples thereof include methylcarbonyl, ethylcarbonyl, propylcarbonyl, isopropylcarbonyl, tert-butylcarbonyl, isobutylcarbonyl, sec-butylcarbonyl, penthylcarbonyl, isopenthylcarbonyl, and hexylcarbonyl. A preferred embodiment of "alkylcarbonyl" includes methylcarbonyl, ethylcarbonyl, n-propylcarbonyl, and the like. A more preferred embodiment includes methylcarbonyl.

The term "aromatic carbocyclyl" means a cyclic aromatic hydrocarbon group that is monocyclic or bicyclic or more. Examples thereof include phenyl, naphthyl, anthryl, and phenanthryl.

A preferred embodiment of "aromatic carbocyclyl" includes phenyl.

The term "aromatic carbocycle" means a ring derived from the above "aromatic carbocyclyl".

The term "non-aromatic carbocyclyl" means a cyclic saturated hydrocarbon group or a cyclic unsaturated non-aromatic hydrocarbon group that is monocyclic or bicyclic or more. The "non-aromatic carbocyclyl" that is bicyclic or more also includes non-aromatic carbocyclyl that is monocyclic or bicyclic or more fused with a ring in the above "aromatic carbocyclyl".

Furthermore, the "non-aromatic carbocyclyl" also includes a cross-linked group or a group forming a spiro ring, as shown below.

[Chemical Formula 48]

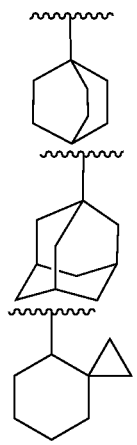

The non-aromatic carbocyclyl that is monocyclic has preferably 3 to 16 carbon atoms, more preferably 3 to 12 carbon atoms, further preferably 3 to 6 carbon atoms, and particularly preferably 3 to 4 carbon atoms. Examples thereof include cyclopropyl, cyclobutyl, cyclopentyl, cyclohexyl, cycloheptyl, cyclooctyl, cyclononyl, cyclodecyl, cyclopropenyl, cyclobutenyl, cyclopentenyl, cyclohexenyl, cycloheptenyl, and cyclohexadienyl.

The non-aromatic carbocyclyl that is bicyclic or more has preferably 8 to 20 carbon atoms, and more preferably 8 to 16 carbon atoms. Examples thereof include indanyl, indenyl, acenaphthyl, tetrahydronaphthyl, and fluorenyl.

The term "non-aromatic carbocycle" means a ring derived from the above "non-aromatic carbocyclyl".

The term "aromatic heterocyclyl" means an aromatic cyclic group that is monocyclic or bicyclic or more, having one or more same or different heteroatoms selected optionally from O, S, and N in the ring(s).

The aromatic heterocyclyl that is bicyclic or more also includes an aromatic heterocyclyl that is monocyclic or bicyclic or more fused with a ring in the above "aromatic carbocyclyl". The bond may be present on any of the rings.

The aromatic heterocyclyl that is monocyclic is preferably a 5- to 8-membered group, and more preferably a 5- or 6-membered group. Examples of the 5-membered aromatic heterocyclyl include pyrrolyl, imidazolyl, pyrazolyl, triazolyl, tetrazolyl, furyl, thienyl, isoxazolyl, oxazolyl, oxadiazolyl, isothiazolyl, thiazolyl, and thiadiazolyl. Examples of 6-membered aromatic heterocyclyl include pyridyl, pyridazinyl, pyrimidinyl, pyrazinyl, and triazinyl.

The aromatic heterocyclyl that is bicyclic is preferably an 8- to 10-membered group, and more preferably a 9- or 10-membered group. Examples thereof include indolyl, isoindolyl, indazolyl, indolizinyl, quinolinyl, isoquinolinyl, cinnolinyl, phthalazinyl, quinazolinyl, naphthyridinyl, quinoxalinyl, purinyl, pteridinyl, benzimidazolyl, benzisoxazolyl, benzoxazolyl, benzoxadiazolyl, benzisothiazolyl, benzothiazolyl, benzothiadiazolyl, benzofuryl, isobenzofuryl, benzothienyl, benzotriazolyl, imidazopyridyl, triazolopyridyl, imidazothiazolyl, pyrazinopyridazinyl, oxazolopyridyl, and thiazolopyridyl.

The aromatic heterocyclyl that is tricyclic or more is preferably a 13- to 15-membered group. Examples thereof include carbazolyl, acridinyl, xanthenyl, phenothiazinyl, phenoxathiinyl, phenoxazinyl, and dibenzofuryl.

The term "aromatic heterocycle" means a ring derived from the above "aromatic heterocyclyl".

The term "non-aromatic heterocyclyl" means a non-aromatic cyclic group that is monocyclic or bicyclic or more, having one or more same or different heteroatoms selected optionally from O, S, and N in the ring(s). The non-aromatic heterocyclyl that is bicyclic or more also includes a non-aromatic heterocyclyl that is monocyclic or bicyclic or more fused with each ring in the "aromatic carbocyclyl", the "non-aromatic carbocyclyl", and/or the "aromatic heterocyclyl" described above, and further non-aromatic carbocyclyl that is monocyclic or bicyclic or more fused with a ring in the above "aromatic heterocyclyl". The bond may be present on any of the rings.

Furthermore, the "non-aromatic heterocyclyl" also includes a cross-linked group or a group forming a spiro ring, as shown below.

[Chemical Formula 49]

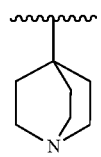

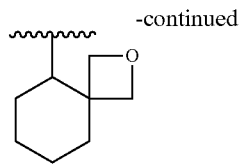

The non-aromatic heterocyclyl that is monocyclic is preferably a 3- to 8-membered group, and more preferably a 5- or 6-membered group.

Examples of the 3-membered non-aromatic heterocyclyl include thiiranyl, oxiranyl, and aziridinyl. Examples of the 4-membered non-aromatic heterocyclyl include oxetanyl and azetidinyl. Examples of the 5-membered non-aromatic heterocyclyl include oxathiolanyl, thiazolidinyl, pyrrolidinyl, pyrrolinyl, imidazolidinyl, imidazolinyl, pyrazolidinyl, pyrazolinyl, tetrahydrofuryl, dihydrothiazolyl, tetrahydroisothiazolyl, dioxolanyl, dioxolyl, and thiolanyl. Examples of the 6-membered non-aromatic heterocyclyl include dioxanyl, thianyl, piperidyl, piperazinyl, morpholinyl, morpholino, thiomorpholinyl, thiomorpholino, dihydropyridyl, tetrahydropyridyl, tetrahydropyranyl, dihydrooxazinyl, tetrahydropyridazinyl, hexahydropyrimidinyl, dioxazinyl, thiinyl, and thiazinyl. Examples of the 7-membered non-aromatic heterocyclyl include hexahydroazepinyl, tetrahydrodiazepinyl, and oxepanyl.

The non-aromatic heterocyclyl that is bicyclic or more is preferably an 8- to 20-membered group, and more preferably an 8- to 10-membered group. Examples thereof include indolinyl, isoindolinyl, chromanyl, and isochromanyl.

The term "non-aromatic heterocycle" means a ring derived from the above "non-aromatic heterocyclyl".

Fatty liver disease is a generic term for diseases in which neutral fat is accumulated in the liver to cause liver disorder. It has been said that alcohol is a cause in many cases before, but recently, the incidence of the disease is increasing in persons who do not have a drinking habit but have obesity, and the like. In spite of the absence of such a clear drinking history, a liver disorder characterized by hepatic fat deposition similar to alcoholic liver disorder in liver tissue findings is referred to as nonalcoholic fatty liver disease (NAFLD).

Nonalcoholic fatty liver disease (NAFLD) is a disease state in which fatty liver is observed in tissue diagnosis or image diagnosis and other liver diseases such as alcoholic liver disorder are excluded. NAFLD is characterized by accumulation of fat in hepatocytes and is often associated with some aspects of metabolic syndrome (for example, type 2 diabetes mellitus, insulin resistance, hyperlipidemia, and hypertension). A frequency of this disease is increasingly common due to consumption of carbohydrate-rich and high-fat diets. A subset of NAFLD patients develop nonalcoholic steatohepatitis (NASH).

NASH, a subtype of fatty liver disease, is a more severe disease state of NAFLD. It is characterized by inflammation that ultimately leads to macrovesicular steatosis, balloon degeneration of hepatocytes, and/or scarring (namely, fibrosis) of the liver. In patients diagnosed with NASH, NASH progresses to an advanced stage of liver fibrosis and ultimately liver cirrhosis. Current treatment for patients with end-stage cirrhotic NASH is liver transplantation.

Liver fibrosis is an excessive accumulation of extracellular matrix proteins, including collagen, that occurs in most types of chronic liver disease. Advanced liver fibrosis leads to liver cirrhosis, liver failure, and portal hypertension and often requires liver transplantation.

When liver fibrosis progresses, a periphery of hepatocytes is surrounded by fibrosis, and liver cirrhosis occurs. When liver cirrhosis progresses, symptoms such as edema, ascites, and jaundice appear, and when a lesion of the digestive tract such as esophagogastric varices co-occurs, hematemesis and the like may occur. In addition, as liver fibrosis progresses, liver cancer is more likely to occur.

Hepatocellular carcinoma is the most common of cancers derived from the liver, and usually occurs in patients with severe scars (liver cirrhosis) in the liver. Patients with advanced liver fibrosis and liver cirrhosis are reported to develop liver cancer with a frequency of 5 to 30% within 5 years.

Alcoholic liver disease (ALD) includes a wide range of diseases such as alcoholic fatty liver (AFL), alcoholic steatohepatitis (ASH), severe alcoholic hepatitis (SAH), alcoholic liver fibrosis, and liver cirrhosis.

The compound according to the present invention has an excellent ACC2-selective inhibitory action, and therefore, is also useful as a therapeutic and/or preventive agent for ALD.

Preferred embodiments of $R^1$, $R^2$, $R^3$, $R^4$, $R^5$, $L^1$, and ring A in the compound represented by Formula (I) are described below. Examples of the compound represented by Formula (I) include embodiments of all combinations of specific examples described below.

$R^1$ is haloalkyl or non-aromatic carbocyclyl.
$R^1$ is preferably non-aromatic carbocyclyl.
$R^1$ is more preferably non-aromatic carbocyclyl that is monocyclic, and particularly preferably cyclopropyl or cyclobutyl.
Another preferred embodiment of $R^1$ includes preferably 2,2-difluoroethyl.
$R^2$ is a hydrogen atom or halogen.
$R^2$ is preferably a hydrogen atom or a fluorine atom.
$R^2$ is more preferably a hydrogen atom.
$R^3$ is halogen.
$R^3$ is preferably a fluorine atom or a chlorine atom.
$R^3$ is more preferably a fluorine atom.
$R^4$ is alkyl or haloalkyl.
$R^4$ is preferably alkyl.
$R^4$ is more preferably methyl.
Another preferred embodiment of $R^4$ includes preferably monofluoromethyl.
$R^5$ is alkylcarbonyl or carbamoyl.
$R^5$ is preferably methylcarbonyl or carbamoyl.
The ring A is a group represented by the formula:

[Chemical Formula 50]

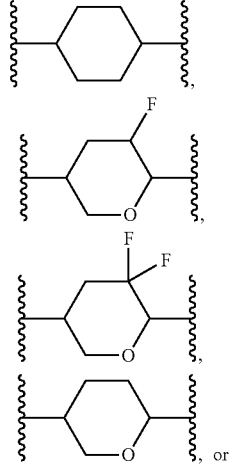

-continued

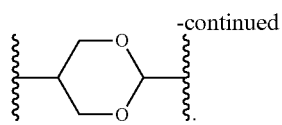

The ring A is preferably a group represented by the formula:

[Chemical Formula 51]

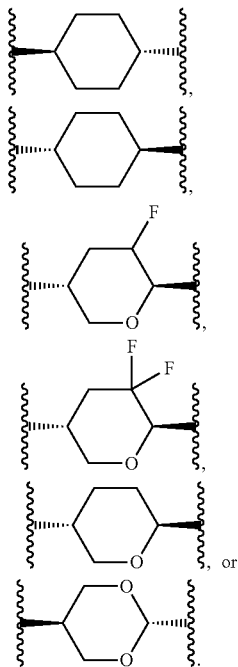

The ring A is more preferably a group represented by the formula:

[Chemical Formula 52]

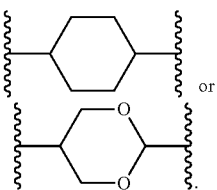

The ring A is further preferably a group represented by the formula:

[Chemical Formula 53]

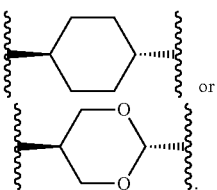

-L$^1$- is —O—(CH$_2$)—, —(CH$_2$)$_2$—, —(CH$_2$)—(CF$_2$)— or —(CF$_2$)—(CH$_2$)— wherein a left bond is attached to the ring A and a right bond is attached to a group represented by the formula:

[Chemical Formula 54]

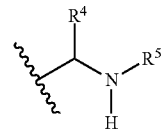

-1L$^1$- is preferably —O—(CH$_2$)— or —(CH$_2$)$_2$—.

The compound represented by Formula (I) is particularly preferably a compound shown below or a pharmaceutically acceptable salt thereof.

[Chemical Formula 55]

I-1

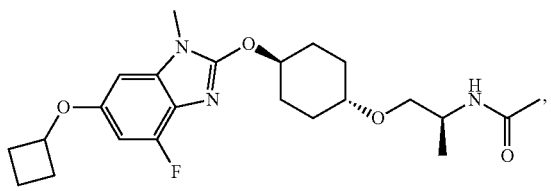

I-2

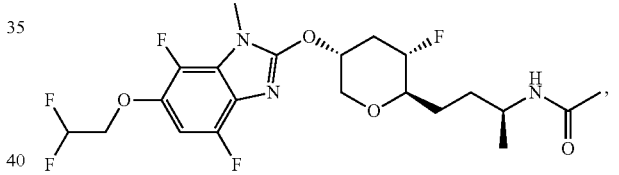

I-3

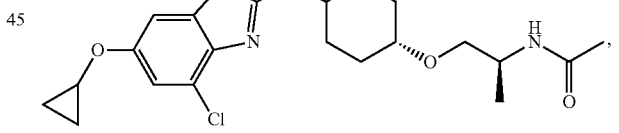

I-4

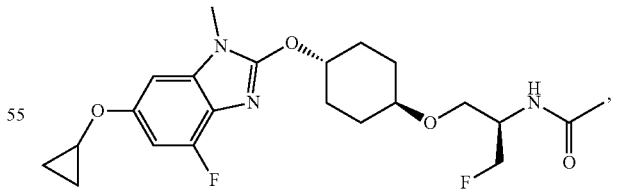

I-5

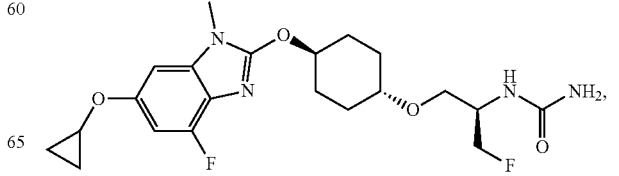

-continued

I-6
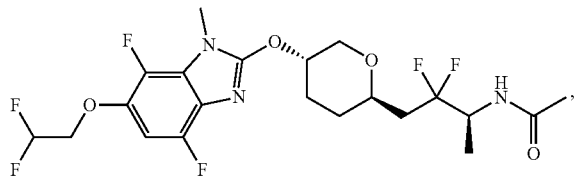

I-7
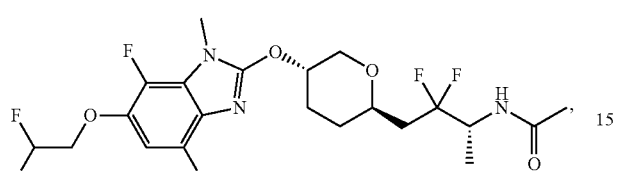

I-8
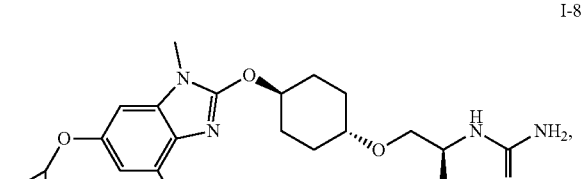

I-9
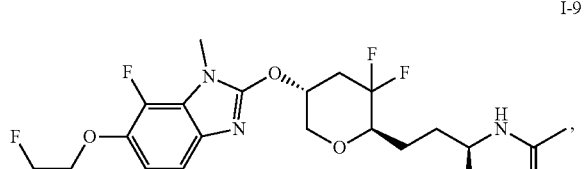

I-10
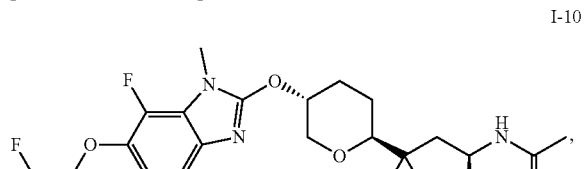

I-11
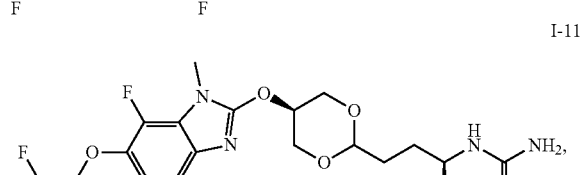

I-12
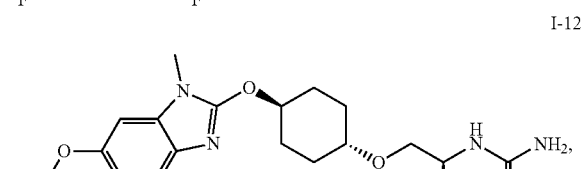

I-13
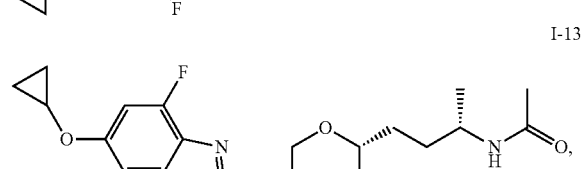

-continued

I-14
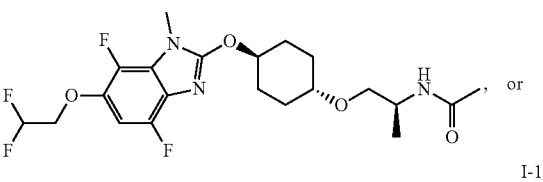

or

I-15
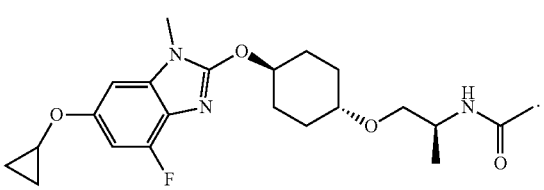

The pharmaceutical composition for treating and/or preventing nonalcoholic fatty liver disease of the present invention is characterized by being a pharmaceutical composition comprising a compound represented by Formula (I):

[Chemical Formula 56]

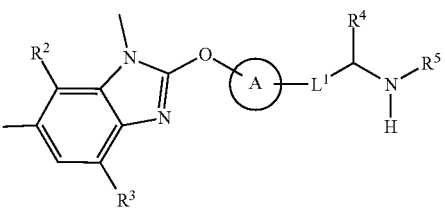

(I)

wherein each symbol has the same meaning as described above,
or a pharmaceutically acceptable salt thereof, as an active ingredient.

The compound having an ACC2 inhibitory action used in the present invention is the compound represented by Formula (I), a pharmaceutically acceptable salt thereof, or a solvate thereof.

The compound represented by Formula (I) can be synthesized according to a known method, for example, the methods described in International Publication WO 2015/056782 A and International Publication WO 2016/159082 A.

The compound represented by Formula (I) is not limited to specific isomers, but includes all possible isomers (e.g., keto-enol isomers, imine-enamine isomers, diastereoisomers, optical isomers, rotamers, or the like), racemates, or mixtures thereof.

One or more hydrogen, carbon, and/or other atoms in the compound represented by Formula (I) may be substituted with isotopes of hydrogen, carbon, and/or other atoms, respectively. Examples of such an isotope include hydrogen, carbon, nitrogen, oxygen, phosphorus, sulfur, fluorine, iodine, and chlorine such as $^2H$, $^3H$, $^{11}C$, $^{13}C$, $^{14}C$, $^{15}N$, $^{18}O$, $^{17}O$, $^{31}P$, $^{32}P$, $^{35}S$, $^{18}F$, $^{123}I$, and $^{36}Cl$. The compound represented by Formula (I) also includes a compound substituted with such an isotope. The compound substituted with the isotope is also useful as a pharmaceutical product and includes all radiolabeled forms of the compound represented by Formula (I). Furthermore, a "radiolabeling method" for production of the "radiolabeled form" is also included in the present invention, and the "radiolabeled form" is useful as a tool for metabolic pharmacokinetic studies and for research and/or diagnosis in binding assay.

The radiolabeled form of the compound represented by Formula (I) can be prepared by a method well known in the art. For example, a tritium-labeled compound represented by Formula (I) can be prepared by introducing tritium into a specific compound represented by Formula (I) by catalytic dehalogenation reaction using tritium. This method includes reacting an appropriately halogenated precursor of the compound represented by Formula (I) with tritium gas in the presence of an appropriate catalyst, such as Pd/C, and in the presence or absence of a base. Regarding other appropriate methods for preparing a tritium-labeled compound, "Isotopes in the Physical and Biomedical Sciences, Vol. 1, Labeled Compounds (Part A), Chapter 6 (1987)" can be referred to. A $^{14}C$-labeled compound can be prepared by using a raw material having $^{14}C$ carbon.

Examples of the pharmaceutically acceptable salt of the compound represented by Formula (I) include salts of the compound represented by Formula (I) with alkali metals (e.g., lithium, sodium, potassium, and the like), alkaline earth metals (e.g., calcium, barium, and the like), magnesium, transition metals (e.g., zinc, iron, and the like), ammonia, organic bases (e.g., trimethylamine, triethylamine, dicyclohexylamine, ethanolamine, diethanolamine, triethanolamine, meglumine, ethylenediamine, pyridine, picoline, quinoline, and the like), and amino acids, or salts of the compound represented by Formula (I) with inorganic acids (e.g., hydrochloric acid, sulfuric acid, nitric acid, carbonic acid, hydrobromic acid, phosphoric acid, hydroiodic acid, and the like), and organic acids (e.g., formic acid, acetic acid, propionic acid, trifluoroacetic acid, citric acid, lactic acid, tartaric acid, oxalic acid, maleic acid, fumaric acid, succinic acid, mandelic acid, glutaric acid, malic acid, benzoic acid, phthalic acid, ascorbic acid, benzenesulfonic acid, p-toluenesulfonic acid, methanesulfonic acid, ethanesulfonic acid, trifluoroacetic acid, and the like). These salts can be formed by a conventional method.

The compound represented by Formula (I) of the present invention or a pharmaceutically acceptable salt thereof may form a solvate (e.g., a hydrate), a cocrystal, and/or a crystal polymorph. The present invention also includes such various solvates, cocrystals, and crystal polymorphs. The "solvate" may be one wherein any number of solvent molecules (e.g., water molecules or the like) is coordinated with the compound represented by Formula (I). When the compound represented by Formula (I) or a pharmaceutically acceptable salt thereof is allowed to stand in the atmosphere, the compound may absorb water, resulting in attachment of adsorbed water or formation of a hydrate. Recrystallization of the compound represented by Formula (I) or a pharmaceutically acceptable salt thereof may form a crystal polymorph. The term "cocrystal" means that the compound represented by Formula (I) or a salt and a counter molecule are present in the same crystal lattice, and may contain any number of counter molecules.

The compound represented by Formula (I) of the present invention or a pharmaceutically acceptable salt thereof may form a prodrug. The present invention also includes such various prodrugs. The prodrug is a derivative of the compound of the present invention having a chemically or metabolically degradable group, and is a compound that becomes a pharmaceutically active compound of the present invention by solvolysis or under physiological conditions in vivo. The prodrug includes, for example, a compound that is converted to the compound represented by Formula (I) through enzymatic oxidation, reduction, hydrolysis, or the like under physiological conditions in vivo, and a compound that is converted to the compound represented by Formula (I) through hydrolysis by gastric acid or the like. Methods for selecting and producing an appropriate prodrug derivative are described in, for example, "Design of Prodrugs, Elsevier, Amsterdam, 1985". The prodrug may have activity in itself.

The compound according to the present invention has an excellent ACC2-selective inhibitory action, and therefore, is useful as a therapeutic and/or preventive agent for fatty liver disease, particularly nonalcoholic fatty liver disease. The nonalcoholic fatty liver disease is not limited to nonalcoholic steatohepatitis (NASH), and is also useful as a therapeutic and/or preventive agent for liver fibrosis, liver cirrhosis, or hepatocellular carcinoma (HCC) caused by NASH.

Furthermore, the compound of the present invention has usefulness as a pharmaceutical composition, and preferably has any one or a plurality of the following excellent features.

a) Inhibitory action against CYP enzymes (e.g., CYP1A2, CYP2C9, CYP2C19, CYP2D6, and CYP3A4) is weak.
b) Satisfactory pharmacokinetics such as high bioavailability and moderate clearance are exhibited.
c) Metabolic stability is high.
d) Irreversible inhibitory action is not exhibited against CYP enzymes (e.g., CYP3A4) within the concentration range of the measurement conditions described in the present specification.
e) Mutagenicity is not exhibited.
f) The cardiovascular risk is low.
g) High solubility is exhibited.
h) Having no side effects of an increase in plasma triglyceride.
i) Having no side effects of cardiovascular disease.
j) Insulin resistance is improved.
k) Having no side effects of a decrease in platelet concentration.
l) By combining the compound of the present invention with other pharmaceutical compositions (for example, obeticholic acid or the like) having different mechanisms of action showing efficacy against nonalcoholic fatty liver disease, the compound exhibits a more excellent effect than when used alone, and further the dose of the compound can be reduced.

The pharmaceutical composition of the present invention can be administered orally or parenterally. Examples of a method of parenteral administration include dermal, subcutaneous, intravenous, intraarterial, intramuscular, intraperitoneal, transmucosal, inhalation, transnasal, ophthalmic, inner ear, or vaginal administration.

In the case of oral administration, the pharmaceutical composition may be prepared into any dosage form that is commonly used, such as a solid preparation for internal use (e.g., a tablet, a powder, a granule, a capsule, a pill, a film, or the like) or a liquid preparation for internal use (e.g., a suspension, an emulsion, an elixir, a syrup, a lemonade, a spirit, an aromatic water, an extract, a decoction, a tincture, or the like), and administered. The tablet may be a sugar-coated tablet, a film-coated tablet, an enteric-coated tablet, a sustained-release tablet, a troche tablet, a sublingual tablet, a buccal tablet, a chewable tablet, or an orally disintegrating tablet; the powder and the granule may be a dry syrup; and the capsule may be a soft capsule, a micro capsule, or a sustained-release capsule.

In the case of parenteral administration, the pharmaceutical composition can be suitably administered in any dosage form that is commonly used, such as an injection, an infusion, or a preparation for external use (e.g., an eye drop, a nasal drop, an ear drop, an aerosol, an inhalant, a lotion, an impregnating agent, a liniment, a gargling agent, an enema, an ointment, a plaster, a jelly, a cream, a patch, a poultice, a powder for external use, a suppository, or the like). The injection may be an emulsion of O/W, W/O, O/W/O, W/G/W type, or the like.

An effective amount of the compound of the present invention can be mixed, if necessary, with various pharmaceutical additives, such as an excipient, a binder, a disintegrant, and a lubricant, suitable for the dosage form to prepare a pharmaceutical composition. The pharmaceutical composition can be further prepared as a pharmaceutical composition for children, the elderly, patients with serious conditions, or operation by appropriately changing the effective amount of the compound of the present invention, the dosage form, and/or various pharmaceutical additives. For example, the pharmaceutical composition for children may be administered to patients who are neonates (younger than 4 weeks old after the birth), infants (4 weeks old to younger than 1 year old after the birth), infant children (1 year old or older and younger than 7 years old), children (7 years old or older and younger than 15 years old), or 15 to 18 years old. For example, the pharmaceutical composition for the elderly may be administered to patients who are 65 years old or older.

The dose of the pharmaceutical composition of the present invention is desirably set in consideration of the age or body weight of a patient, the type or severity of a disease, an administration route, and the like. In the case of oral administration, the dose is within a range of usually 0.05 to 100 mg/kg/day, preferably 0.1 to 10 mg/kg/day. Although varying depending on the administration route, the dose in the case of parenteral administration is within a range of usually 0.005 to 10 mg/kg/day, preferably 0.01 to 1 mg/kg/day. The dosage may be administered once to several times a day.

The compound represented by Formula (I):

[Chemical Formula 57]

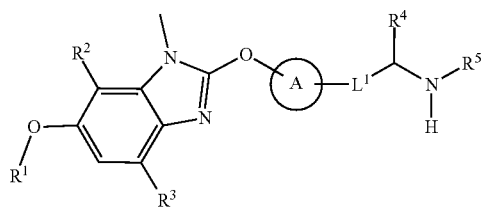

(I)

wherein each symbol has the same meaning as described above, of the present invention or a pharmaceutically acceptable salt thereof can be used in combination with an FXR agonist, a GLP1 receptor agonist, a THβ receptor agonist, an MGAT2 inhibitor, a DGAT inhibitor, a PPAR agonist, FGF21, and a drug obtained by modifying FGF21, for the purpose of enhancing the action of the compound, reducing the dose of the compound, or the like. For example, the compound can be used in combination with at least one compound selected from the group consisting of obeticholic acid, semaglutide, and resmetirom or a pharmaceutically acceptable salt thereof (hereinafter referred to as a concomitant drug). In this case, timing of administration of the compound of the present invention and the concomitant drug is not limited, and these may be administered to a subject simultaneously or continuously, or at regular intervals. Furthermore, the compound of the present invention and the concomitant drug may be administered as two or more preparations containing each active ingredient, or may be administered as a single preparation containing their active ingredients.

The compound represented by Formula (I) is particularly preferably a compound shown below or a pharmaceutically acceptable salt thereof.

[Chemical Formula 58]

I-1

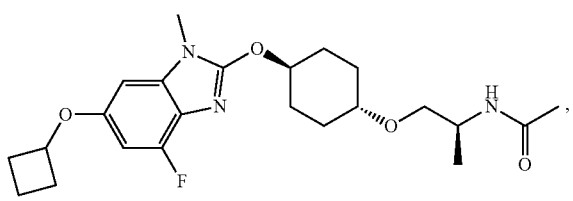

I-2

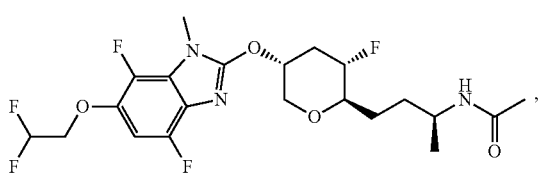

I-3

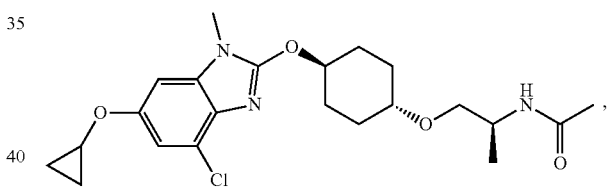

I-4

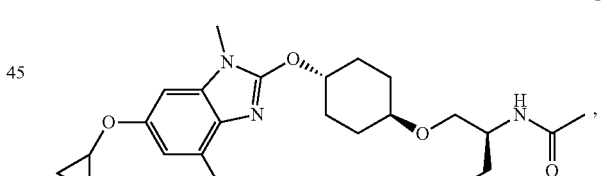

I-5

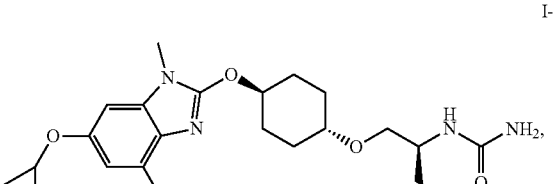

I-6

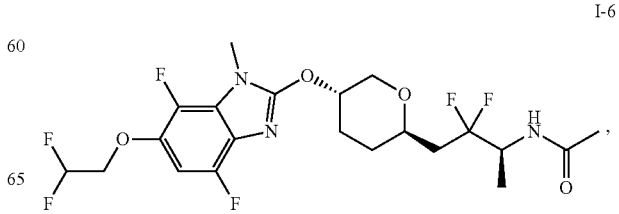

I-7

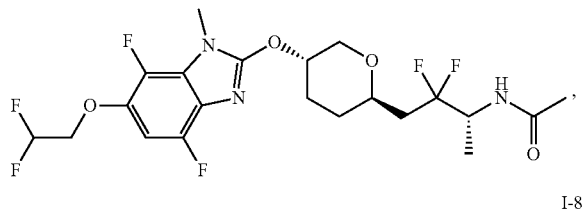

I-8

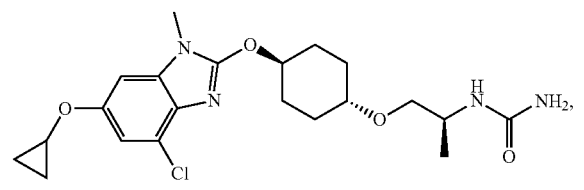

I-9

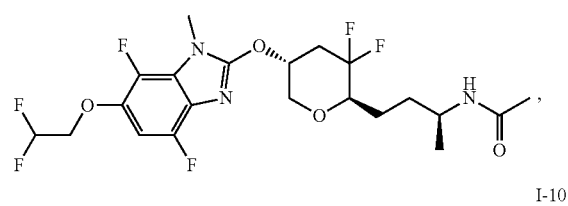

I-10

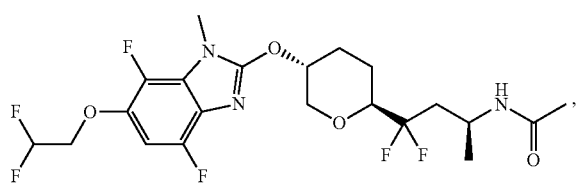

I-11

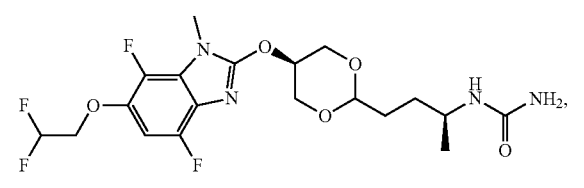

I-12

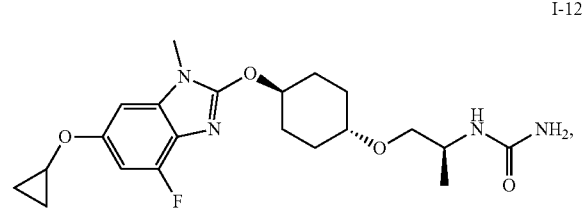

I-13

I-14

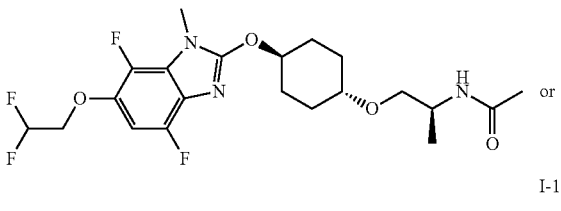

or

I-15

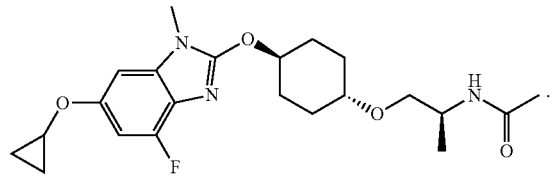

The dose of the concomitant drug can be appropriately selected on the basis of the clinically used dose. Furthermore, the mixing ratio of the compound of the present invention and the concomitant drug can be appropriately selected in consideration of the subject of administration, administration route, target diseases, symptoms, combinations, and the like. For example, when the subject of administration is human, the concomitant drug may be used in a range of 0.01 to 100 parts by weight with respect to 1 part by weight of the compound of the present invention.

Obeticholic acid is a semisynthetic bile acid and an agonist for a nuclear receptor, farnesoid X receptor (FXR). The chemical structural formula of obeticholic acid is shown below.

[Chemical Formula 59]

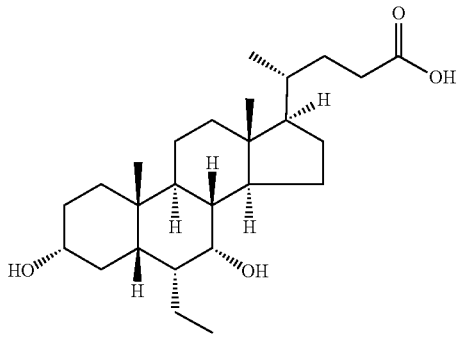

In Europe and the United States, obeticholic acid has already been marketed as a therapeutic agent for primary biliary cholangitis. In addition, development for an indication of nonalcoholic fatty liver disease (NAFLD) such as nonalcoholic steatohepatitis (NASH) is also in progress.

Semaglutide is a human glucagon-like peptide-1 (GLP-1) analog and has already been marketed as a therapeutic agent for type 2 diabetes. In addition, a subcutaneous injection for an indication of nonalcoholic steatohepatitis (NASH) has been developed.

Resmetirom is a small molecule compound having a thyroid hormone receptor β (THR-β)-selective agonist action. The chemical structural formula of resmetirom is shown below.

[Chemical Formula 60]

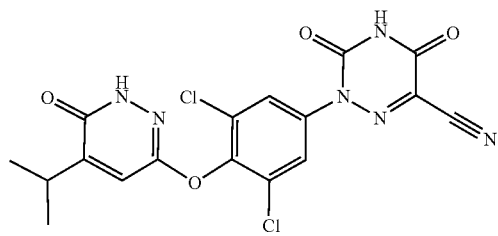

In Europe and the United States, development for an indication of nonalcoholic steatohepatitis (NASH) and the like is in progress.

EXAMPLES

Hereinafter, the present invention will be described in more detail with reference to Examples and Test Examples, but the present invention is not limited thereto.

Preparation Example 1: Preparation of Recombinant Human ACC2

A cDNA encoding human ACC2 protein (27 amino acid residues to 2458 amino acid residues from the N-terminus) was cloned from a human kidney cDNA library (Clontech Laboratories, Inc.), a His-tag sequence was introduced at the 5' end, and then inserted into pFastBac1 (Invitrogen). A recombinant baculovirus was produced in accordance with the protocol for a Bac-to-Bac baculovirus expression system (Invitrogen), and Sf-9 cells were infected therewith to express human ACC2 protein. The recovered cells were crushed, filtered through a filter, and then subjected to Ni affinity chromatography and anion exchange chromatography. Fractions containing human ACC2 protein were collected to obtain recombinant human ACC2.

Preparation Example 2: Preparation of Recombinant Human ACC1

A cDNA encoding human ACC1 protein (1 amino acid residue to 2346 amino acid residues from the N-terminus) was cloned from a human liver cDNA library (BioChain Institute Inc.), myc tag and His-tag sequences were introduced at the 3' end, and then inserted into pIEXBAC3 (Novagen). A recombinant baculovirus was produced in accordance with the protocol for FlashBACGOLD (Oxford Expression Technologies Ltd.), and Sf-9 cells were infected therewith to express human ACC1 protein. The recovered cells were crushed, filtered through a filter, and then subjected to Ni affinity chromatography and anion exchange chromatography. Fractions containing human ACC1 protein were collected to obtain recombinant human ACC1.

Test Example 1: Measurement of Inhibitory Activity of Human ACC1 and ACC2

The recombinant human ACC1 and the recombinant human ACC2 obtained from the above Preparation Examples were preincubated in an assay buffer (50 mM HEPES-KOH (pH 7.4), 10 mM magnesium chloride, 6 to 10 mM potassium citrate, 4 mM reduced glutathione, and 1.5 mg/ml bovine serum albumin) for 1 hour. Then, 5 µL of the pre-incubated enzyme solution and 5 µL of a substrate solution (50 mM HEPES-KOH (pH 7.4), 1 mM ATP, 0.8 mM acetyl-CoA, and 25 to 50 mM potassium bicarbonate) were added to a 384-well microplate into which 0.2 µL of each of solutions of the compound of the present invention (DMSO) had been dispensed, and the mixture was centrifuged and shaken, and then incubated in a wet box at room temperature for 1 to 3 hours. After incubation, the enzymatic reaction was stopped by addition of EDTA, and then the compound was co-crystallized with an α-cyano-4-hydroxy cinnamic acid (CHCA) matrix on a MALDI target plate, and measurement was performed in a reflector negative mode using a matrix-assisted laser desorption ionization-time-of-flight mass spectrometer (MALDI-TOF MS). Deprotonated ions of the substrate acetyl-CoA (AcCoA) and the reaction product malonyl-CoA (MalCoA) were detected, and the intensity of each signal was used to calculate a conversion rate to malonyl-CoA or succinyl-CoA, i.e., intensity of [MalCoA-H]-/(intensity of [MalCoA-H]-+intensity of [AcCoA-H]-). A 50% inhibitory concentration (IC50 value) was calculated from the inhibition rate of the enzyme reaction at each compound concentration. The potassium citrate concentration in the assay buffer, the potassium bicarbonate concentration in the substrate solution, and the incubation time were adjusted within the above concentrations or reaction times for each lot of the enzyme to be used.

Results of Test Example 1 are shown below.

TABLE 1

| Compound No. | IC50 [µM] | |
|---|---|---|
| | hACC1 | hACC2 |
| I-1 | 0.32 | 0.0051 |
| I-2 | 2.4 | 0.01 |
| I-3 | 2.8 | 0.0066 |
| I-4 | 2.7 | 0.0047 |
| I-5 | 6.9 | 0.0089 |
| I-6 | 0.92 | 0.012 |
| I-7 | 25 | 0.18 |
| I-8 | 6.2 | 0.017 |
| I-9 | 2.6 | 0.013 |
| I-10 | >100 | 0.089 |
| I-11 | 7 | 0.0096 |
| I-12 | 6.9 | 0.0056 |
| I-13 | 0.91 | 0.0066 |
| I-14 | 2.7 | 0.0066 |
| I-15 | 1.7 | 0.0038 |

Test Example 2: Metabolic Stability Test

Commercially available pooled human liver microsomes were reacted with the compound of the present invention for a given time. A residual rate was calculated by comparison between the reacted sample and the unreacted sample to evaluate a degree at which the compound of the present invention is metabolized in the liver.

The compound was reacted at 37° C. for 0 minutes or 30 minutes in the presence of 1 mmol/L NADPH in 0.2 mL of a buffer (50 mmol/L Tris-HCl pH 7.4, 150 mmol/L potassium chloride, and 10 mmol/L magnesium chloride) containing 0.5 mg protein/mL of the human liver microsomes (oxidative reaction). After the reaction, 50 µL of the reaction solution was added to 100 µL of a solution of methanol/acetonitrile=1/1 (v/v) and mixed, and the mixture was centrifuged at 3000 rpm for 15 minutes. The compound of the present invention in the centrifuged supernatant was quantified by LC/MS/MS or solid-phase extraction (SPE)/MS. The amount of the compound of the present invention remained after the reaction was calculated with the amount of the compound at 0 minutes of the reaction defined as 100%.

Results of Test Example 2 are shown below.

TABLE 2

| Compound | Amount of compound remained [%] | |
|---|---|---|
| No. | Human | Rat |
| I-3 | 80.3 | 82.6 |
| I-4 | 93.4 | 87.3 |
| I-5 | 98.9 | 83.4 |
| I-6 | 93.2 | 74 |
| I-7 | 89.1 | 74.7 |
| I-8 | 83.6 | 85.4 |
| I-11 | 95.8 | 94.5 |
| I-12 | 83.3 | 85.5 |
| I-13 | 95.4 | 87 |
| I-14 | 94.8 | 78 |
| I-15 | 80.2 | 76.2 |

Test Example 3: Tissue Distribution Test

To 8-week-old male Crl:CD (SD) rats, the compound of the present invention was intravenously administered at a dose of 0.5 mg/mL/kg under non-fasted conditions, and 30 minutes after administration, the rats were killed by exsanguination through whole blood collection from the abdominal aorta under anesthesia. Then, the liver and muscles were removed, and a 25% homogenate was prepared with distilled water. The obtained blood was centrifuged, and plasma was then obtained. Then, control plasma and control tissue homogenate were added to the tissue homogenate sample and the plasma sample, respectively, at 1:1, and each sample was measured using LC/MS/MS. The measured area ratio (tissue/plasma) obtained was used as a tissue Kp value. For compound I-12, the value was 6.10 in the liver and 1.29 in muscles, and for compound I-13, the value was 4.06 in the liver and 0.918 in muscles. Therefore, the compound of the present invention has a property of being distributed in the liver and muscles in vivo.

Test Example 4: Test for Evaluating Malonyl-CoA Concentration in Liver and Muscles Eight-week-old male BKS.Cg-+Lepr$^{db}$/+Lepr$^{db}$/Jcl mice were fasted for 4 hours, then the compound of the present invention was orally administered at a dose of 0.3 to 6 mg/5 mL/kg, and 2 hours after administration, the mice were killed by exsanguination through whole blood collection from the abdominal vena cava under anesthesia. Then, the liver and muscles were removed, and a 9% homogenate was prepared in a homogenizing buffer (distilled water: 60% perchloric acid: 85% phosphoric acid=43:5:2). The malonyl-CoA concentration in the tissue was quantified by LC/MS/MS. Both compound I-12 and compound I-13 reduced malonyl-CoA concentrations in the liver and muscles in a compound dose-dependent manner.

TABLE 3

| Compound | Dose | Malonyl-CoA concentration [%] in organ with malonyl-CoA concentration in vehicle administration group defined as 100% | |
|---|---|---|---|
| No. | [mg/kg] | Liver | Muscle |
| I-12 | Vehicle administration | 100 | 100 |
| | 0.67 | 92.8 | 70.8 |
| | 2 | 91.1 | 59.5 |
| | 6 | 84.0 | 56.4 |

TABLE 3-continued

| Compound | Dose | Malonyl-CoA concentration [%] in organ with malonyl-CoA concentration in vehicle administration group defined as 100% | |
|---|---|---|---|
| No. | [mg/kg] | Liver | Muscle |
| I-13 | Vehicle administration | 100 | 100 |
| | 0.3 | 90.9 | 72.8 |
| | 1 | 86.5 | 64.9 |
| | 3 | 79.9 | 58.4 |

Test Example 5: Effect on Liver Fibrosis Progression in Mice Fed Ultra-High Fat, Choline-Deficient, Methionine-Lowered Diet Six-week-old male C57BL/6JJcl mice were fed an ultra-high fat, choline-deficient, methionine-lowered diet (60 kcal % fat content, using lard, choline-deficient, methionine-lowered (0.1%)), and at the same time, the compound of the present invention was suspended in a vehicle (0.5% methylcellulose aqueous solution) so as to have a dose of 3 to 45 mg/kg/10 mL, and orally repeatedly administered (b.i.d.) for 8 weeks. Blood was collected from the tail vein during the repeated administration period, and biochemical parameters in plasma were measured. After 8 weeks of administration, blood was collected from the abdominal vena cava under anesthesia, and then the liver was collected. Paraffin-embedded sections prepared from the collected liver were subjected to Sirius red staining. A degree of fibrosis progression in the liver was determined from a Sirius red-positive area rate and evaluated.

A Sirius red-positive area rate of compound I-12 at a dose of 30 mg/kg was significantly lower than that of the vehicle administration group. Results are shown in FIG. 1 and Table 4.

TABLE 4

| Administration group | Sirius red-positive area rate (%) |
|---|---|
| Vehicle | 4.12 ± 0.50 |
| I-12 (3 mg/kg, bid) | 3.47 ± 0.41 |
| I-12 (10 mg/kg, bid) | 4.46 ± 0.69 |
| I-12 (30 mg/kg, bid) | 2.29 ± 0.32* |

Data: mean ± standard error
*p < 0.05 vs vehicle administration group (Dunnett's test)

Figure 2:
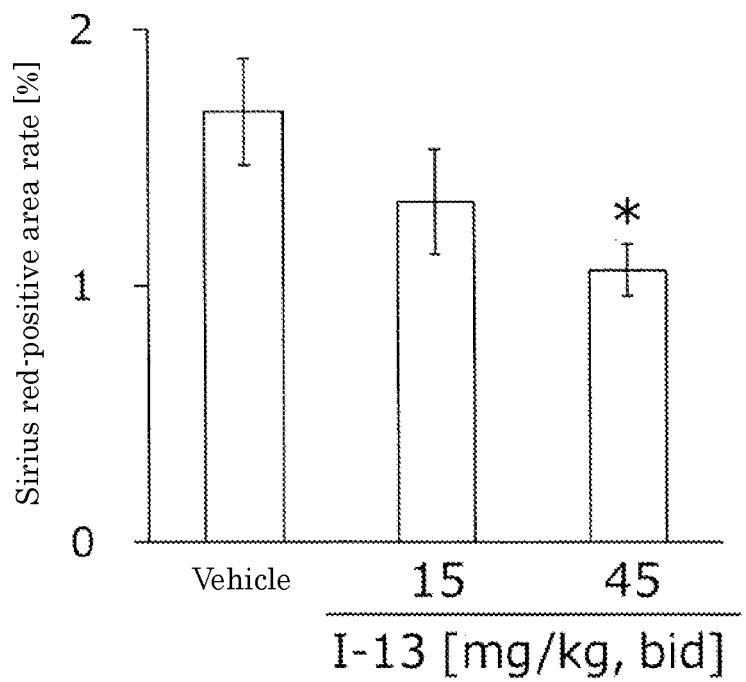
FIG. 2 shows a Sirius red-positive area rate when compound I-13 was administered to mice fed an ultra-high fat, choline-deficient, methionine-lowered diet.

A Sirius red-positive area rate of compound I-13 at a dose of 45 mg/kg was significantly lower than that of the vehicle administration group. Results are shown in FIG. 2 and Table 5.

TABLE 5

| Administration group | Sirius red-positive area rate (%) |
|---|---|
| Vehicle | 1.68 ± 0.21 |
| I-13 (15 mg/kg, bid) | 1.33 ± 0.20 |
| I-13 (45 mg/kg, bid) | 1.06 ± 0.10* |

Data: mean ± standard error
*p < 0.05 vs vehicle administration group (Dunnett's test)

Figure 3:
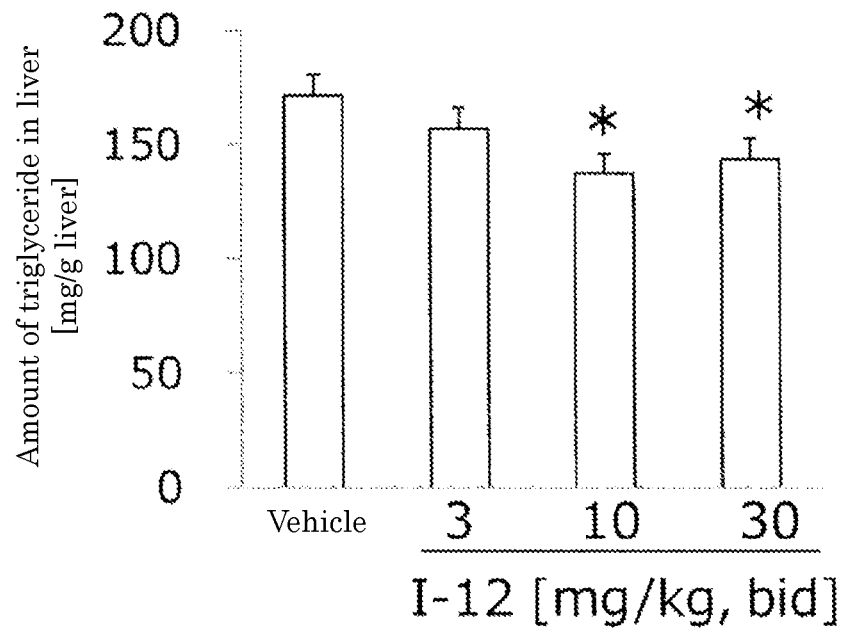
FIG. 3 shows an amount of triglyceride in the liver when compound I-12 was administered to mice fed an ultra-high fat, choline-deficient, methionine-lowered diet.
Figure 4:
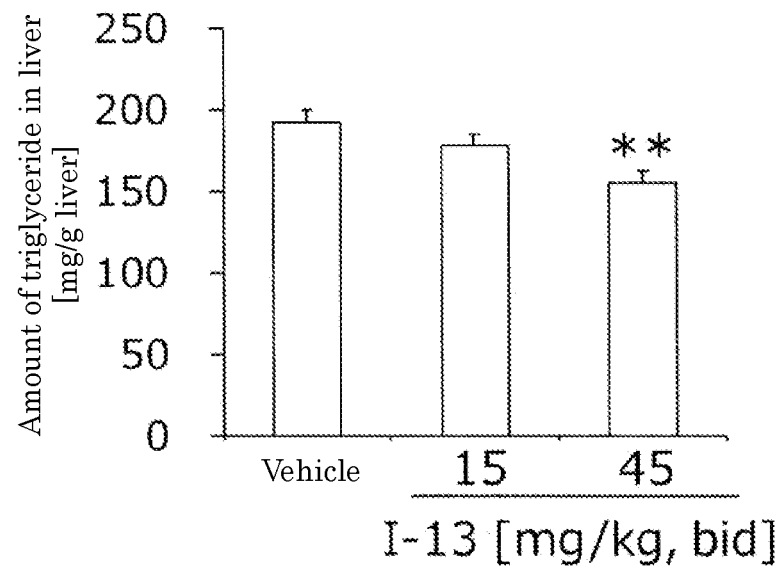
FIG. 4 shows an amount of triglyceride in the liver when compound I-13 was administered to mice fed an ultra-high fat, choline-deficient, methionine-lowered diet.

An amount of triglyceride in the liver of compound I-12 at a dose of 10 or 30 mg/kg and an amount of triglyceride in the liver of compound I-13 at a dose of 45 mg/kg were significantly lower than that of the vehicle administration group. Results are shown in FIGS. 3 and 4 and Tables 6 and 7.

TABLE 6

| Administration group | Amount of triglyceride in liver (mg/g tissue) |
|---|---|
| Vehicle | 172 ± 8.9 |
| I-12 (3 mg/kg, bid) | 157 ± 7.3 |
| I-12 (10 mg/kg, bid) | 137 ± 7.2* |
| I-12 (30 mg/kg, bid) | 144 ± 7.5* |

Data: mean ± standard error
*p < 0.05 vs vehicle administration group (Dunnett's test)

TABLE 7

| Administration group | Amount of triglyceride in liver (mg/g tissue) |
|---|---|
| Vehicle | 193 ± 7.5 |
| I-13 (15 mg/kg, bid) | 179 ± 6.8 |
| I-13 (45 mg/kg, bid) | 155 ± 7.1** |

Data: mean ± standard error
**p < 0.05 vs vehicle administration group (Dunnett's test)

Figure 5:
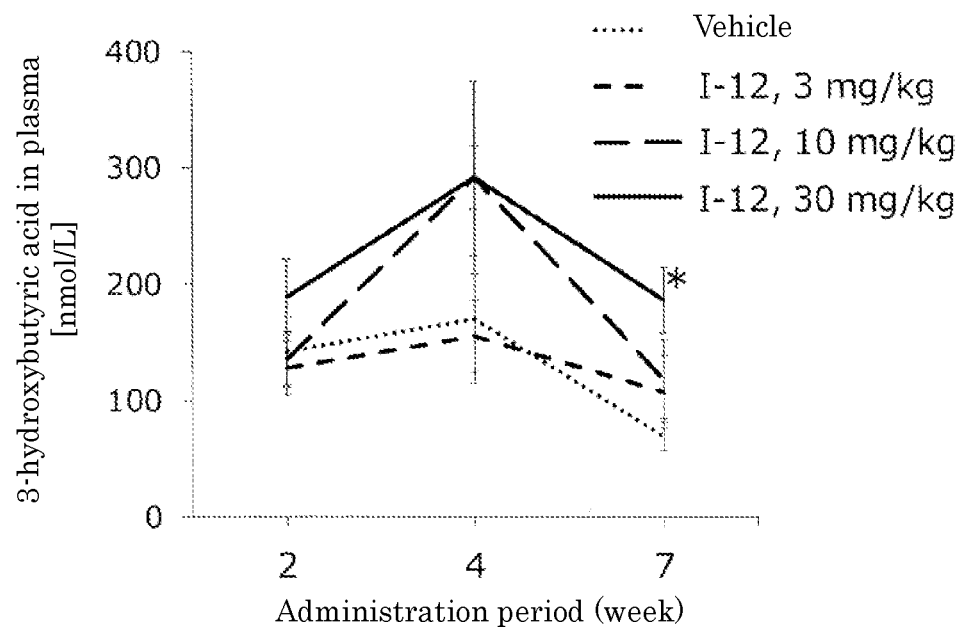
FIG. 5 shows a plasma 3-hydroxybutyric acid concentration when compound I-12 was administered to mice fed an ultra-high fat, choline-deficient, methionine-lowered diet.
Figure 6:
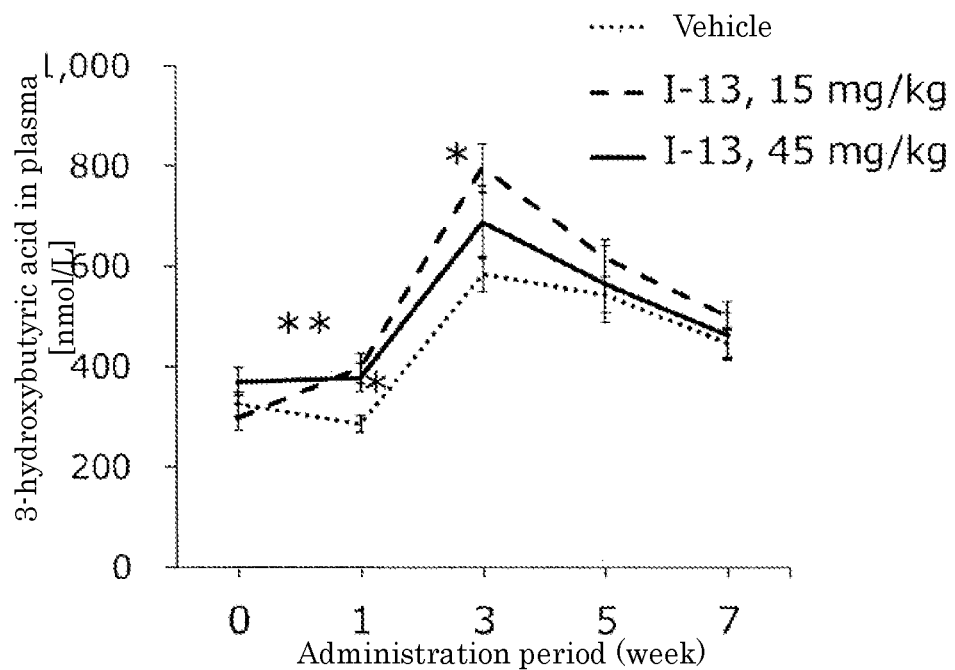
FIG. 6 shows a plasma 3-hydroxybutyric acid concentration when compound I-13 was administered to mice fed an ultra-high fat, choline-deficient, methionine-lowered diet.

In both the compound I-12 administration group and the compound I-13 administration group, a concentration of 3-hydroxybutyric acid in plasma was higher than that in the vehicle administration group, and fatty acid oxidation in the liver was enhanced. Results are shown in FIGS. 5 and 6 and Tables 8 and 9.

TABLE 8

| | 3-hydroxybutyric acid in plasma [nmol/L] | | |
|---|---|---|---|
| Administration group | Week 2 | Week 4 | Week 7 |
| Vehicle | 142 ± 30 | 170 ± 55 | 69.3 ± 12 |
| I-12 (3 mg/kg, bid) | 128 ± 23 | 155 ± 31 | 108 ± 31 |
| I-12 (10 mg/kg, bid) | 136 ± 23 | 292 ± 27 | 119 ± 34 |
| I-12 (30 mg/kg, bid) | 189 ± 33 | 292 ± 82 | 187 ± 28* |

Data: mean ± standard error
*p < 0.05 vs vehicle administration group (Dunnett's test)

TABLE 9

| | 3-hydroxybutyric acid in plasma [nmol/L] | | | | |
|---|---|---|---|---|---|
| Administration group | Week 0 | Week 1 | Week 3 | Week 5 | Week 7 |
| Vehicle | 325 ± 24 | 286 ± 17 | 584 ± 35 | 543 ± 35 | 446 ± 31 |
| I-13 (15 mg/kg, bid) | 298 ± 27 | 396 ± 30** | 797 ± 48* | 616 ± 37 | 501 ± 28 |
| I-13 (45 mg/kg, bid) | 369 ± 28 | 378 ± 28* | 688 ± 72 | 564 ± 77 | 462 ± 45 |

Data: mean ± standard error
*p < 0.05,
**p < 0.01 vs vehicle administration group (Dunnett's test)

Figure 7:
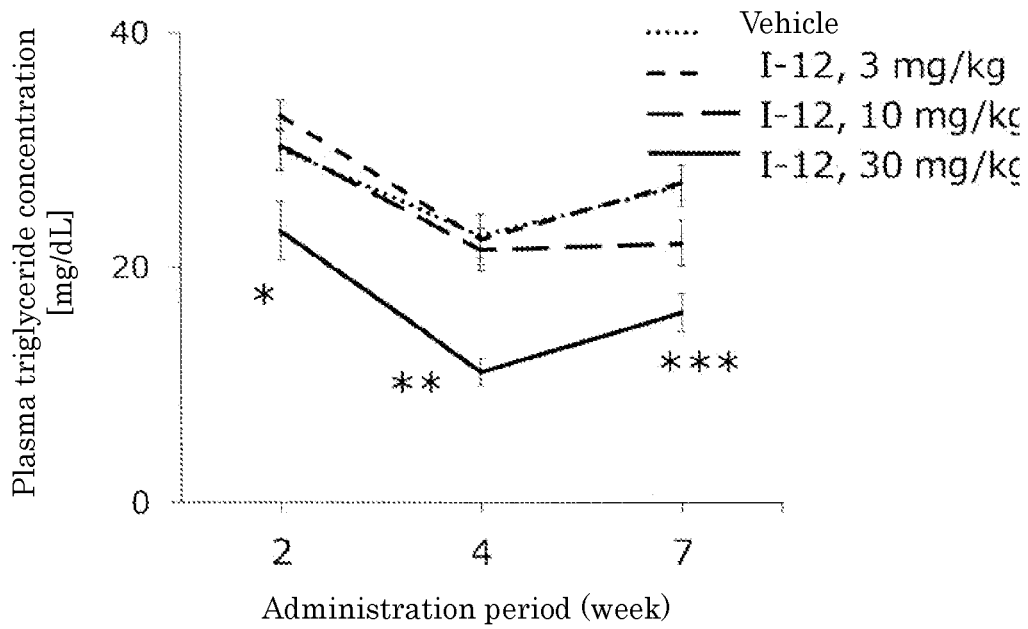
FIG. 7 shows a plasma triglyceride concentration when compound I-12 was administered to mice fed an ultra-high fat, choline-deficient, methionine-lowered diet.
Figure 8:
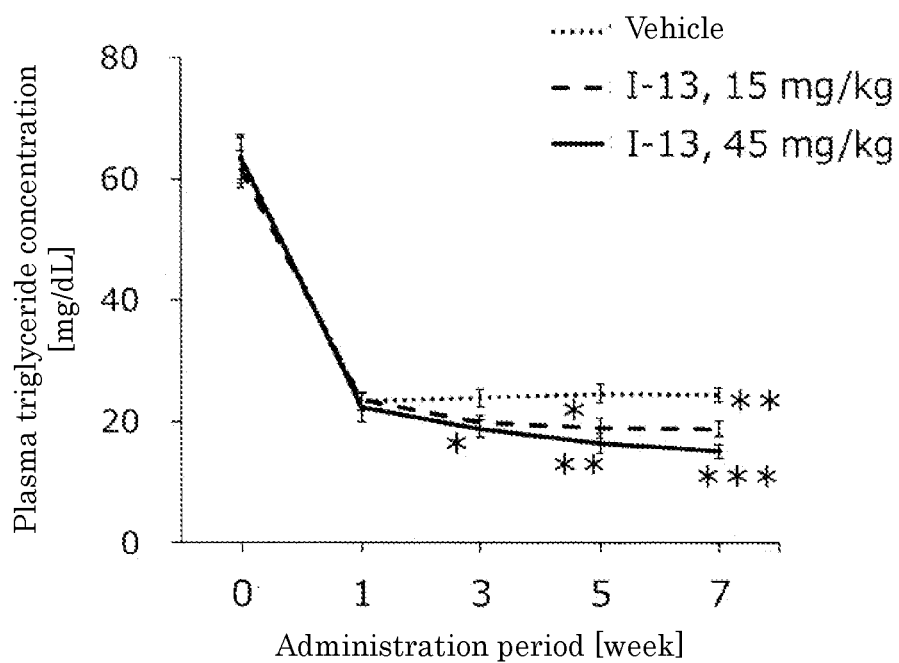
FIG. 8 shows a plasma triglyceride concentration when compound I-13 was administered to mice fed an ultra-high fat, choline-deficient, methionine-lowered diet.

In both the compound I-12 administration group and the compound I-13 administration group, a plasma triglyceride concentration was lower than that in the vehicle administration group. Results are shown in FIGS. 7 and 8 and Tables 10 and 11.

TABLE 10

| | Plasma triglyceride concentration [mg/dL] | | |
|---|---|---|---|
| Administration group | Week 2 | Week 4 | Week 7 |
| Vehicle | 30.1 ± 1.7 | 22.7 ± 1.8 | 27.0 ± 1.8 |
| I-12 (3 mg/kg, bid) | 32.9 ± 1.3 | 22.4 ± 2.1 | 27.2 ± 1.5 |
| I-12 (10 mg/kg, bid) | 30.4 ± 2.2 | 21.5 ± 1.8 | 22.1 ± 1.9 |
| I-12 (30 mg/kg, bid) | 23.1 ± 2.5* | 11.1 ± 1.1** | 16.2 ± 1.6*** |

Data: mean ± standard error
*p < 0.05,
**p < 0.01,
***p < 0.001 vs vehicle administration group (Dunnett's test)

TABLE 11

| | Plasma triglyceride concentration [mg/dL] | | | | |
|---|---|---|---|---|---|
| Administration group | Week 0 | Week 1 | Week 3 | Week 5 | Week 7 |
| Vehicle | 63.1 ± 3.7 | 23.3 ± 1.5 | 23.9 ± 1.4 | 24.6 ± 1.6 | 24.4 ± 1.1 |
| I-13 (15 mg/kg, bid) | 61.6 ± 3.1 | 23.7 ± 1.0 | 19.8 ± 1.2 | 19.0 ± 1.7* | 18.8 ± 1.2** |
| I-13 (45 mg/kg, bid) | 63.6 ± 3.7 | 22.4 ± 2.5 | 18.9 ± 1.4* | 16.5 ± 1.7** | 15.1 ± 1.0*** |

Data: mean ± standard error
*p < 0.05,
**p < 0.01,
***p < 0.001 vs vehicle administration group (Dunnett's test)

When compound I-13 was administered, no increase in Srebf1 and Fas in the liver was observed, and enhancement of novel fat synthesis in the liver was not stimulated. A gene expression level in the liver is shown below.

TABLE 12

|  | I-13 (mg/kg) | | |
| --- | --- | --- | --- |
|  | Vehicle | 15 | 45 |
| Srebf1 | 1.00 ± 0.27 | 0.70 ± 0.19 | 0.34 ± 0.05 |
| Fasn | 1.00 ± 0.17 | 0.82 ± 0.20 | 0.59 ± 0.09 |

Data: mean ± standard error

Test Example 6: Effect on Liver Fibrosis Progression in High-Fat Diet-Loaded Mice with Spontaneous Fatty Liver Eight-week-old male FLS.B6-Lep<ob>/Shi mice were fed a high-fat diet (60 kcal % fat content, using shortening, containing 2% cholesterol and 8.7% fructose), and at the same time, the compound of the present invention was suspended in a 0.5% MC aqueous solution so as to have a dose of 5.5 to 60 mg/kg/5 mL, and orally repeatedly administered (b.i.d.) for 4 weeks. Blood was collected from the tail vein during the repeated administration period, and biochemical parameters in plasma were measured. After 4 weeks of administration, blood was collected from the abdominal vena cava under anesthesia, and then the liver was collected. Paraffin-embedded sections prepared from the collected liver were subjected to Sirius red staining. A degree of fibrosis progression in the liver was determined from a Sirius red-positive area rate and evaluated.

Figure 9:
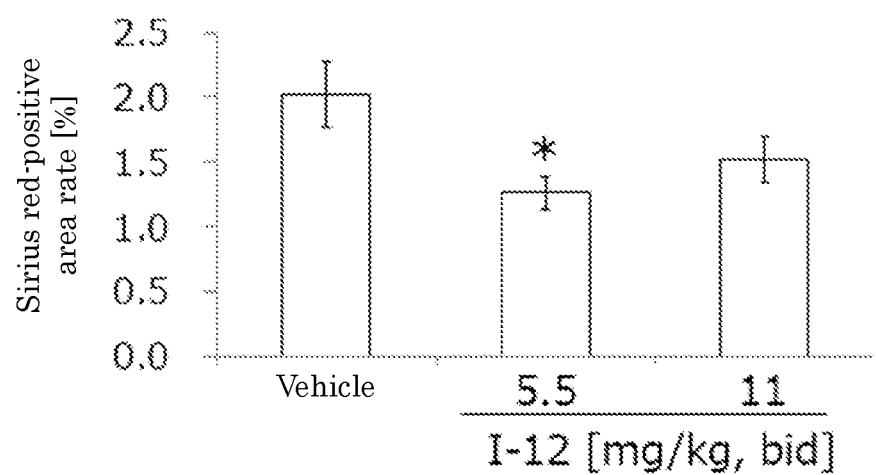
FIG. 9 shows a Sirius red-positive area rate when compound I-12 was administered to high-fat diet-loaded mice with spontaneous fatty liver.

A Sirius red-positive area rate of compound I-12 at a dose of 5.5 mg/kg was significantly lower than that of the vehicle administration group. Results are shown in FIG. 9 and Table 13.

TABLE 13

| Administration group | Sirius red-positive area rate (%) |
| --- | --- |
| Vehicle | 2.02 ± 0.25 |
| I-12 (5.5 mg/kg, bid) | 1.26 ± 0.13* |
| I-12 (11 mg/kg, bid) | 1.52 ± 0.18 |

Data: mean ± standard error
*$p < 0.05$ vs vehicle administration group (Dunnett's test)

Figure 10:
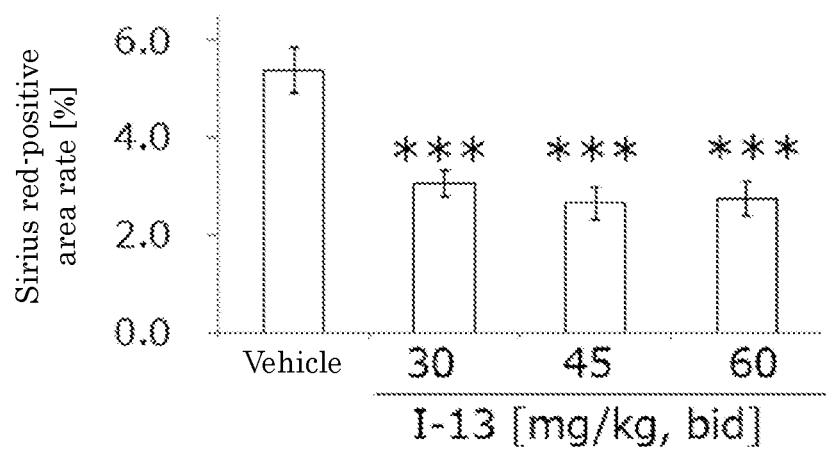
FIG. 10 shows a Sirius red-positive area rate when compound I-13 was administered to high-fat diet-loaded mice with spontaneous fatty liver.

A Sirius red-positive area rate of compound I-13 at a dose of 30, 45, or 60 mg/kg was significantly lower than that of the vehicle administration group. Results are shown in FIG. 10 and Table 14.

TABLE 14

| Administration group | Sirius red-positive area rate (%) |
| --- | --- |
| Vehicle | 5.38 ± 0.47 |
| I-13 (30 mg/kg, bid) | 3.05 ± 0.28*** |
| I-13 (45 mg/kg, bid) | 2.65 ± 0.34*** |
| I-13 (60 mg/kg, bid) | 2.75 ± 0.36*** |

Data: mean ± standard error
***$p < 0.001$ vs vehicle administration group (Dunnett's test)

Figure 11:
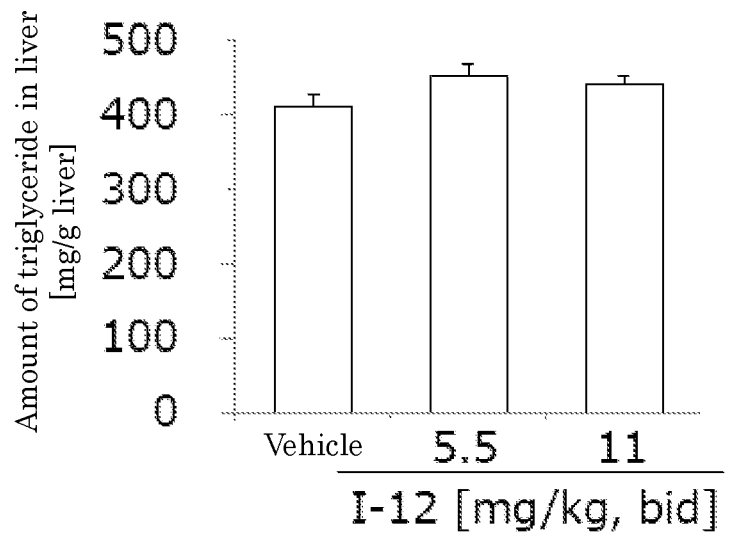
FIG. 11 shows an amount of triglyceride in the liver when compound I-12 was administered to high-fat diet-loaded mice with spontaneous fatty liver.
Figure 12:
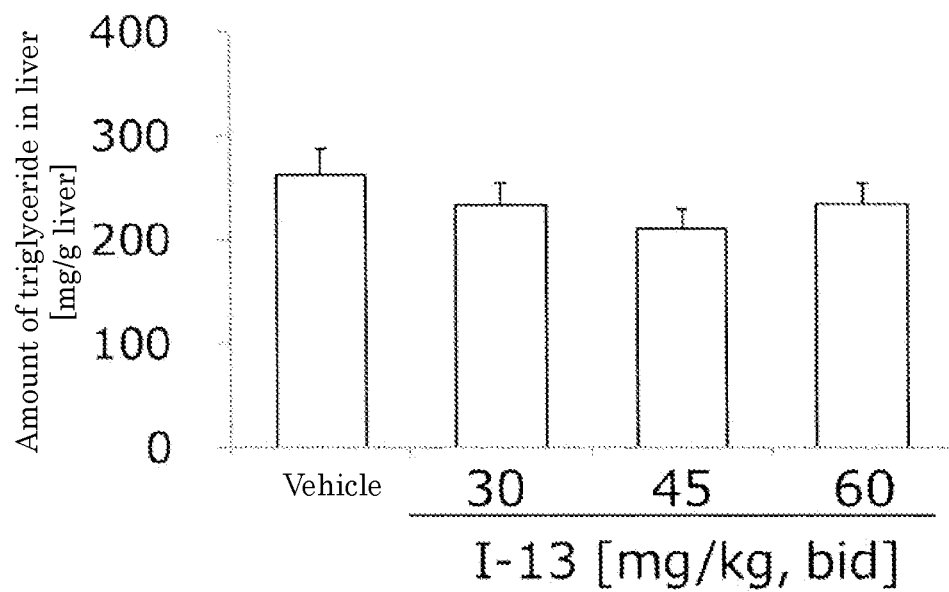
FIG. 12 shows an amount of triglyceride in the liver when compound I-13 was administered to high-fat diet-loaded mice with spontaneous fatty liver.

In both compound I-12 and compound I-13, an amount of triglyceride in the liver was not significantly different from that in the vehicle administration group. Results are shown in FIGS. 11 and 12 and Tables 15 and 16.

TABLE 15

| Administration group | Amount of triglyceride in liver (mg/g tissue) |
| --- | --- |
| Vehicle | 412 ± 14 |
| I-12 (5.5 mg/kg, bid) | 451 ± 17 |
| I-12 (11 mg/kg, bid) | 441 ± 11 |

Data: mean ± standard error

TABLE 16

| Administration group | Amount of triglyceride in liver (mg/g tissue) |
| --- | --- |
| Vehicle | 263 ± 24 |
| I-13 (30 mg/kg, bid) | 234 ± 21 |
| I-13 (45 mg/kg, bid) | 211 ± 19 |
| I-13 (60 mg/kg, bid) | 235 ± 20 |

Data: mean ± standard error

Figure 13:
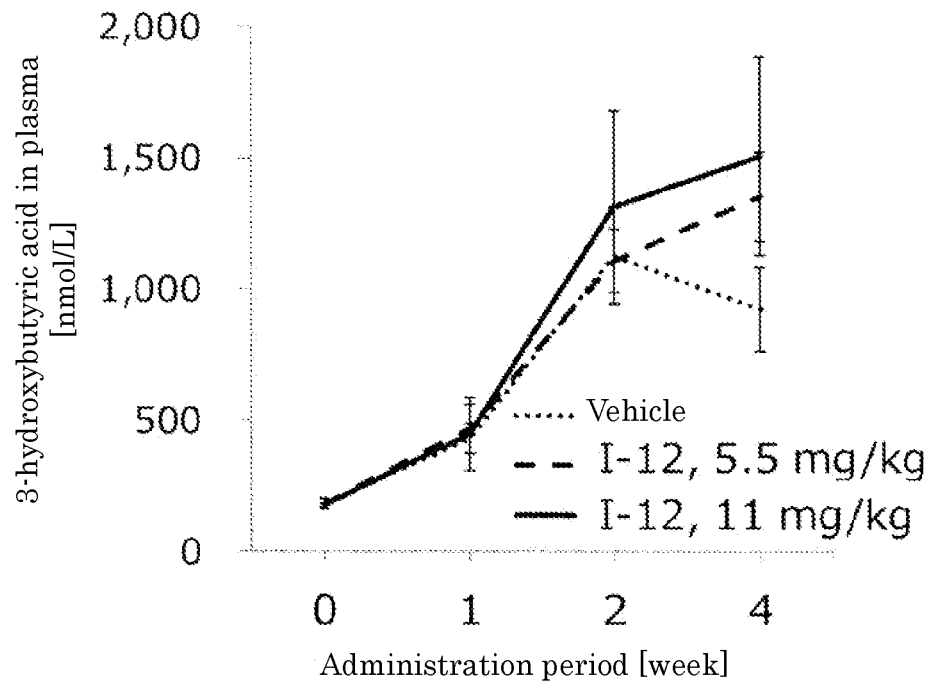
FIG. 13 shows a plasma 3-hydroxybutyric acid concentration when compound I-12 was administered to high-fat diet-loaded mice with spontaneous fatty liver.
Figure 14:
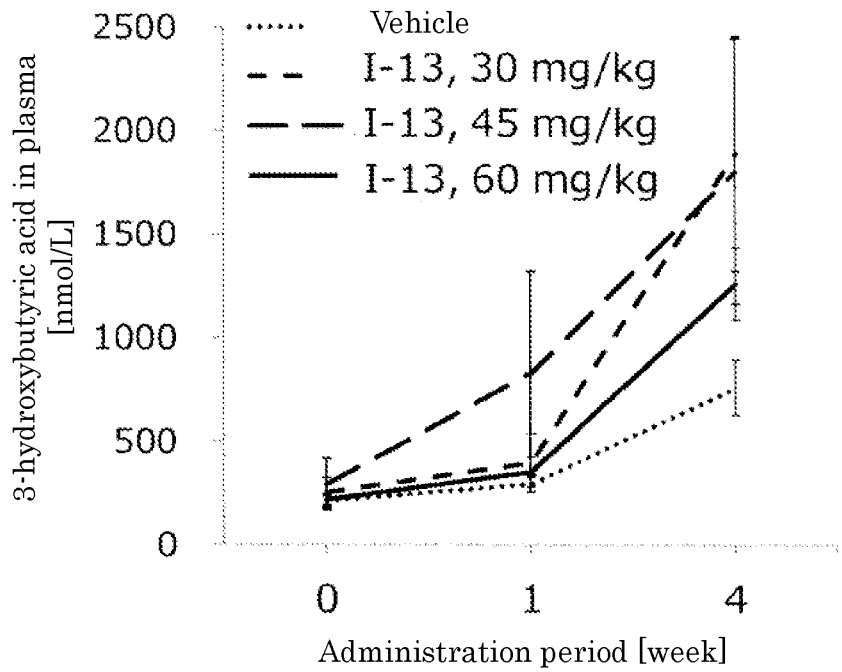
FIG. 14 shows a plasma 3-hydroxybutyric acid concentration when compound I-13 was administered to high-fat diet-loaded mice with spontaneous fatty liver.

In both compound I-12 and compound I-13, a concentration of 3-hydroxybutyric acid in plasma tended to be higher than that in the vehicle administration group. Results are shown in FIGS. 13 and 14 and Tables 17 and 18.

TABLE 17

| | 3-hydroxybutyric acid in plasma [nmol/L] | | | |
| --- | --- | --- | --- | --- |
| Administration group | Week 0 | Week 1 | Week 2 | Week 4 |
| Vehicle | 184 ± 16 | 431 ± 57 | 1129 ± 180 | 924 ± 160 |
| I-12 (5.5 mg/kg, bid) | 184 ± 20 | 470 ± 93 | 1108 ± 120 | 1354 ± 170 |
| I-12 (11 mg/kg, bid) | 178 ± 8.7 | 449 ± 140 | 1314 ± 370 | 1508 ± 380 |

Data: mean ± standard error

TABLE 18

| | 3-hydroxybutyric acid in plasma [nmol/L] | | |
| --- | --- | --- | --- |
| Administration group | Week 0 | Week 1 | Week 4 |
| Vehicle | 215 ± 22 | 293 ± 36 | 759 ± 130 |
| I-13 (30 mg/kg, bid) | 252 ± 73 | 397 ± 140 | 1888 ± 570 |
| I-13 (45 mg/kg, bid) | 291 ± 130 | 829 ± 490 | 1803 ± 640 |
| I-13 (60 mg/kg, bid) | 217 ± 28 | 351 ± 72 | 1260 ± 170 |

Data: mean ± standard error

Figure 15:
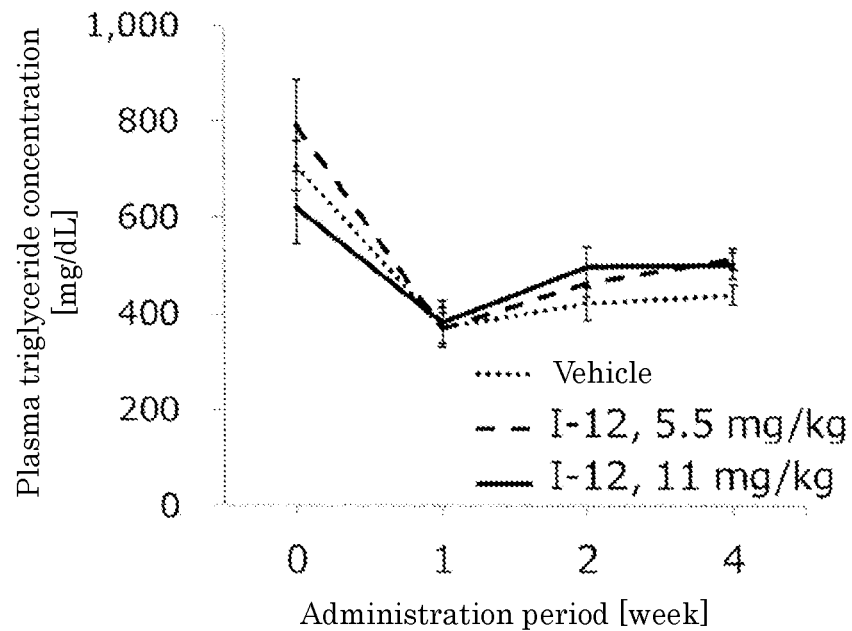
FIG. 15 shows a plasma triglyceride concentration when compound I-12 was administered to high-fat diet-loaded mice with spontaneous fatty liver.
Figure 16:
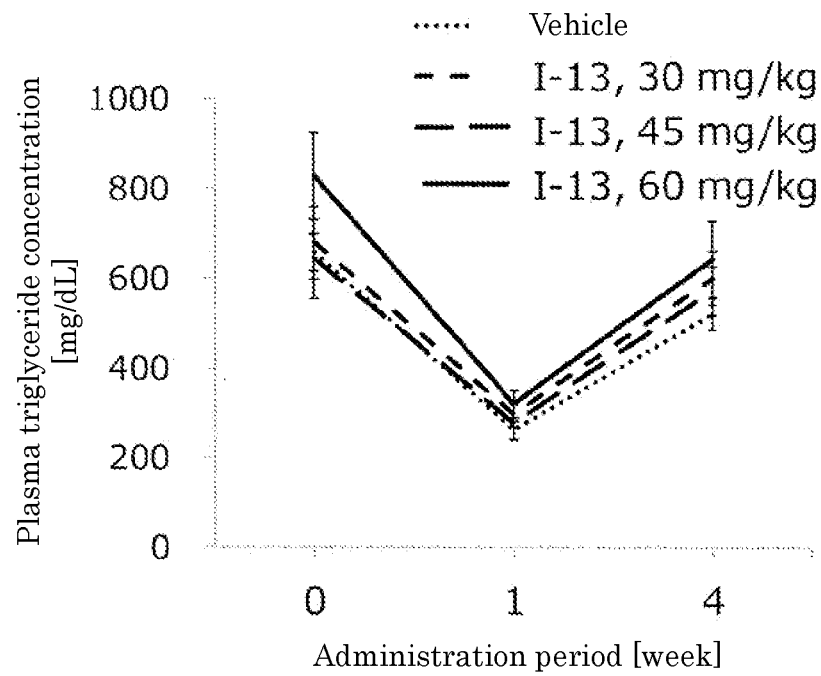
FIG. 16 shows a plasma triglyceride concentration when compound I-13 was administered to high-fat diet-loaded mice with spontaneous fatty liver.

In both compound 1-12 and compound 1-13, a plasma triglyceride concentration was not significantly different from that in the vehicle administration group. Results are shown in FIGS. 15 and 16 and Tables 19 and 20.

TABLE 19

| Administration group | Plasma triglyceride concentration [mg/dL] | | | |
|---|---|---|---|---|
| | Week 0 | Week 1 | Week 2 | Week 4 |
| Vehicle | 706 ± 51 | 371 ± 41 | 420 ± 34 | 439 ± 21 |
| I-12 (5.5 mg/kg, bid) | 790 ± 95 | 369 ± 32 | 464 ± 30 | 513 ± 23 |
| I-12 (11 mg/kg, bid) | 619 ± 76 | 382 ± 44 | 497 ± 39 | 500 ± 27 |

Data: mean ± standard error

TABLE 20

| Administration group | Plasma triglyceride concentration [mg/dL] | | |
|---|---|---|---|
| | Week 0 | Week 1 | Week 4 |
| Vehicle | 658 ± 43 | 262 ± 19 | 522 ± 37 |
| I-13 (30 mg/kg, bid) | 680 ± 81 | 299 ± 27 | 600 ± 59 |
| I-13 (45 mg/kg, bid) | 644 ± 89 | 279 ± 40 | 572 ± 54 |
| I-13 (60 mg/kg, bid) | 829 ± 97 | 322 ± 30 | 641 ± 86 |

Data: mean ± standard error

Figure 17:
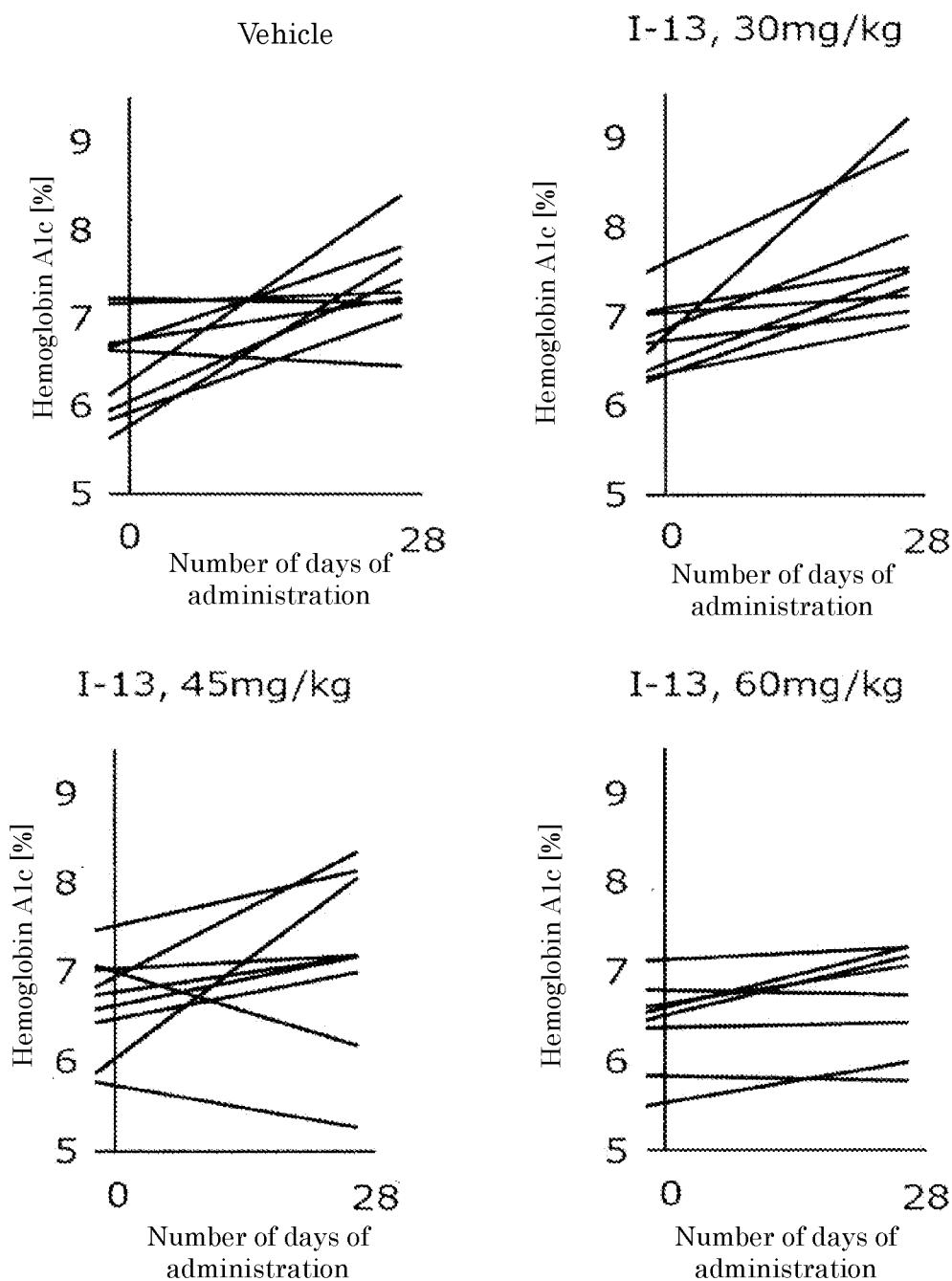
FIG. 17 shows a hemoglobin A1c concentration when compound I-13 was administered to high-fat diet-loaded mice with spontaneous fatty liver.

Administration of compound 1-13 tended to suppress an increase in hemoglobin A1c. Results are shown in FIG. 17 and Table 21.

TABLE 21

| Administration group | Individual No. | Hemoglobin A1c [%] | | Change in hemoglobin A1c [%] | P value |
|---|---|---|---|---|---|
| | | Before start of administration | Day 26 of administration | (day 26 of administration) – (before start of administration) | (Dunnett's test) |
| Vehicle | 1 | 5.63 | 7.68 | 2.04 | — |
| | 2 | 5.95 | 7.44 | 1.49 | |
| | 3 | 6.67 | 7.80 | 1.14 | |
| | 4 | 7.16 | 7.30 | 0.138 | |
| | 5 | 6.72 | 7.22 | 0.501 | |
| | 6 | 7.22 | 7.17 | −0.0496 | |
| | 7 | 5.84 | 7.03 | 1.19 | |
| | 8 | 6.64 | 6.45 | −0.186 | |
| | 9 | 6.13 | 8.38 | 2.25 | |
| I-13 (30 mg/kg, bid) | 1 | 6.40 | 7.50 | 1.10 | 0.999 |
| | 2 | 6.59 | 9.21 | 2.61 | |
| | 3 | 6.70 | 7.05 | 0.359 | |
| | 4 | 6.32 | 6.90 | 0.580 | |
| | 5 | 7.03 | 7.23 | 0.200 | |
| | 6 | 7.49 | 8.86 | 1.37 | |
| | 7 | 7.05 | 7.54 | 0.484 | |
| | 8 | 6.78 | 7.91 | 1.14 | |
| | 9 | 6.28 | 7.32 | 1.05 | |
| I-13 (45 mg/kg, bid) | 1 | 6.58 | 7.17 | 0.591 | 0.515 |
| | 2 | 6.74 | 7.17 | 0.429 | |
| | 3 | 7.06 | 6.17 | −0.888 | |
| | 4 | 5.77 | 5.26 | −0.504 | |
| | 5 | 5.87 | 8.04 | 2.17 | |
| | 6 | 7.03 | 7.19 | 0.162 | |
| | 7 | 6.43 | 6.99 | 0.562 | |
| | 8 | 6.83 | 8.33 | 1.50 | |
| | 9 | 7.47 | 8.13 | 0.667 | |
| I-13 (60 mg/kg, bid) | 1 | 5.50 | 5.99 | 0.493 | 0.232 |
| | 2 | 6.36 | 6.43 | 0.0708 | |
| | 3 | 6.46 | 7.16 | 0.696 | |
| | 4 | 6.60 | 7.06 | 0.463 | |
| | 5 | 7.12 | 7.27 | 0.150 | |
| | 6 | 6.80 | 6.74 | −0.0552 | |
| | 7 | 6.55 | 7.27 | 0.719 | |
| | 8 | 5.83 | 5.78 | −0.0504 | |

Test Example 7 Influence on Platelet Count

The compound of the present invention was suspended in a 0.5% methylcellulose solution so as to have a dose of 50 to 600 mg/kg/day, and was orally repeatedly administered for 4 days to 6-week-old male Crl:CD (SD) rats under non-fasted conditions. On day 5 from the start of administration, blood was collected from the abdominal vena cava under anesthesia, and plasma was collected. A platelet count in plasma was evaluated with an automatic hemocytometer.

Both compound 1-12 and compound 1-13 did not affect the platelet count in SD rats within a dose range used for evaluation. Results of Test Example 7 are shown below.

TABLE 22

| | | Dose | | | |
|---|---|---|---|---|---|
| | | 0 mg/kg/day | 100 mg/kg/day | 300 mg/kg/day | 600 mg/kg/day |
| I-12 | Platelet count (N = 4) | 1055 ± 186 | 987 ± 86 | 988 ± 43 | 1061 ± 85 |

Data: mean ± standard deviation

TABLE 23

| | | Dose | | | |
|---|---|---|---|---|---|
| | | 0 mg/kg/day | 50 mg/kg/day | 100 mg/kg/day | 200 mg/kg/day |
| I-13 | Platelet count (N = 4) | 1164 ± 102 | 1079 ± 73 | 1048 ± 65 | 1122 ± 87 |

Data: mean ± standard deviation

Test Example 8: Test of Combined Effect with Obeticholic Acid in Mice

Eight-week-old male FLS.B6-Lep<ob>/Shi mice were fed a high-fat diet (60 kcal % fat content, using shortening, containing 2% cholesterol and 8.7% fructose), and at the same time, the compound of the present invention was suspended in a 0.5% MC aqueous solution so as to have a dose of 30 mg/kg/5 mL, and orally repeatedly administered (b.i.d.) for 10 weeks. Obeticholic acid was suspended in a 0.5% MC aqueous solution so as to have a dose of 10 mg/kg/5 mL, and orally repeatedly administered (q.d.) for 10 weeks. Furthermore, a group in which oral repeated administration (b.i.d.) of 30 mg/kg/5 mL of the compound of the present invention and oral repeated administration (q.d.) of 10 mg/kg/5 mL of obeticholic acid were performed in combination was also provided. Blood was collected from the tail vein during the repeated administration period, and biochemical parameters and fibrosis markers in plasma were measured. After 10 weeks of administration, blood was collected from the abdominal vena cava under anesthesia, and then the liver was collected. Paraffin-embedded sections prepared from the collected liver were subjected to Sirius red staining. A degree of fibrosis progression in the liver was determined from a Sirius red-positive area rate and evaluated.

As a result, by using the compound of the present invention in combination with obeticholic acid, stronger suppression of fibrosis markers and fibrosis progression was observed compared with when each compound was used alone.

Test Example 9: Test of Combined Effect with Semaglutide or Resmetirom in Mice Male C57BL6/J mice are fed a high-fat diet and fructose for up to 32 weeks, and then the compound of the present invention is suspended in a 0.5% MC aqueous solution so as to have a dose of up to 30 mg/kg/5 mL, and orally repeatedly administered (b.i.d.) for up to 12 weeks. Semaglutide is subcutaneously repeatedly administered (q.d.) at a dose of up to 30 nmol/kg/5 mL and resmetirom is orally repeatedly administered (q.d.) at a dose of up to 3 mg/kg/5 mL for up to 12 weeks. Furthermore, a group in which 30 mg/kg/5 mL of the compound of the present invention is orally repeatedly administered (b.i.d.) in combination with semaglutide or resmetirom is also provided. Blood is collected from the tail vein during the repeated administration period, and biochemical parameters in plasma are measured. After completion of the repeated administration, blood is collected from the abdominal vena cava under anesthesia, and then the liver is collected. Paraffin-embedded sections prepared from the collected liver are subjected to Sirius red staining. A degree of fibrosis progression in the liver is determined from a Sirius red-positive area rate and evaluated.

Test Example 10: CYP Inhibition Test

Using commercially available pooled human liver microsomes, and employing, as indices, O-deethylation of 7-ethoxyresorufin (CYP1A2), methyl-hydroxylation of tolbutamide (CYP2C9), 4'-hydroxylation of mephenytoin (CYP2C19), 0-demethylation of dextromethorphan (CYP2D6), and hydroxylation of terfenadine (CYP3A4), which are typical substrate metabolic reactions of five human major CYP molecular species (CYP1A2, 2C9, 2C19, 2D6, and 3A4), a degree at which an amount of each metabolite produced is inhibited by the compound of the present invention was assessed.

Reaction conditions are as follows: substrate, 0.5 µmol/L ethoxyresorufin (CYP1A2), 100 µmol/L tolbutamide (CYP2C9), 50 µmol/L S-mephenytoin (CYP2C19), 5 µmol/L dextromethorphan (CYP2D6), 1 µmol/L terfenadine (CYP3A4); reaction time, 15 minutes; reaction temperature, 37° C.; enzyme, 0.2 mg protein/mL of pooled human liver microsomes; concentrations of the compound of the present invention, 1, 5, 10, 20 µmol/L (four points).

Each of the five substrates, the human liver microsomes, and the compound of the present invention were added according to the recipe described above into a 50 mmol/L Hepes buffer in a 96-well plate, and a coenzyme NADPH was added thereto to initiate the metabolic reactions serving as indices. After reaction at 37° C. for 15 minutes, a solution of methanol/acetonitrile=1/1 (V/V) was added to stop the reaction. After centrifugation at 3000 rpm for 15 minutes, resorufin (CYP1A2 metabolite) in the centrifuged supernatant was quantified with a fluorescence multilabel counter or by LC/MS/MS, and tolbutamide hydroxide (CYP2C9 metabolite), mephenytoin 4'-hydroxide (CYP2C19 metabolite), dextrorphan (CYP2D6 metabolite), and terfenadine alcohol (CYP3A4 metabolite) were quantified by LC/MS/MS.

Only DMSO as a solvent dissolving a compound instead of the compound of the present invention was added to the reaction solution, and the mixture was used as a control (100%). Remaining activity (%) was calculated, and $IC_{50}$ was calculated by inverse estimation based on a logistic model using the concentrations and the inhibition rates.

Test Example 11: CYP3A4 Fluorescent MBI Test

The CYP3A4 fluorescent MBI test is a test for examining the enhancement of CYP3A4 inhibition of the compound of the present invention by a metabolic reaction. 7-Benzyloxytrifluoromethylcoumarin (7-BFC) is debenzylated by a CYP3A4 enzyme (*Escherichia coli*-expressed enzyme) to produce a fluorescent metabolite, 7-hydroxytrifluoromethylcoumarin (7-HFC). CYP3A4 inhibition was evaluated using the 7-HFC production reaction as an index.

Reaction conditions are as follows: substrate, 5.6 µmol/L 7-BFC; pre-reaction time, 0 or 30 minutes; reaction time, 15 minutes; reaction temperature, 25° C. (room temperature); CYP3A4 content (*Escherichia coli*-expressed enzyme), at pre-reaction 62.5 µmol/mL, at reaction 6.25 µmol/mL (at 10-fold dilution); concentrations of the compound of the present invention, 0.625, 1.25, 2.5, 5, 10, 20 µmol/L (six points).

An enzyme and a solution of the compound of the present invention were added according to the composition of the pre-reaction as described above into a K-Pi buffer (pH 7.4) as a pre-reaction solution in a 96-well plate. A part of the pre-reaction solution was transferred to another 96-well plate so as to be diluted by 1/10 with a substrate and a K-Pi buffer. NADPH as a coenzyme was added to initiate a reaction serving as an index (without pre-reaction). After reaction for a predetermined time, acetonitrile/0.5 mol/L Tris (trishydroxyaminomethane)=4/1 (V/V) was added to stop the reaction. In addition, NADPH was added to the remaining pre-reaction solution to initiate a pre-reaction (with pre-reaction). After pre-reaction for a predetermined time, a part was transferred to another plate so as to be diluted by 1/10 with a substrate and a K-Pi buffer to initiate a reaction serving as an index. After reaction for a predetermined time, acetonitrile/0.5 mol/L Tris (trishydroxyaminomethane)=4/1 (V/V) was added to stop the reaction. For the plate on which each index reaction had been performed, a fluorescent value of 7-HFC that is a metabolite was measured with a fluorescent plate reader. (Ex=420 nm, Em=535 nm). The dilution concentration and the dilution solvent were changed as necessary.

Only DMSO as a solvent dissolving the compound of the present invention was added to the reaction system, and the mixture was used as a control (100%). Remaining activity (%) at the time of addition of the compound of the present invention at each concentration was calculated. $IC_{50}$ was calculated by inverse estimation based on a logistic model using the concentrations and the inhibition rates. A case where a difference in $IC_{50}$ values was 5 µmol/L or more was defined as (+). A case where the difference was 3 µmol/L or less was defined as (−).

Test Example 12: CYP3A4 (MDZ) MBI Test

This test evaluates, as to CYP3A4 inhibition of the compound of the present invention, mechanism based inhibition (MBI) ability from enhancement of an inhibitory action caused by a metabolic reaction of the compound of the present invention. CYP3A4 inhibition was evaluated using pooled human liver microsomes with 1-hydroxylation reaction of midazolam (MDZ) as an index.

Reaction conditions are as follows: substrate, 10 µmol/L MDZ; pre-reaction time, 0 or 30 minutes; substrate metabolic reaction time, 2 minutes; reaction temperature, 37° C.; pooled human liver microsomes, at pre-reaction 0.5 mg/mL, at reaction time 0.05 mg/mL (at 10-fold dilution); concentrations of the compound of the present invention at pre-reaction, 1, 5, 10, 20 µmol/L (four points).

The pooled human liver microsomes and a solution of the compound of the present invention were added according to the composition of the pre-reaction described above into a K-Pi buffer (pH 7.4) as a pre-reaction solution in a 96-well plate. A part of the pre-reaction solution was transferred to another 96-well plate so as to be diluted by 1/10 with a K-Pi buffer containing a substrate. NADPH as a coenzyme was added to initiate a reaction serving as an index (preincubataion 0 min). After reaction for a predetermined time, a solution of methanol/acetonitrile=1/1 (V/V) was added to stop the reaction. In addition, NADPH was added to the remaining pre-reaction solution to initiate a pre-reaction (preincubataion 30 min). After pre-reaction for a predetermined time, a part was transferred to another plate so as to be diluted by 1/10 with a K-Pi buffer containing a substrate to initiate a reaction serving as an index. After reaction for a predetermined time, a solution of methanol/acetonitrile=1/1 (V/V) was added to stop the reaction. The plate on which each index reaction had been performed was centrifuged at 3000 rpm for 15 minutes, and then 1-hydroxymidazolam in the centrifuged supernatant was quantified by LC/MS/MS. The dilution concentration and the dilution solvent were changed as necessary.

Only DMSO as a solvent dissolving a compound instead of the compound of the present invention was added to the reaction solution, and the mixture was used as a control (100%). Remaining activity (%) at the time of addition of the compound of the present invention at each concentration was calculated. IC was calculated by inverse estimation based on a logistic model using the concentrations and the inhibition rates. IC at preincubataion 0 min/IC at preincubataion 30 min was defined as a shifted IC value. A case where shifted IC was 1.5 or more was regarded as positive, and a case where shifted IC was 1.0 or less was regarded as negative.

Test Example 13: BA Test

Experimental Material and Method to Study Oral Absorbability
 (1) Animals used: Mice or rats were used.
 (2) Breeding conditions: The mice or rats were allowed to freely take chow and sterilized tap water.
 (3) Dose and grouping setting: A predetermined dose was orally administered and intravenously administered. Groups were set as follows: (dose was changed on a compound basis)
 Oral administration: 2 to 60 µmol/kg or 1 to 30 mg/kg (n=2 or 3)
 Intravenous administration: 1 to 30 µmol/kg or 0.5 to 10 mg/kg (n=2 or 3)
 (4) Preparation of dosing solution: Oral administration was performed in a form of a solution or a suspension. Intravenous administration was performed after solubilization.
 (5) Administration method: Oral administration was performed by gastric gavage using an oral sonde. Intravenous administration was performed via the tail vein through a syringe with an injection needle.
 (6) Evaluation item: Blood was collected over time, and the concentration of the compound of the present invention in plasma was measured using LC/MS/MS.
 (7) Statistical analysis: An area under plasma concentration-time curve (AUC) was calculated as to change in the concentration of the compound of the present invention in plasma by the moment analysis method, and bioavailability (BA) of the compound of the present invention was calculated from a dose ratio and an AUC ratio between the oral administration group and the intravenous administration group.

The dilution concentration and the dilution solvent were changed as necessary.

Test Example 14: Clearance Evaluation Test

Experimental Material and Method
 (1) Animals used: SD rats were used.
 (2) Breeding conditions: The SD rats were allowed to freely take chow and sterilized tap water.
 (3) Dose and grouping setting: A predetermined dose was intravenously administered. Groups were set as follows:
 Intravenous administration: 1 µmol/kg (n=2)
 (4) Preparation of dosing solution: Administration was performed after solubilization using a solvent of dimethyl sulfoxide/propylene glycol=1/1.
 (5) Administration method: Administration was performed via the tail vein through a syringe with an injection needle.

(6) Evaluation item: Blood was collected over time, and the concentration of the compound of the present invention in plasma was measured using LC/MS/MS.

(7) Statistical analysis: Total body clearance (CLtot) was calculated as to change in the concentration of the compound of the present invention in plasma by the moment analysis method. The dilution concentration and the dilution solvent were changed as necessary.

Test Example 15: Fluctuation Ames Test

Mutagenicity of the compound of the present invention is evaluated.

20 μL of cryopreserved *Salmonella typhimurium* (TA98 strain and TA100 strain) was inoculated to 10 mL of a liquid nutrient medium (2.5% Oxoid nutrient broth No. 2) and shake-preculture d at 37° C. for 10 hours. 7.70 to 8.00 mL of a bacterial solution of the TA98 strain was centrifuged (2000×g, 10 minutes) to remove the culture solution. The bacterium was suspended in a Micro F buffer ($K_2HPO_4$: 3.5 g/L, $KH_2PO_4$: 1 g/L, $(NH_4)_2SO_4$: 1 g/L, trisodium citrate dihydrate: 0.25 g/L, and $MgSO_4 \cdot 7H_2O$: 0.1 g/L) in the same volume as that of the bacterial solution used in the centrifugation and added to 120 mL of an exposure medium (Micro F buffer containing biotin: 8 μg/mL, histidine: 0.2 μg/mL, and glucose: 8 mg/mL). 3.10 to 3.42 mL of a bacterial solution of the TA100 strain was added to 120 to 130 mL of an exposure medium to prepare a test bacterial solution. 12 μL each of a DMSO solution of the compound of the present invention (several serial dilutions from maximum dose 50 mg/mL at 2- to 3-fold common ratio), DMSO as a negative control, and 50 μg/mL of a 4-nitroquinoline-1-oxide DMSO solution for the TA98 strain and 0.25 μg/mL of a 2-(2-furyl)-3-(5-nitro-2-furyl)acrylamide DMSO solution for the TA100 strain under non-metabolic activation conditions or 40 μg/mL of a 2-aminoanthracene DMSO solution for the TA98 strain and 20 μg/mL of a 2-aminoanthracene DMSO solution for the TA100 strain under metabolic activation conditions as a positive control, and 588 μL of the test bacterial solution (a mixed solution of 498 μL of the test bacterial solution and 90 μL of S9 mix under metabolic activation conditions) were mixed, and the mixture was shake-cultured at 37° C. for 90 minutes. 460 μL of the bacterial solution exposed to the compound of the present invention was mixed with 2300 μL of an indicator medium (Micro F buffer containing biotin: 8 μg/mL, histidine: 0.2 μg/mL, glucose: 8 mg/mL, and bromocresol purple: 37.5 μg/mL), and the mixture was dispensed into 48 wells/dose of a microplate at 50 μL/well and statically cultured at 37° C. for 3 days. Since a well containing a bacterium that has acquired proliferation ability by mutation of an amino acid (histidine) synthase gene turns from purple to yellow due to a pH change, the bacterium proliferation well which had turned to yellow in 48 wells per dose was counted, and was evaluated by comparison with the negative control group. Negative mutagenicity was indicated as (−), and positive mutagenicity was indicated as (+).

The dilution concentration and the dilution solvent were changed as necessary.

Test Example 16: hERG Test

For the purpose of evaluating a risk of an electrocardiogram QT interval prolongation of the compound of the present invention, an effect of the compound of the present invention on delayed rectifier $K^+$ current ($I_{Kr}$), which plays an important role in a ventricular repolarization process, was studied using CHO cells expressing human ether-a-go-go related gene (hERG) channel.

The cells were kept at a membrane potential of −80 mV by a whole cell patch clamp method using a fully automated patch clamp system (QPatch; Sophion Bioscience A/S), given a leak potential of −50 mV, and then given depolarization stimulation of +20 mV for 2 seconds and further repolarization stimulation of −50 mV for 2 seconds. $I_{Kr}$ induced by this procedure was recorded. An extracellular fluid (NaCl: 145 mmol/L, KCl: 4 mmol/L, $CaCl_2$): 2 mmol/L, $MgCl_2$: 1 mmol/L, glucose: 10 mmol/L, HEPES (4-(2-hydroxyethyl)-1-piperazineethanesulfonic acid): 10 mmol/L, pH=7.4) with dimethyl sulfoxide adjusted to 0.1% was used as a vehicle to apply the vehicle and an extracellular fluid containing the compound of the present invention dissolved at a concentration of interest to the cells under conditions of room temperature for 7 minutes or more. From the obtained $I_{Kr}$, an absolute value of a maximum tail current based on a current value at the membrane potential where the cells had been kept was measured using analytical software (QPatch Assay software; Sophion Bioscience A/S). Furthermore, a maximum tail current after the application of the compound of the present invention with respect to a maximum tail current after the application of the vehicle was calculated as an inhibition rate to evaluate an influence of the compound of the present invention on $I_{Kr}$. The dilution concentration and the dilution solvent were changed as necessary.

Test Example 17: Ames Test

Mutagenicity of the compound of the present invention was evaluated by an Ames test with *Salmonella* typhimurium TA98, TA100, TA1535, and TA1537 strains and an *Escherichia coli* WP2uvrA strain as test bacterial strains. 0.1 mL of a DMSO solution of the compound of the present invention was mixed with 0.5 mL of S9 mix under metabolic activation conditions or 0.5 mL of a phosphate buffer and 0.1 mL of the test bacterial solution under non-metabolic activation conditions, and the mixture was overlaid on a minimum glucose agar plate together with 2 mL of soft agar for overlay containing histidine and biotin, or tryptophan. At the same time, the same procedure was performed for a negative control substance (DMSO) and a positive control substance (2-(2-furyl)-3-(5-nitro-2-furyl)acrylamide, sodium azide, 9-aminoacridine, or 2-aminoanthracene). After culture at 37° C. for 48 hours, revertant colonies that had appeared were counted and evaluated by comparison with the negative control group. When the number of revertant colonies increased in a concentration-dependent manner and became twice or more the number of colonies of the negative control group, mutagenicity was determined to be positive (+). The dilution concentration and the dilution solvent were changed as necessary.

Test Example 18: Photohemolysis Test

The compound of the present invention is dissolved at a concentration of interest. The solution is mixed with 0.1 to 0.0008% concentrations of a red blood cell suspension (2.5 v/v %) prepared from sheep defibrinated blood on a microplate. The mixtures are irradiated with light (10 J/cm², 290 to 400 nm) in UVA and UVB regions using an ultraviolet fluorescent lamp (GL20SE lamp, Sankyo Electronics Co., Ltd. and FL20S-BLB lamp, Panasonic Corporation). The mixed solutions after completion of light irradiation are collected and centrifuged. The supernatant after the centrifugation is collected and transferred to a microplate. Then, absorbance (540 or 630 nm) of the supernatant is measured, and determination based on the absorbance is performed. The absorbance at 540 and 630 nm is used as an index for biomembrane injury (rate of photohemolysis (%)) and lipid membrane peroxidation (methemoglobin production), respectively. A case where the rate of photohemolysis is less than 10% and an amount of change in absorbance at 630 nm is less than 0.05 is defined as (−). A case where the rate of photohemolysis is 10% or more and an amount of change in absorbance at 630 nm is 0.05 or more is defined as (+).

Test Example 19: P-gp Substrate Test

The compound of the present invention was added to one side of Transwell (registered trademark, Corning Incorporated) where human MDR1-expressing cells or parent cells had been monolayer-cultured. The cells were reacted for a given time. Membrane permeability coefficients from the apical side toward the basolateral side (A→B) and from the basolateral side toward the apical side (B→A) are calculated for the MDR1-expressing cells or the parent cells, and efflux ratio (ER; ratio of the membrane permeability coefficient of B→A to that of A→B) values of the MDR1-expressing cells and the parent cells were calculated. The efflux ratios (ER values) of MDR1-expressing cells and the parent cells were compared to determine whether the compound of the present invention was a P-gp substrate.

Test Example 20: Solubility Test

Solubility of the compound of the present invention was determined under conditions of 1% DMSO addition. A 10 mmol/L compound solution was prepared with DMSO. 2 µL of the solution of the compound of the present invention was added to 198 µL each of a JP-1 solution and a JP-2 solution. After shaking at room temperature for 1 hour, the mixed solutions were filtered by suction. The filtrates were diluted 10- or 100-fold with methanol/water=1/1 (V/V) or acetonitrile/methanol/water=1/1/2 (V/V/V), and concentrations in the filtrates were measured by an absolute calibration curve method using LC/MS or solid-phase extraction (SPE)/MS. The dilution concentration and the dilution solvent were changed as necessary.

The composition of the JP-1 solution is as follows.

Water was added to 2.0 g of sodium chloride and 7.0 mL of hydrochloric acid to make 1000 mL.

The composition of the JP-2 solution is as follows.

3.40 g of potassium dihydrogen phosphate and 3.55 g of dibasic sodium phosphate anhydrous were dissolved in water to make 1000 mL, and to 1 volume of the resultant, 1 volume of water was added.

Test Example 21: Powder Solubility Test

An appropriate amount of the compound of the present invention was placed in appropriate containers, and 200 µL each of a JP-1 solution (water was added to 2.0 g of sodium chloride and 7.0 mL of hydrochloric acid to make 1000 mL), a JP-2 solution (3.40 g of potassium dihydrogen phosphate and 3.55 g of dibasic sodium phosphate anhydrous were dissolved in water to make 1000 mL, and to 1 volume of the resultant, 1 volume of water was added), and 20 mmol/L sodium taurocholate (TCA)/JP-2 solution (a JP-2 solution was added to 1.08 g of TCA to make 100 mL) was added to each container. When the whole amount was dissolved after addition of the test solution, the compound of the present invention was appropriately added. The containers were hermetically sealed, shaken at 37° C. for 1 hour, and then filtered. Each filtrate was diluted 2-fold by addition of 100 µL of methanol to 100 µL of the filtrate. The dilution rate was changed as necessary. The absence of air bubbles and precipitates was confirmed, and the containers were hermetically sealed and shaken. The compound of the present invention was quantified by an absolute calibration curve method using HPLC. The dilution concentration and the dilution solvent were changed as necessary.

Test Example 22: Visual Solubility Test

About 5 mg of the compound is weighed into three trace tubes, and each vehicle (water for injection, saline injection, 0.5% glucose solution) is added so as to have a compound concentration of 20%. After stirring by vortexing, the presence or absence of dissolution is visually confirmed. If the compound is dissolved, solubility in the vehicle is determined to be >20%. Each vehicle (water for injection, saline injection, glucose solution) is further added to these test solutions to prepare test solutions having a compound concentration of 10%, and after stirring by vortexing, the presence or absence of dissolution is visually confirmed. If the compound is dissolved, solubility in the vehicle is determined to be 20% to 10%. Similarly, the test is performed for up to a concentration of 5%, a concentration of 2.5%, and a concentration of 1%, and when the compound is not dissolved at a concentration of 1%, solubility in the vehicle is determined to be <1%. A pH at a concentration of 1% of the test solution is measured and recorded. The dilution concentration and the dilution solvent may be changed as necessary.

Test Example 23: pKa Measurement (Method for Measuring Capillary Electrophoresis Method (CE Method))

This is a method using a capillary zone electrophoresis technique and a separation method utilizing free electrophoresis of each sample component in a buffer containing an electrolyte.

When a compound solution is injected into a fused silica capillary filled with a buffer adjusted to pH 2.5 to 11.5 and then a high voltage (inlet side +, outlet side −) is applied to the capillary, the compound migrates at a rate reflecting the ionization state at the pH of the buffer (fast for the positively (+) charged compound, slowly for the negatively (−) charged compound). A difference between a migration time of this compound and a migration time of a neutral molecule (DMSO) was plotted against pH, and pKa was calculated after fitting. Measurement conditions are shown below.

Apparatus used: Beckman P/ACE system MDQ PDA
Electrophoretic liquid: buffer at pH 2.5 to 11.5 (containing 10 vol % MeOH)
Sample solution: (Blank) mixed solution of 10 µL of DMSO+90 µL of water for injection
(Sample) 4 µL of 10 mM DMSO stock solution+6 µL of DMSO+90 µL of water for injection
(Method)
Capillary: fused silica capillary (Beckman Coulter, Inc., inner diameter of 50 µm, total length of 30.2 cm, effective length of 20.0 cm)
Applied voltage: 10 kV (331 V/cm)
Applied air pressure: 0.7 psi
Capillary temperature: 25° C.
Electroosmotic flow marker: DMSO Detection: ultraviolet multi-wavelength absorption detection (measurement wavelength; 215 nm, 238 nm)

Sample injection: pressurization method (0.5 psi, 5 seconds)

The following Formulation Examples are merely examples and not intended to limit the scope of the invention.

The compound of the present invention can be administered as a pharmaceutical composition by any conventional route, particularly enterally, for example, orally, for example, in a form of a tablet or a capsule; parenterally, for example, in a form of an injectable preparation or a suspension; and topically, for example, in a form of a lotion, a gel, an ointment, or a cream, or in a transnasal form or a suppository form. The pharmaceutical composition containing the compound of the present invention in a free form or in a form of a pharmaceutically acceptable salt can be produced together with at least one pharmaceutically acceptable carrier or diluent in a conventional manner by a mixing, granulating, or coating method. For example, the oral composition can be a tablet, a granule, or a capsule, each containing an excipient, a disintegrant, a binder, a lubricant, and the like, as well as an active ingredient and the like. Furthermore, the injectable composition can be a solution or a suspension, may be sterilized, and may contain a preservative, a stabilizer, a buffering agent, and the like.

INDUSTRIAL APPLICABILITY

The method of treating and/or preventing nonalcoholic fatty liver disease of the present invention and the pharmaceutical composition for treatment used therefor are considered to exhibit an excellent therapeutic effect by administering a predetermined amount of an active ingredient, the compound represented by Formula (I) or a pharmaceutically acceptable salt thereof, to patients with nonalcoholic fatty liver disease. In addition, having no side effects such as an increase in plasma triglyceride and a decrease in platelet concentration by administration of the compound represented by Formula (I) or a pharmaceutically acceptable salt thereof, the method of treatment and/or prevention and the pharmaceutical composition for treatment of the present invention can be applied extremely safely, and are also suitable for long-term administration. Therefore, they are extremely excellent method of treatment and/or prevention and pharmaceutical composition for treatment.

The invention claimed is:

1. A method of treating a fatty liver disease, the method comprising:
a step of administering an effective amount of a compound represented by Formula (I):

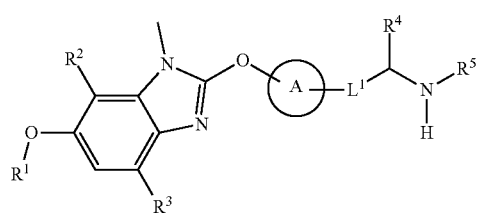

(I)

wherein
$R^1$ is haloalkyl or non-aromatic carbocyclyl,
$R^2$ is a hydrogen atom or halogen,
$R^3$ is halogen, ring A is a group represented by the formula:

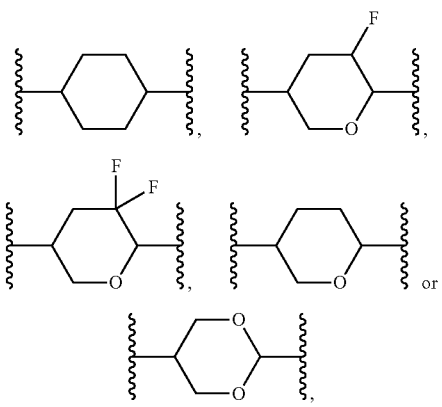

-$L^1$- is —O—(CH$_2$)—, —(CH$_2$)$_2$—, —(CH$_2$)—(CF$_2$)—, or —(CF$_2$)—(CH$_2$)— (wherein a left bond is attached to the ring A and a right bond is attached to a group represented by the formula:

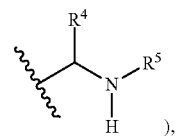

$R^4$ is alkyl or haloalkyl, and
$R^5$ is alkylcarbonyl or carbamoyl,
or a pharmaceutically acceptable salt thereof,
to an individual in need of treating the fatty liver disease.

2. The method according to claim 1, wherein the compound represented by Formula (I) is selected from the group consisting of:

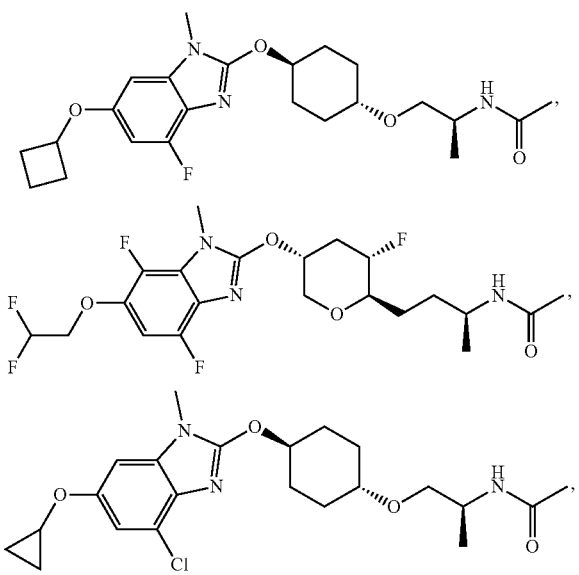

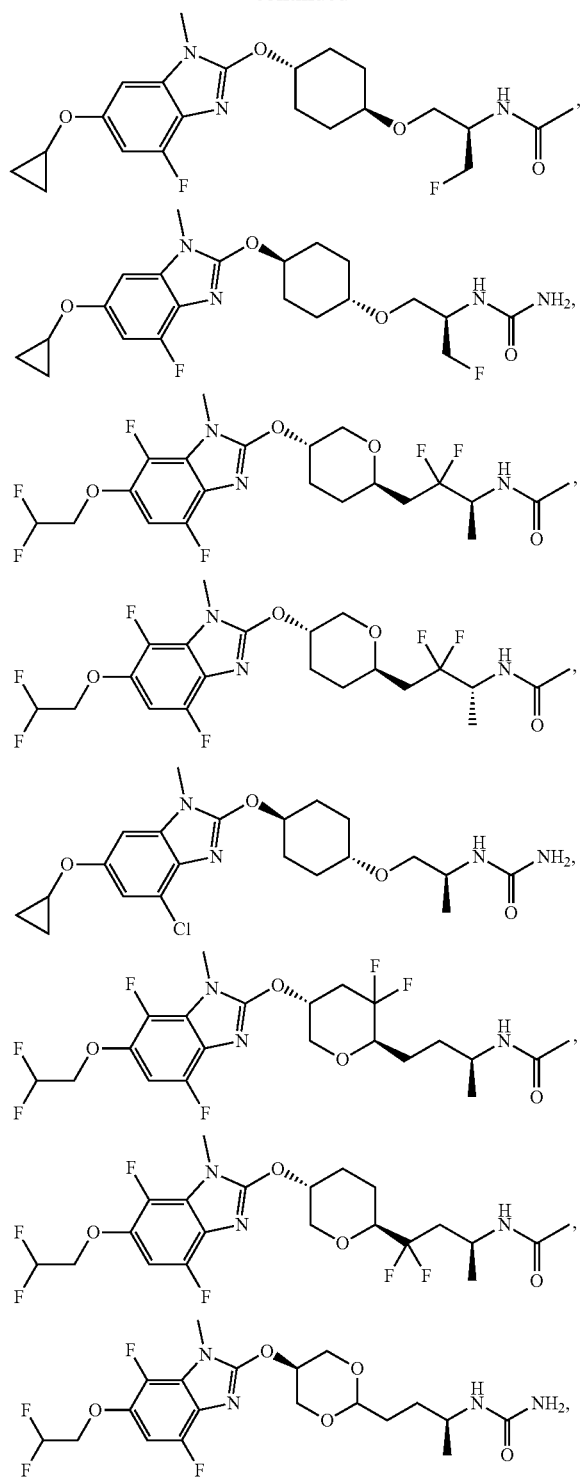

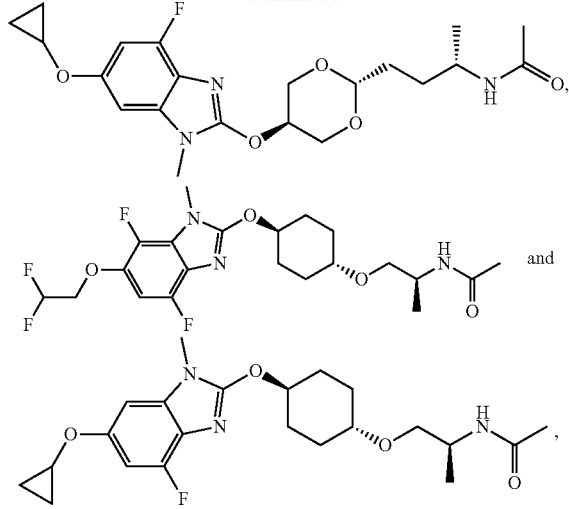

or a pharmaceutically acceptable salt thereof.

3. The method according to claim 1, wherein the fatty liver disease is nonalcoholic fatty liver disease (NAFLD).

4. The method according to claim 1, wherein the fatty liver disease is nonalcoholic steatohepatitis (NASH).

5. The method according to claim 1, wherein the fatty liver disease is liver fibrosis caused by NASH.

6. The method according to claim 1, wherein the fatty liver disease is liver cirrhosis caused by NASH.

7. The method according to claim 1, wherein the fatty liver disease is hepatocellular carcinoma (HCC) caused by NASH.

8. The method according to claim 1, which has no side effects of an increase in plasma triglyceride by administration of the compound represented by Formula (I) or the pharmaceutically acceptable salt thereof.

9. The method according to claim 1, which has no side effects of cardiovascular disease by administration of the compound represented by Formula (I) or the pharmaceutically acceptable salt thereof.

10. The method according to claim 1, wherein insulin resistance is improved by administration of the compound represented by Formula (I) or the pharmaceutically acceptable salt thereof.

11. The method according to claim 1, which has no side effects of a decrease in platelet concentration by administration of the compound represented by Formula (I) or the pharmaceutically acceptable salt thereof.

12. A method of treating a fatty liver disease, the method comprising administering a combination of:

a compound represented by Formula (I):

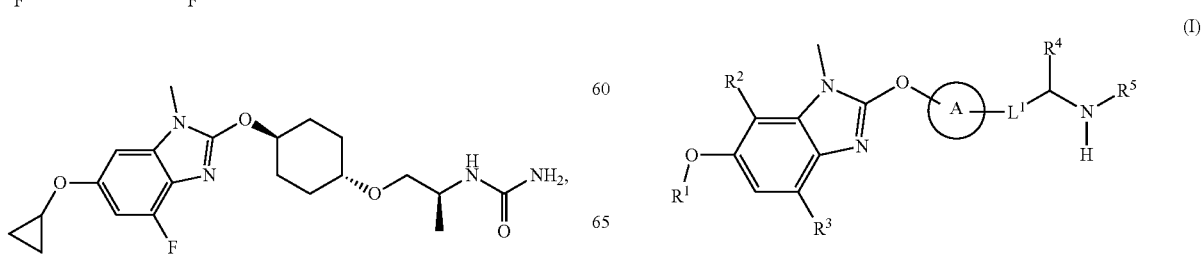

wherein
R¹ is haloalkyl or non-aromatic carbocyclyl,
R² is a hydrogen atom or halogen,
R³ is halogen,
ring A is a group represented by the formula:

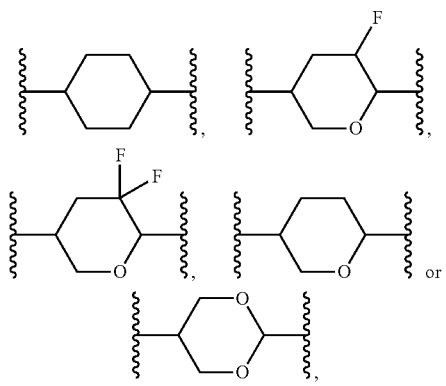

-L¹- is —O—(CH₂)—, —(CH₂)₂—, —(CH₂)—(CF₂)—, or —(CF₂)—(CH₂)— (wherein a left bond is attached to the ring A and a right bond is attached to a group represented by the formula:

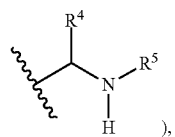

R⁴ is alkyl or haloalkyl, and
R⁵ is alkylcarbonyl or carbamoyl,
or a pharmaceutically acceptable salt thereof; and
at least one compound selected from the group consisting of obeticholic acid, semaglutide, and resmetirom, or a pharmaceutically acceptable salt thereof, to an individual in need of treating the fatty liver disease.

13. The method according to claim 12, wherein the compound represented by Formula (I) is selected from the group consisting of:

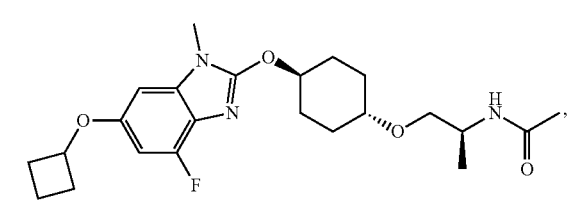

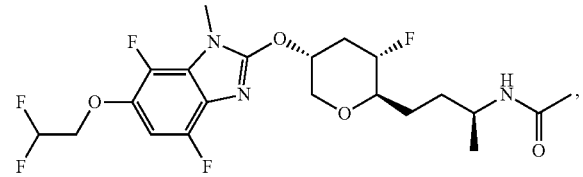

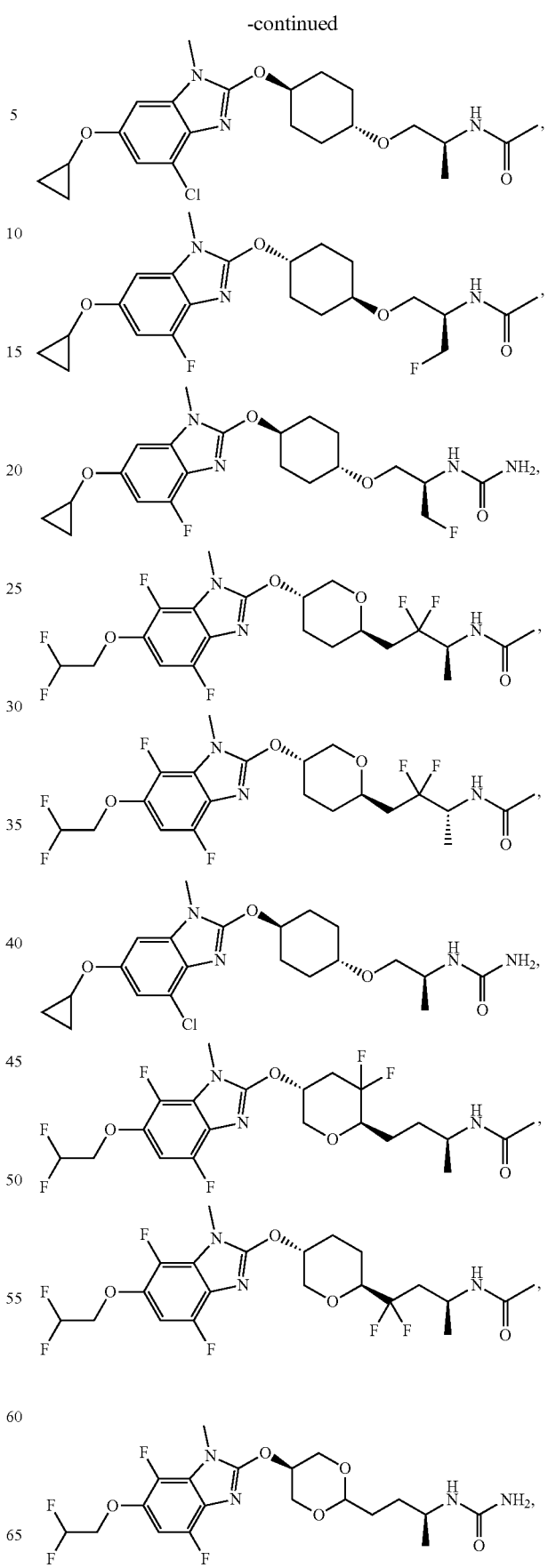

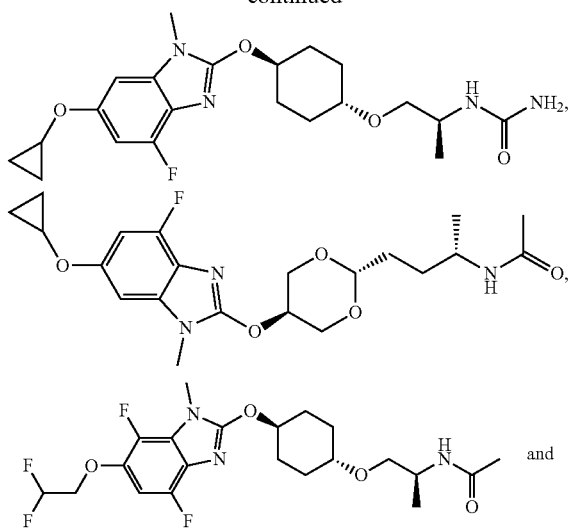

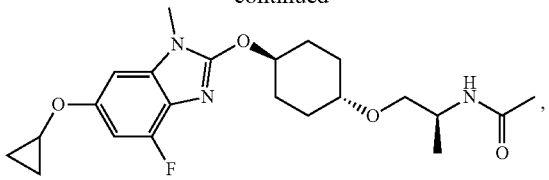

or a pharmaceutically acceptable salt thereof.

14. The method according to claim 12, wherein the fatty liver disease is nonalcoholic fatty liver disease (NAFLD).

15. The method according to claim 12, wherein the fatty liver disease is nonalcoholic steatohepatitis (NASH).

16. The method according to claim 12, wherein the fatty liver disease is liver fibrosis caused by NASH.

17. The method according to claim 12, wherein the fatty liver disease is liver cirrhosis caused by NASH.

18. The method according to claim 12, wherein the fatty liver disease is hepatocellular carcinoma (HCC) caused by NASH.

* * * * *